(12) United States Patent
Maes et al.

(10) Patent No.: US 7,685,252 B1
(45) Date of Patent: Mar. 23, 2010

(54) METHODS AND SYSTEMS FOR MULTI-MODAL BROWSING AND IMPLEMENTATION OF A CONVERSATIONAL MARKUP LANGUAGE

(75) Inventors: Stephane Herman Maes, Danbury, CT (US); Thiruvilvama Lai V. Raman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,823

(22) Filed: Apr. 6, 2000

Related U.S. Application Data

(60) Provisional application No. 60/158,777, filed on Oct. 12, 1999.

(51) Int. Cl.
   *G06F 15/16* (2006.01)
(52) U.S. Cl. .................. 709/217; 709/246; 709/248; 715/236
(58) Field of Classification Search .............. 709/203, 709/217–220, 310, 315, 246, 248; 704/270, 704/275; 379/88, 17; 717/173; 715/513, 715/236
   See application file for complete search history.

(56) References Cited

U.S. PATENT DOCUMENTS

| | | | | |
|---|---|---|---|---|
| 5,748,841 | A * | 5/1998 | Morin et al. ................ | 704/257 |
| 6,088,675 | A * | 7/2000 | MacKenty et al. .......... | 704/270 |
| 6,115,686 | A * | 9/2000 | Chung et al. ................ | 704/260 |
| 6,269,336 | B1 * | 7/2001 | Ladd et al. .................. | 704/270 |
| 6,314,402 | B1 * | 11/2001 | Monaco et al. ............. | 704/275 |
| 6,385,583 | B1 * | 5/2002 | Ladd et al. .................. | 704/270 |
| 6,418,439 | B1 * | 7/2002 | Papierniak et al. ............ | 707/9 |
| 6,456,974 | B1 * | 9/2002 | Baker et al. ............... | 704/270.1 |
| 6,493,758 | B1 * | 12/2002 | McLain ...................... | 709/227 |
| 6,507,817 | B1 * | 1/2003 | Wolfe et al. ................ | 704/260 |
| 6,569,207 | B1 * | 5/2003 | Sundaresan ................ | 715/513 |
| 6,578,000 | B1 * | 6/2003 | Dodrill et al. ............... | 704/270 |
| 6,587,822 | B2 * | 7/2003 | Brown et al. ............... | 704/275 |
| 6,626,957 | B1 * | 9/2003 | Lippert et al. .............. | 715/513 |
| 6,636,831 | B1 * | 10/2003 | Profit et al. ................ | 704/275 |

(Continued)

OTHER PUBLICATIONS

David Wong, Noemi Paciorek, Dana Moore, "Java-based Mobile Agents", Communications of the ACM Mar. 1999 vol. 42 Issue 3.*

(Continued)

*Primary Examiner*—Douglas B Blair
(74) *Attorney, Agent, or Firm*—Anne V. Dougherty; Ryan, Mason & Lewis, LLP

(57) ABSTRACT

A new application programming language is provided which is based on user interaction with any device which a user is employing to access any type of information. The new language is referred to herein as a "Conversational Markup Language (CML). In a preferred embodiment, CML is a high level XML based language for representing "dialogs" or "conversations" the user will have with any given computing device. For example, interaction may comprise, but is not limited to, visual based (text and graphical) user interaction and speech based user interaction. Such a language allows application authors to program applications using interaction-based elements referred to herein as "conversational gestures." The present invention also provides for various embodiments of a multimodal browser capable of supporting the features of CML in accordance with various modality specific representations, e.g., HTML based graphical user interface (GUI) browser, VoiceXML based speech browser, etc.

89 Claims, 12 Drawing Sheets

U.S. PATENT DOCUMENTS

| | | | | |
|---|---|---|---|---|
| 6,718,516 | B1* | 4/2004 | Claussen et al. | 715/513 |
| 6,807,254 | B1* | 10/2004 | Guedalia et al. | 379/88.1 |
| 6,925,595 | B1* | 8/2005 | Whitledge et al. | 715/513 |
| 7,359,911 | B2* | 4/2008 | Underseth | 707/102 |
| 7,546,382 | B2* | 6/2009 | Healey et al. | 709/246 |
| 7,577,900 | B2* | 8/2009 | Passero et al. | 715/200 |
| 2003/0046316 | A1* | 3/2003 | Gergic et al. | 707/513 |

OTHER PUBLICATIONS

Jakob Nielsen, "User Interface Directions for the Web", Communications of the ACM Jan. 1999 vol. 42 Issue 1.*

"New VXML Forum", Mar. 2, 1999, Cover Pages Hosted by Oasis, http://www.oasis-open.org/cover/vxml19990302.html.*

"Voice eXtensible Markup Language", May 5, 2000, W3C Note May 5, 2000, http://www.w3.org/TR/voicexml.*

Extensible Stylesheet Language Version 1.0, Dec. 16, 1998, World Wide Web Consortium, pp. 1-8.*

David Wong, Noemi Paciorek, Dana Moore, "Java-based Mobile Agents", Communications of the ACM Mar. 1999 vol. 42 Issue 3.*

Jakob Nielsen, "User Interface Directions for the Web", Communications of the ACM Jan. 1999 vol. 42 Issue 1.*

"New VXML Forum", Mar. 2, 1999, Cover Pages Hosted by Oasis, http://www.oasis-open.org/cover/vxml19990302.html.*

"Voice eXtensible Markup Language", May 5, 2000, W3C Note May 5, 2000, http://www.w3.org/TR/voicexml.*

R. Nisimura et al., "Development of Speech Input System for Web-Based Applications," IEICE Technical Report, The Institute of Electronics, Information and Communication Engineers, pp. 41-48, Jun. 1999.

N. Uramoto et al., "Development of XML/RDF-Based Web Application," SIG-Challenge-9803 Proceedings of the Third Meeting of Special Interest Group on AI Challenges, Japanese Society for Artificial Intelligence, pp. 13-18, Feb. 1999.

M. Ikeda, "XML (latter part); Advanced Information Processing is Enabled by WWW," Nikkei Computer No. 438, Nikkei Business Publications, Inc., pp. 222-227, Mar. 1998.

J. Honma, "Real Identity of XML; Acceptance Subsequently by WWW, Mobile and Broadcast," Nikkei NetBusiness No. 48, Nikkei Business Publications, Inc., pp. 65-71, Jun. 1999.

Y. Zong et al., "Multimodel Presentation based on MPML with Macro-Definition Attache," Information Processing Society of Japan, pp. 65-66, Sep. 1999.

"Voice Extensible Markup Language VoiceXML," VoiceXML Forum, Aug. 1999, pp. 1-63, version 0.9.

"Lucent Technologies and Netscape to Launch Internet Portal for People on the Move," PR Newswire, ProQuest, May 1999, pp. 1-4.

M. Abrams et al., "UIML: An Application-Independent XML User Interface Language," Computer Networks, 1999, pp. 1-16, vol. 31.

"Motorola Simplifies Development of Voice, Data Applications for Mobile Users; Single Integrated Tool Unveiled for Voice and Data Applications," Business Wire, ProQuest, Oct. 1999, pp. 1-4.

* cited by examiner

FIG. 3

```
                               CML
           <?xml version="1.0"?>
           <!--$id: drink.cml,v 1.3 1999/11/12 22:36:21 $-->

<cml node_id="0"
             name="drink"
             title="Global Cafe"
             action="http:localhost/servlet/drink">
             <select name="drink"
                 node_id="1">
               <message node_id="2">
                 Would you like coffee, tea, milk, or nothing?
               </message>
               <choices node_id="3">
                 <default value="coffee">Coffee</default>
                 <choice value="tea">Tea</choice>
                 <choice value="milk">Milk</choice>
                 <choice value="nothing">Nothing</choice>
               </choices>
             </select>
           </cml>
```

GESTURE: TITLE 20

GESTURE: MESSAGE 22

GESTURE: EXCLUSIVE SELECTION 24

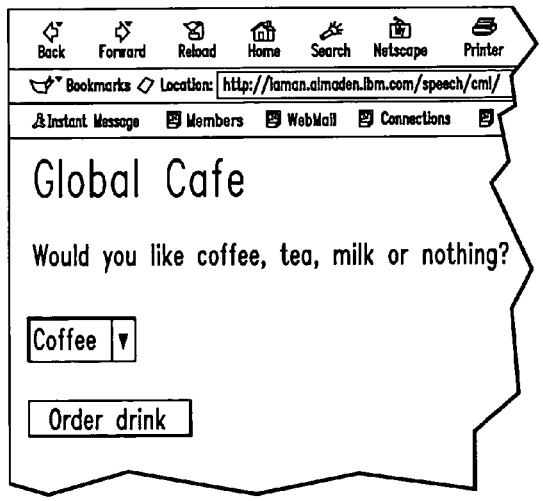

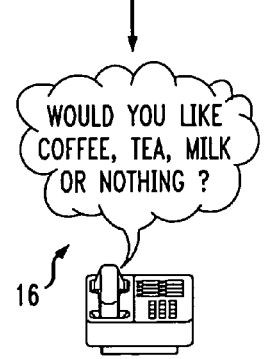

FIG. 6A

HTML GUI EXAMPLE            CNN Mobile News

CNN Mobile News

1. Select News Stories
2. Exit
3. Help

About CNN Mobile

This application allows you to select and view CNN news stories

Back

Exit CNN Mobile News

Thankyou for using the CNN news service

`cnn.exit`

Search CNN Mobile News

Topic Selection

1. News
2. Business
3. Sports
4. Travel
5. Weather
6. Show Business

News Channel

Which part of today's news would you like to read?

`Headlines`

Which news category would you like to read?

`Business`

FIG. 6B

HTML GUI EXAMPLE                                      CNN Mobile News

[cnn.query.news]

Business Channel

Which part of today's news would you like to read?

[Headlines]

Which business category would you like to read?

[news]

[cnn.query.business]

Weather Channel

Which part of today's news would you like to read?

[Headlines]

Which region are you interested in?

[United States]

[cnn.query.weather]

Travel Section

Which part of today's news would you like to read?

[Headlines]

Which city do you want to visit?

[AMSTERDAM]

[cnn.query.travel]

Sports Channel

Which part of today's news would you like to read?

[Headlines]

What sports are you interested in?

*FIG. 8*

CNN Mobile News

CNN.com STORE | NEWS  GET-TO-THE-POINT NEWS

1. Select News Stories
2. Exit
3. Help

About CNN Mobile

This application allows you to select and view CNN news stories

Back

Exit CNN Mobile News

Thankyou for using the CNN news service

[cnn.exit]

Search CNN Mobile News

Topic Selection

1. News
2. Business
3. Sports
4. Travel
5. Weather
6. Show Business

News Channel

Which part of today's news would you like to read?

[Headlines ▼]

Which news category would you like to read?

[Business ▼]

[cnn.query/news]

METHODS AND SYSTEMS FOR MULTI-MODAL BROWSING AND IMPLEMENTATION OF A CONVERSATIONAL MARKUP LANGUAGE

CROSS REFERENCE TO RELATED APPLICATIONS

The present application claims priority to the U.S. provisional patent application identified by Ser. No. 60/158,777 filed on Oct. 12, 1999, the disclosure of which is incorporated by reference herein. The present application is related to (i) PCT international patent application identified as PCT/US99/23008 filed on Oct. 1, 1999; (ii) PCT international patent application identified as PCT/US99/22927 filed on Oct. 1, 1999; (iii) PCT international patent application identified as PCT/US99/22925 filed on Oct. 1, 1999, each of the above PCT international patent applications claiming priority to U.S. provisional patent application identified as U.S. Ser. No. 60/102,957 filed on Oct. 2, 1998 and U.S. provisional patent application identified as U.S. Ser. No. 60/117,595 filed on Jan. 27, 1999; and (iv) U.S. patent application identified as U.S. Ser. No. 09/507,526 filed on Feb. 18, 2000 which claims priority to U.S. provisional patent application identified as U.S. Ser. No. 60/128,081 filed on Apr. 7, 1999 and U.S. provisional patent application identified by Ser. No. 60/158,777 filed on Oct. 12, 1999. The disclosures of all of the above-referenced related applications are incorporated by reference herein.

FIELD OF THE INVENTION

The present invention generally relates to information access applications and, more particularly, to an interaction-based markup language and multi-modal browsing mechanisms supporting the interaction-based markup language for use with such information access applications.

BACKGROUND OF THE INVENTION

Given the dramatic increase in the availability of various types and quantities of information and a sharp decrease in time and/or availability of traditional facilities to access such information, individuals currently desire to be able to access, act on, and/or transform any information from any device at any time. In the case of the Internet, for instance, large quantities and varieties of information are available, however, traditionally the Internet was mostly supporting only devices that access information using a HyperText Markup Language (HTML) browser on top of a HyperText Transport Protocol (HTTP) network. This was provided on top of TCP/IP (Transmission Control Protocol/Internet Protocol).

Solutions to this problem centered around rewriting application programs used to access such information so that the information could be accessed in other ways. One solution led to the development of the Wireless Application Protocol (WAP), see, http://www.mobilewap.com. WAP is equivalent to HTTP for a wireless network. A Wireless Markup Language (WML) was developed which is equivalent to HTML for a wireless network. Thus, similar to how HTML is used on top of HTTP, WML is used on top of WAP. WAP and WML allow a user to access the Internet over a cellular phone with constrained screen rendering and limited bandwidth connection capabilities. CHTML is another example of a ML (markup language) addressing this space.

Next, more recently came the development of a mechanism for bringing the Web programming model (also known as fat client programming model) to voice access and, in particular, to telephone access and Interactive Voice Response (IVR) systems. Such a mechanism is typically known as a speech browser (or voice browser). Such a speech browser is described in the above-referenced U.S. provisional patent application identified as U.S. Ser. No. 60/102,957. The speech browser may use a speech based variation of the Extensible Markup Language (XML) known as VoiceXML, see, e.g., http://www.voicexml.org. The speech browser can also operate on top of the WAP protocol and in conjunction with exchanges of WML data.

However, such an approach poses certain problems for application programmers, if they want to offer multi-channel support: offer access to web browsers (HTML browsers), phones (voice browsers) and wireless browser (WML) or multi-modal/conversational browsers, as defined in the aforementioned disclosures. First, with this approach, the application programmer must deal with at least three different languages when developing an application, e.g., HTML, WML and VoiceXML. That is, the application must account for the fact that since a user is going to be accessing Internet based information via a speech browser over a conventional telephone, or over a wireless connection using a WAP browser or using a conventional web browser, HTML, WAP and VoiceXML must be employed when writing the application. This is known to be quite burdensome to the application developer. Secondly, with this approach, there is no suitable way to synchronize multi-modal applications, for example, applications that provide for both visual and speech based user interaction with the browser or browsers employed to access the application.

Applications have traditionally been developed such that both content (i.e., information or other data) and presentation (i.e., manner in which the content is presented to the user) were mixed. However, in an attempt to simplify application programming, an effort was made to separate content from presentation. This led to the development of the Extensible Stylesheet Language (XSL) which operates in conjunction with XML such that content associated with an application is stored in XML and the transformations necessary to present the content on a specific device are handled by XSL, see, http://www.w3.org/Style/XSL. Such approach has been adopted by the W3C (World Wide Web Consortium). This approach is typically used to adapt the presentation to the characteristics of the main browsers (e.g., different versions of Microsoft Internet Explorer, Netscape Communicator/Navigator, other less popular browsers, etc.). Some have tried to extend this use to other modalities/channels (e.g., wireless browser supporting a format like WML on top of embedded devices (wireless phone or PDA)). This last approach has never been very successful or convenient and in any case it requires multiple authoring of the XSL pages. However, this approach has the disadvantage of being both application and device/channel dependent. That is, XSL rules are dependent on the application and device for which the content is to be transcribed. Thus, if an application is to be accessed from a new device, new XSL transformations must be written for that device.

Other attempts to overcome some of these problems have been made. There have been attempts to provide an XML model based on user intention (complex and generally task oriented intentions). User intentions may be modeled with complex components that can not, or are very difficult to be, rendered on devices with small screens or with speech. These complex components, not decomposed into smaller atomic components, can also not be tightly synchronized across modalities. Tags independent of the device are offered which are rendered by different browsers. Also, some extensions to speech interactive voice response (IVR) systems have been proposed. However, among other deficiencies, these attempts do not model dialog and transcoding from modality to modality is generally an impossible task.

In these approaches, user intentions are modeled with complex components that describe complex interactions. However, they are typically application-specific. That is, they depend, characterize, or directly involve business logic concepts and elements. Therefore, in that case, the same way that XSL rules (and XSL style sheets) are today fundamentally a function of the application or application domain (i.e., the nature of the XML attribute involved), the XSL rules used to transform pages written with theses languages are also fundamentally a function of the application or application domain. They must be re-written for each new application. This characterizes the limitation of these approaches. These approaches do not contribute in helping to offer access to content, independent of the access modality. Indeed, these approaches only allow access to content related to this application or application domain. Any other case requires rewriting the transformation rules. Thus, there is a need to free transformation rules from the backend application and to make it depend only on characteristics/modalities supported by the access device or channel.

Note that in some cases, support of multiple channels has been achieved by using cascades of stylesheets and treating the resulting XML stream as serialized internal APIs (Application Programming Interfaces). Again, this requires multiple authoring.

In addition, the above approaches result in having very complex intention models with such components that do not have corresponding rendering appropriate in modalities like WML. It is apparent that these models were designed to offer the capability to customize the graphical user interface (GUI) presentation to requirements of different types of display (i.e., essentially within variations of the same channel and modality) or browsers. As a result, none of these approaches appropriately model and treat speech or multi-modal user interfaces.

As already mentioned, conventional transcoding (XSL rules used to present the XML content and change of XSL style sheet to go from one modality to another) has been considered to support different access modalities. This means that for a given XML content, by changing the XML rules, the system can produce an HTML page, an WML rule, or even a VoiceXML page, etc. Actually, this is what is being used today to support the different web browsers on the market, e.g., Netscape Communicator, Microsoft Internet Explorer, Sun Microsystems Hot Java, Spyglass browser, Open Source Amaya browser/editor, etc. Unfortunately, this is possible only if:

(i) The XSL rules are application or application domain specific (i.e., the nature of the XML attribute); and (ii) Transcoding is between two languages, for example HTML to WML, and the original content has been built in HTML while following very strict rules of authoring. Indeed, this is enforceable only if within a given company, for a given web site. Even in those cases, it is hardly implementable, in general, because of missing information across markup languages or modalities in order to provide the corresponding components in other modalities (e.g., an HTML form or menu does not provide the information required to render it automatically by voice) as well as different dialog navigation flows in different modalities.

Accordingly, there is a need for an application programming language and information browsing mechanisms associated therewith which overcome these and other shortcomings attributed to existing languages and browsers.

SUMMARY OF THE INVENTION

The present invention provides for a new application programming language which is based on user interaction with any device which the user is employing to access any type of information. The new language is referred to herein as a "Conversational Markup Language (CML).

In a preferred embodiment, CML is a high level XML based language for representing "dialogs" or "conversations" the user will have with any given computing device. While the terms dialog and conversation are used herein, it is to be appreciated that they more generally refer to a users interaction with a device (e.g., a local device, a remote device (e.g., interaction over the telephone), or any otherwise distributed device), independent of the modality and the device. Thus, interaction may comprise, but is not limited to, visual based (text and graphical) user interaction and speech based user interaction and combinations of them.

Such a language allows application authors to program applications using interaction-based elements referred to herein as "conversational gestures." Conversational gestures are elementary programming components or elements of CML that characterize any dialog, independent of the modalities, the devices, or the browsers employed to access information associated with an application programmed in accordance therewith.

The invention accomplishes these and other features and advantages by defining a new application programming paradigm. As mentioned above, existing application authoring approaches have adopted the concept of separating the content based aspects of an application from the presentation based aspects. In accordance with the present invention, CML introduces a new paradigm which provides for separating application programming into content aspects, presentation aspects and interaction aspects. By focusing on the interaction aspect of an application with respect to a user, an application may be written in a manner which is independent of the content/application logic and presentation. It is to be appreciated that the content and/or the business logic of an application is also referred to as the "back-end logic" associated with the application.

In a client/server arrangement, the "back-end logic" is the portion of an application that contains the logic, i.e., encoded set of states and conditions that drive the evolution of an application, as well as variable validation information. As will be explained, attribute constraint and validation information can be added to a CML page to carry logic information separated from the back-end data. Thus, as will be explained and illustrated below, after an application is created in CML, a portion of the CML code associated with the application is downloaded to a client device or devices from a server and the CML gestures of the CML code are then transcoded to the browser-specific markup languages employed at the device or devices, e.g., HTML and/or VoiceXML.

In accordance with the invention, a device (client or even server serving CML pages into possibly other legacy markup languages like HTML, VoiceXML, WML etc.) operating with downloaded CML code can transcode to, for example, HTML and VoiceXML, substantially simultaneously so as to synchronize the multiple browsers providing the user with access to information. Such advantageous synchronization according to the invention is possible because the transcoding is done gesture by gesture with gesture identification. Thus, when an input/output event occurs in one modality, the browser knows what event occurred for what gesture and can immediately update all the supported modalities. This results in a very tight synchronization across modalities. Such synchronization is also achieved due to the fact that the various modality-specific user interface dialogues, e.g., associated with a graphical user interface (GUI) browser or a speech browser, are generated from a single CML representation, on a gesture by gesture basis. Thus, the multiple user interfaces, e.g., GUI, speech, etc., are synchronized and continuously updated as a user interactively proceeds with one or the other modality.

CML and the browsing mechanisms of the present invention also provide a platform for natural language (NL) programming. Since CML allows an application author to program gesture by gesture, such an application provides the flexibility for a user to provide requests/responses in a wide range of natural conversational manners. Thus, the user is not restricted to simple commands but rather can interact with an application in a less restrictive manner, e.g., more closely resembling a natural conversation. With NL and the invention, the user can express himself freely in multiple modalities, with no constraint other than to carry a natural conversation as if it was carried with another human being. In the case of NL, in addition, the system may use context and past interaction/dialog history (as well as other meta-information like user preferences, application settings, stored common knowledge, etc.) to disambiguate queries.

NL is a statement which is not limited to speech but encompasses all aspects of a natural multi-modal conversational application. It combines NL inputs with natural multi-modal input. As described in the above-referenced PCT international patent application PCT/US99/22927: any input is modeled independently of the modality as an input/output event that is then processed by a dialog manager and arbitrator that will use history, dialog context and other meta-information (e.g., user preference, information about the device and application) to determine the target of the input event and/or engage a dialog with the user to complete, confirm, correct or disambiguate the intention of the user prior to executing the requested action.

It is also to be appreciated that the present invention provides for a multi-device or distributed browsing environment. Due to the nature of CML and its ability to the effectively synchronize multiple browsers, various portions of an application may reside and be executed on separate computing devices. A user may then simultaneously interact with more than one device, e.g., a laptop computer and a cellular phone, when accessing an application. This is referred to as "multi-device browsing." Actually, this aspect of the invention does not require "multi-modality." That is, even with only GUI/HTML browsers, the gesture-based XSL rules can be used to define what is rendered on what browser. Accordingly, some content can be displayed on a personal digital assistant or PDA (i.e, color images, streamed video, long lists), while the rest is displayed on the cell phone screen, etc.

Given the modality-independence of CML, even after an application is written, any transcoding rules associated with any type of browser may be implemented. That is, CML allows the author to change to another type of transcoding (i.e., the gesture based transcoding rules), other than any default transcoding that may have originally been implemented. Thus, through simple updates of gesture based XSL rules, this feature advantageously guarantees support for new releases/versions of the so-called "legacy languages," e.g., HTML, WML, VoiceXML, etc., and for new languages, e.g., CHTML, HDML, etc. In addition, this feature permits a simple and easy passage from one version of CML to a new one using simple gesture based XSL rules. It is to be appreciated that gesture by gesture transcoding from version to version is not a different problem from transcoding from CML to other legacy language. This is especially advantageous as CML is designed, by definition, around the principle of this transcoding. This is certainly not true for most of the other mark-up languages where upgrades of the specifications, while possibly offering backward compatibilities, are usually problematic for new generation browsers, as well as in with respect to all the older content written in older versions.

CML also permits cosmetic altering of a presentation even after a CML page is written. For example, depending on the desired modality and target markup language, a CML command may be issued to cosmetically alter some feature of the presentation of content, in some modalities. This allows CML developers to put the same amount of cosmetic efforts as they would put for optimal HTML rendering. But the advantage of course is that for the same price, they have obtained a multi-channel (i.e., able to be expressed in multiple type of target ML or device modalities or specific user interface characteristics) description of the interaction that can be used to provide universal access (independent of the access device or channel) and/or tightly synchronized multi-modal and conversational user interfaces.

The present invention also provides for various embodiments of a multi-modal browser capable of supporting the features of CML in accordance with various modality specific representations, e.g., HTML based graphical user interface (GUI) browser, VoiceXML based speech browser, etc.

It is to be noted that the term "CML" is used in the above-referenced PCT international patent application PCT/US99/23008 and U.S. patent application Ser. No. 09/507,526. In these applications, the term is meant to refer to a declarative way to describe conversational interfaces. In accordance with the present invention, the term CML refers to a gesture-based language which embodies the concept of programming by interaction, as will be explained in detail below.

Given such aspects of the present invention, as well as others that will be explained below, we now discuss some important differences between such inventive features and existing approaches. The exponential growth of the World Wide Web (WWW) during the last five years has pointed out the inherent strength in constructing light-weight user interface applications by first separating user interaction from content, and subsequently delivering application front-ends via markup languages like HTML that are rendered by a platform-independent WWW browser. This architecture opens up a new world of possibilities by liberating end-user applications from details of the underlying hardware and operating system. The current WWW architecture has liberated visual interfaces to e-commerce applications from details of the underlying hardware and operating system. The next step in this evolution is to make end-user applications independent of the interface modality and device used to interact with electronic information. This evolution is the natural next step in enabling speech-based interaction with the new generation of e-commerce applications.

To achieve end-user WWW services that are device and modality independent, there is a strong need to author such applications and services using modality independent technologies that enable delivery to a variety of devices. With XML fast becoming the next-generation lingua-franca of the WWW, it is natural to design such languages as XML applications.

Modality-independent WWW services can thus be achieved by designing an XML-based language for authoring information content and interaction logic that is modality independent, and then delivering the resulting application in a manner most appropriate to the target device. This naturally leads to the design of languages that separate information content, information presentation and interaction logic into distinct components. The WWW has already evolved towards separating out content from presentation by adopting style sheets; the next evolutionary step is to factor out interaction logic from information content. At present, external standards activities in this area are expected to emerge from industrial consortia such as the W3C within its XFORMS and voice browser working groups.

The separation outlined above leads to an approach we refer to as conversational computing: end-user applications and services are expressed as an aggregation of modality-independent conversational gestures, where each conversational gesture encodes an atomic piece of the man-machine dialogue making up the user interaction.

The insights outlined above are validated by the fact that there have been a few attempts at designing intention-based markup language in the recent past. They were initially designed to abstract variations in visual presentation amongst different devices e.g., small screen handhelds versus desktop PCs. As speech interfaces become relevant, both these languages are presented as a possible means for authoring end-user applications for delivery to speech devices, in addition to the different visual displays that were their original target.

CML, according to the present invention, is designed from the ground-up as an XML-based language for authoring modality-independent user interaction, with a special focus on the new requirements introduced by the need to address conversational interfaces comprising of speech and natural language technologies. This focus on speech as a first-class citizen in the user interface has caused CML to evolve in a manner distinct from previous attempts. We will contrasts some of these key differences.

(i) Overlays Interaction On Data Model

All prior art languages define the user intentions and the underlying data model that is populated by the user interaction within the same piece of markup. Here is a short example from a specification to illustrate this. The fragment of markup shown below would be used to obtain a person's title (Mr., Mrs., or Ms.). Notice that the definition of the datatype being prompted for is intermixed with the markup that produces the user interaction.

```
<prior art ML>
    <CHOICE NAME="PersonTitles" SELECTION-POLICY="SINGLE">
        <CAPTION>Title</CAPTION>
        <HINT>This is a set of valid titles for a person.</HINT>
        <STRING NAME="Mr">
            <VALUE>Mr.</VALUE>
        </STRING>
        <STRING NAME="MRS">
            <VALUE>Mrs.<VALUE>
        </STRING>
        <STRING NAME="MISS">
            <VALUE>Miss<VALUE>
        </STRING>
        <STRING NAME="MS">
            <VALUE>Ms</VALUE>
        </STRING>
    </CHOICE>
```
</prior art ML>

Compare the above with the CML representation for obtaining the person's title shown below. Notice that we separate the definition of the datatype, i.e., the enumeration type that lists valid person titles, from the user interaction component, i.e., namely, the select gesture.

We first define the enumeration type PersonTitle:

```
<enum name="PersonTitle" type="string"> <value>MR</value> <value>MRS</value> <value>MISS</value> </enum>
```

Once defined, field PersonTitle can be instantiated at multiple points in the user interaction via an appropriate CML gesture. Below we illustrate this with gesture select.

```
<select name="PersonTitle" selection-policy="single"> <message>Person Title</mesage> <choices> <choicevalue="MR">Mr.</choice> <choicevalue="MRS">MRS.</choice> <choicevalue="MISS">Miss.</choice> </choices></select>
```

Separating the conversational gesture (gesture select in the above example) from the definition of the underlying datatype (enumeration PersonTitle above) provides a number of advantages:

(1) By separating the conversational gesture from the data definition, we can author multiple user interfaces for prompting for the person title, e.g., when internationalizing the above dialogue. Thus, a German version of this dialogue constructed in CML would require only the conversational gesture to be modified. Notice that when the representation of the above is internationalized, i.e., what needs to change are the contents of elements caption, hint and code value, the definition of the underlying enumeration type remains the same. However, by overlaying the user interface markup on the data definition, this design fails to isolate the changes needed to internationalize the dialogue. Note that some of the previous languages work around this explicit problem of internationalization by introducing the notion of templates which then get re-used by the author for producing different language versions of the above dialogue. However, this does not eliminate the basic underlying problem, i.e., the data definition and user interface still remain linked in the template definition.

(2) Once field PersonTitle is defined, CML gestures can refer to this field at multiple points in the user interaction. Thus, once the user has specified a value for field PersonTitle, subsequent portions of the dialogue can refer to the supplied value when producing prompts e.g., Welcome to the electronic store Mr. Smith.

(3) Applications authored in CML are also free to prompt the user for a specific field such as PersonTitle at different points in the user interaction, with the user having the freedom to decide at which point he/she supplies a value for that field. This form of flexibility is especially vital in designing natural language interfaces, and is again a consequence of separating the markup that defines the model from the markup that declares the user interaction. Without this separation (as in the prior art at present), the above would force the author to define field PersonTitle multiple times.

To see the above, consider a mutual funds application that allows the user to buy and sell mutual funds as well as to find out the net value of a specific asset. In a simplified version of this interaction, the system needs to obtain two items of information from the user:

(a) User action, e.g., buy sell or net asset value;
(b) Asset to act on, e.g., fund to buy.

When using a natural language interface for the above example, the user is equally likely to specify either the action to perform, the asset to act on, or perhaps both when initially prompted by the system. Depending on what is specified, the dialogue now needs to transition to a state where the system prompts for the missing piece of information; alternatively, if both action and asset are specified, the system needs to produce a confirmation prompt of the form: "Would you like to action specified fund?"

Given that the prior art currently overlays the interaction markup, i.e., in this case, element CHOICE on the data definition, it becomes impossible for the application author to specify the user interaction for obtaining value the same field, e.g., asset at different points in the user interaction.

The overlay of interaction over data models especially emphasizes the novelty of our approach and new paradigm and programming model that we disclose herein.

(ii) Lack Of Explicit Environment For Encapsulating Application State

A further consequence of separating out the data model from the user interaction in CML is that applications authored as a CML document clearly present an environment that binds application state, e.g., PersonTitle or action in the examples cited above. In the case of the prior art, this application state is implicit and not readily available to other parts of the user interface encoded in the language.

By defining the data model and hence the application state explicitly, CML clearly defines the XML encoding that will be sent back to the server once user interaction is completed. Thus, in the case of field PersonTitle, the server would receive the following upon submission:

<PersonTitle>MR</PersonTitle>

The server, which has access to the definition of the data model, can validate the submitted value. In more complex examples, the data model definition can encapsulate application-specific validation constraints; these constraints can be checked both at the client-side, and later verified upon submission on the server end. This separation of the data model and constraints from the user interface enables CML applications that allow the user to commence an interaction using a particular interaction device, e.g., a desktop PC, submit a partially completed transaction, and later complete the transaction using a different device, e.g., a cellular telephone.

(iii) The Prior Art Reflects GUI Legacy

Many of the core attributes defined in the prior art specification reflects GUI-specific legacy. For instance, all data types are qualified by core attributes shown, which makes sense only for display-based interfaces. There appears to be no unambiguous interpretation of settings such as enable=false, shown-true for non-visual devices such as speech-based handhelds and cellular telephones.

Moreover, these attributes make it hard to map representations of user interaction to small-sized displays; this is because an application authored in these ML for a desktop GUI is likely to declare that many of the interaction elements be shown, something that becomes difficult in environments where display real-estate is scarce.

The prior art usually has other GUI components that have no meaning outside large screens. Unfortunately, features that are pervasive in the language and not easily usable across modalities/channel are problematic: one can not guarantee that transcoding/rendering will be possible for any target.

In addition modalities like speech may require additional information in order to render the dialog components (e.g., grammar, vocabulary, language model, acoustic model, NL parsing and tagging data files, etc.). This information is not available in the prior art widgets. Again, the overlay between data model and interaction leads to problems when the same dialog component needs to be used multiple times in the page with different data files.

(iv) Lack of Atomic Conversational Gestures

Because prior art representations of user interaction are overlaid directly on the underlying data model that is being populated, there is no notion of a set of atomic conversational gestures in these MLs as in CML; rather, explicit CML gestures such as select are implicit in the prior art design. For example, CML gesture select would appear in prior art as a result of overlaying the markup for a choice element on the markup for a list structure, see the example of field PersonTitle cited above.

Lack of atomic conversational gestures first becomes a problem when constructing more complex dialogues; for instance, the prior art introduces explicit table and tree constructs to parallel the GUI notion of two-dimensional tabular layout and tree widgets. But since these higher-level constructs are not built up of atomic building blocks as in CML, mapping components constructs like table or tree (where tree is declared to be open or closed) to modalities like speech that lack a static two-dimensional display is impossible. Also, gestures like tree and table have no immediate equivalent on small screen devices.

(v) Synchronization

Tight synchronization across multiple interaction modalities is a key requirement of high-quality multi-modal interfaces. Going forward, such multi-modal clients are more likely to be constructed using the DOM (Document Object Model as described at http://www.w3c.org) provided by conventional browsers as the underlying platform. In this latter implementation scenario, the overlaying of the user interface constructs on the data definition detailed above is likely to once again become a stumbling block (e.g., same problem, now view by view as mentioned above for the lack of explicit environment to encapsulate the dialog/application state).

Tight synchronization across modalities is a basic design goal in CML. This is reflected throughout the CML design, and the resulting separation between conversational gestures and the definition of the data model makes it easier to implement a multi-modal browser that is constructed on top of the DOM using the classic Model View Controller (MVC) design.

(vi) Conversational Applications

Conversational applications can be developed declaratively by activating simultaneously multiple forms (each describing a transaction or portion of transaction). This requires the capability to re-use at different places in the file the same dialog component. As explained above, the overlay mentioned earlier does not support this requirement.

(vii) Lack of Event Binding

The lack of event binding capability limits the multi-channel/multi-modal capabilities of the application: there is no way to associate some specific logic action to some specific physical action. This is especially critical if we want to offer a multi-modal/multi-channel access where different bindings are desirable (e.g., a key short cut for telephony help, a voice command for help and a key combination on the keyboard for help).

(viii) Peer

Further, prior art attempts also rely on the technique of peers for generating different user interfaces from the same underlying representation; by doing so, it does not address the problems of synchronized multi-modal interaction.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating an example of a CML authored application according to an embodiment of the present invention;

FIGS. 6A through 6C are diagrams illustrating a GUI welcome page, transformed from CML source code page, as viewed with an HTML browser;

FIG. 8 is a diagram illustrating a GUI welcome page, transformed from an HTML cosmetized CML source code page, as viewed with an HTML browser;

DETAILED DESCRIPTION OF PREFERRED EMBODIMENTS

The following description will illustrate the invention using a preferred specification of CML, a preferred multimodal browsing environment, and some exemplary applications for a better understanding of the invention. It should be understood, however, that the invention is not limited to these particular preferred implementations and exemplary applications. The invention is instead more generally applicable to any information access application regardless of the access protocol, modality, browser or device. Thus, the invention is more generally applicable to any information access situation in which it is desirable to provide synchronized, multi-modal, easy and convenient access of information to a user.

The detailed description is divided into the following sections for ease of reference: (I) CML Specification; and (II) Multimodal Browser Architecture to support, parse and render CML. Section I provides a detailed description of a preferred specification of CML according to the invention. Section II provides a detailed description of a preferred multimodal browsing environment implementing CML according to the invention.

I. CML Specification

The following description is a specification of a preferred embodiment of CML.

This section is divided into the following subsections for ease of reference: (A) Introduction; (B) Comparative Examples; (C) CML Syntax; (D) Namespaces; (E) CML Attributes; (F) CML Components; (G) Binding Events; (H) Grouping Gestures and Defining Focus; (I) Data Model and Data Types; (3) Accessing Environment; (K) CML Traversal Model; (L) Transforming CML to Specific User Interface Languages; (M) Cosmetization; and (M) CML Document Type Definition.

A. Introduction

Figure 1:
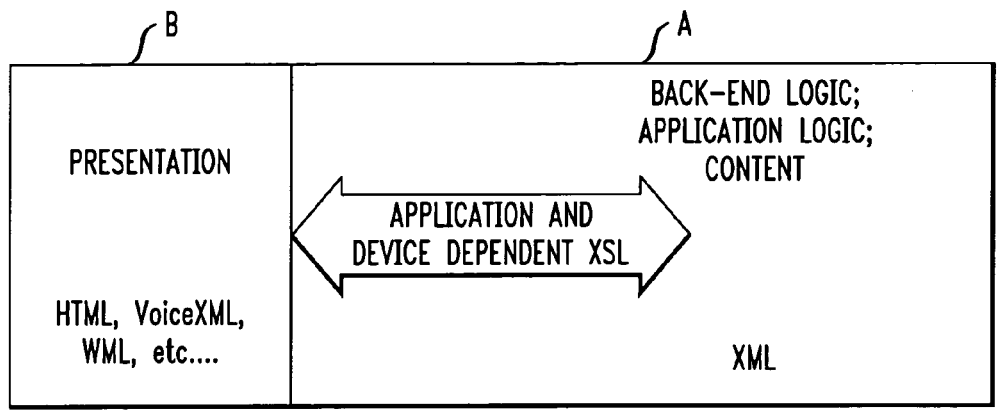
FIG. 1 is a diagram illustrating the conventional application programming approach.

As mentioned above, separating content from presentation in order to achieve content re-use is the conventionally accepted way of deploying information on the World Wide Web (WWW). This is illustrated in FIG. 1. As shown, the existing approach with respect to application authoring is to consider only two components: a content component (A) and a presentation component (B). In the current W3C architecture, such separation is achieved by representing content in XML that is then transformed to appropriate final-form presentations (e.g., HTML, VoiceXML, WML) via application and device dependent XSL transforms. However, critical disadvantages exist with this approach. Indeed, the XSL rules typically depend on the backend application or domain. As a result, authoring of an application is a multiple authoring exercise with design of the XML content and then design of XSL style sheet per application/page and per target device/channel. In addition, when style sheets are expected to be used to transcode from one ML to another, as previously mentioned, transcoding is typically often between two legacy languages (e.g., HTML to WML), and the original content has been built in HTML while following very strict rules of authoring. Indeed, this is enforceable only if within a given company, for a given web site. Even in those cases, it is hardly implementable, in general, because of missing information across markup languages or modalities in order to provide the corresponding components in other modalities (e.g., an HTML form or menu does not provide the information required to render it automatically by voice).

Figure 2:
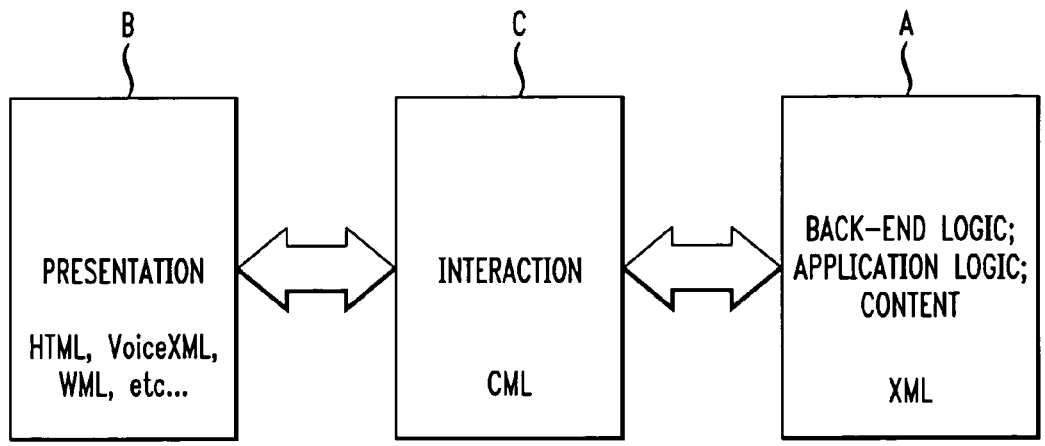
FIG. 2 is a diagram illustrating the interaction based application programming approach of the present invention.

CML is motivated by the realization that in addition to form (presentation) and content, there is a third component, i.e., interaction, that lies at the heart of turning static information presentations into interactive information. It is to be appreciated that static information is a very particular case where the user is passive and presented with all the information. This new paradigm is illustrated in FIG. 2. As shown, the present invention introduces the concept of programming by interaction wherein application authoring is broken into three components: content (A); presentation (B) and interaction (C). This new programming paradigm goes in pair with the development of a new programming environment, e.g., development tools, etc.

We refer to such "light-weight" information applications, or electronic information with small amounts embedded application intelligence, as "infoware" throughout this specification. Until now, such interaction has been represented partly within the presentational HTML, e.g., form elements, and partly within server-side logic encapsulated in servlets and CGI (Common Gate Interface) scripts. This combination has resulted in the creation of infoware or light-weight applications where the information content dominates. Good examples of infoware on today's WWW include e-businesses like Amazon.com.

As we move to a world where we interact with such infoware via multiple modalities, it is now time to achieve a clear separation between these three aspects of electronic content, namely, content, presentation, and interaction.

CML is based on the insight that all man-machine dialog can be broken down to an appropriate sequence of "conversational gestures" or modality-independent building blocks (components or elements) that can be appropriately combined to replace any interaction. CML encapsulates man-machine interaction in a modality-independent manner by encoding these basic building blocks in XML. Such CML encapsulations are later transformed to appropriate modality-specific user interfaces. This transformation is performed in a manner that achieves synchronization across multiple "controllers," i.e., browsers in today's WWW-centric world, as they manipulate modality-specific "views" of a single modality-independent "model." The terms "model," "view" and "controller," are well-known terms used in accordance with the classic MVC (model-view-controller) decomposition of computing, see, e.g., G. E. Krasner and S. T. Pope, "A Cookbook for Using the Model-View-Controller User Interface Paradigm in SmallTalk-80," Journal of Object-Oriented Programming, 1(3):26-49, August/September 1988, the disclosure of which is incorporated herein by reference. The result is uniform conversational behavior across a multiplicity of information appliances and coordinated, well-synchronized user interaction across a multiplicity of interface modalities.

B. Comparative Examples

Before providing a description of the specification of the CML preferred embodiment, we present some examples to illustrate fundamental principles of CML and programming by interaction. The examples refer to a "global cafe" site. Imagine a cafe that has decided to offer to its customers the possibility to pre-order their drinks prior to arriving the cafe or when in the cafe. As such, they fundamentally want to offer access to their information independently of the access channel.

Accordingly, a page is authored in CML. The CML code for generating this page is illustrated in FIG. 3 as CML code 10. The page fundamentally comprises a sequence of conversational gestures (note that the gestures here are taking some freedom from details of the actual CML specification, to be provided below, for the sake of providing a better understanding of the fundamental principles of CML and programming by interaction). The page may comprise the following:

(1) Title (shown as "gesture" 20 in FIG. 3): "Global Cafe" (i.e., a particular message to be rendered as a Title)

(2) A gesture message (shown as "gesture" 22 in FIG. 3): Would you like coffee, tea, milk or nothing?

(3) A gesture exclusive select out of a list (shown as "gesture" 24 in FIG. 3): the list is composed of the following items: coffee, tea, milk and nothing.

(4) A submit gesture (not expressly shown in FIG. 3).

Clearly, the page fully defines the complete interaction with the user without introducing any dependency on the target modality (i.e., type of access channel or access device). It also clearly illustrates the programming model of programming by interaction:

(i) The application is programmed by interaction: using elementary components of interaction, independently of the target modality:

(a) A gesture message: "Global Cafe."
(b) A gesture message: Would you like coffee, tea, milk or nothing?
(c) A gesture exclusive select out of a list.
(d) A submit gesture.

(ii) This is connected to the backend which is programmed/developed conventionally. In this example, the connection to the backend is illustrated by the list (coffee, tea, milk and nothing) that has been read in the backend database and added as argument to the list, either statically, when the page has been produced, or dynamically, when the pages have been dynamically generated on the server using backend logic.

(iii) At this stage, if needed, constraints, validations of the attributes/variables can be added, for example using the XFORM syntax. For example, if the page asks for the age of the user in order to offer alcoholic beverages, a constraint can easily be expressed that restricts or modifies the dialog if the users indicates that he is under age. This is not explicitly shown on the page.

(iv) The presentation can thereafter be cosmetized. In the present example, it is done by using the gesture title instead of a gesture message: modality independent cosmetization. Modality specific cosmetization can also be added, for example by adding HTML tags that specify the background (color or image) to use for the resulting HTML page. This will be ignored by the other target modalities or replaced by a "behavior" provided for the other modalities. For example, when an image is displayed in the HTML modality, a caption may be provided to be a rendering instead for the WML, VoiceXML, or other modalities.

(v) The resulting pages can now be rendered by appropriate browsers. Two models exist. Either CML pages are served to browsers that can parse and render CML content (see Case B below) or they are served to legacy browsers that can only handle legacy languages, e.g., HTML, WML, VoiceXML, etc. (see Case A below).

(a) Case A: This case is also known as the "multi-channel" case. The target browser is well-defined (identified at the HTTP connection for HTML browser), because of the address of the requester (wireless gateway or speech browser) or because of the request (i.e., HTML file request versus WML page request). When a page is requested, it is fetched in CML and transcoded on the fly using the gesture-based XSL transformation rules into the target ML.

(b) Case B: The target browser handles CML. Therefore, it knows exactly what are the modalities that it supports (single or multiple) as well as the rules required to optimally render a given gesture in its supported modalities. These gesture XSL transformation rules are advantageously something that has been programmed in the browser when the device was built or when the browser was ported to it. Clearly, it means that the most appropriate programmer with the appropriate information (i.e., knowing fully well the device) takes that responsibility.

(vi) In both cases, the CML application developer does not need to do anything. He/she can always assume that the platform/browser will appropriately handle the rendering.

(vii) The gestures are completely independent of the target modality. They depend also only on the gesture not on the backend business logic/domain or anything else. This is why the XSL rules can be stored on the browser.

(viii) The XSL rules render the gestures based on the target modality. In the present case this means:

(a) Title:
HTML: Bold, Header character displayed
WML: Single card display
VoiceXML: Welcoming prompt
(b) Message:
HTML: display in regular characters
WML: display in regular character (possibly on multiple cards)
VoiceXML: Generate a prompt message (text-to-speech or play back)

(c) Exclusive selection out of list:
HTML: Pull Down Menu
WML: Radio buttons
VoiceXML: Dialog (possibly Natural Language) to select in the menu (e.g., "You have that many items to select from. I will read the first three. Please select an item or say more for the next 3 . . . ").

Returning to FIG. 3, a visualization of the three example renderings that may be obtained in the global cafe application written in CML. Thus, from the CML code 10 comprising the gesture-based XSL transformations, an HTML rendering 12, a WML rendering 14, and a VoiceXML rendering 16 of the global cafe application are obtained.

(ix) When the transcoding is performed by a multi-modal/conversational browser (as described below), the gestures are uniquely identified using a node_id tag. This allows not only to produce the rendering in each registered modality (local or distributed), but also to provide very tight synchronization (i.e., on a gesture level or even sub-gestures levels, when it is a gesture for which this makes sense). For example, an event (I/O event) immediately impacts the state of the dialogs (i.e., the state as maintained in the multi-modal shell, for example, as in the above-referenced U.S. patent application Ser. No. 09/507,526) and the other modalities. Thus, such tight synchronization may exist between the HTML rendering 12 as may be supported by a personal digital assistant and the VoiceXML rendering 16 as may be supported by a conventional telephone.

Note that the gestures XSL transformation rules can be overwritten by the application developer indicating where they should be downloaded. They can also be overwritten by user, application or device preference from what would be otherwise the default behavior.

New gestures can also be added, in which case, the associated XSL rules must be provided (e.g., a URL where to get them).

C. CML Syntax

In a preferred embodiment of CML, CML syntax is XML compliant. CML instances are well-formed XML. CML processors may be implemented as validating XML processors based on device constraints.

(i) Special CML notes (1) Case Sensitivity
  CML clients and servers treat CML element and attribute names as being case sensitive. As a convention, all element and attribute names defined in this specification use lower-case. This convention is strictly imposed on all predefined element and attribute names.

(2) Content Model
  A CML instance consists of a sequence of XML elements. CML does not allow any pc data at top-level, i.e., all top-level children of a CML are necessarily elements.

(3) Sparse CMLs
  CML instances may be sparse; except attribute node_id, the top-level CML attributes and elements documented in this specification are required.

(4) Entity References
  All entity references in CML conform to the URI (Universal Resource Identifier) specification, see URI specification from the W3C at http://www.w3.org.

(ii) Terminology
  The terminology used to describe CML documents is defined in the body of this specification. The terms defined in the following list are used in building those definitions and describing the actions of a CML "processor." A CML processor generally refers to a processing device configured to execute CML code and associated applications. The terms are:

may—Conforming CML documents and processors are permitted to but need not behave as described.

must—Conforming CML documents and processors are required to behave as described; otherwise they are in error, as defined below.

error—A violation of the rules of this specification; results are undefined. Conforming software may detect and report an error and may recover from it.

fatal error—An error which a conforming CML processor must detect and report to the application.

D. Namespaces

This section details the use of namespaces within all sections of a CML instance. Note that all elements and attributes defined in this specification are implicitly in namespace cml, i.e., element name message in a CML instance occurring within a general XML document is visible to the processing application as cml:message; CML attribute node_id would be visible to the XML processor as cml:node_id. The subsequent paragraphs in this section define the rules for how namespace cml is further subdivided to avoid name collisions amongst CML clients.

All namespaces introduced by "unqualified" namespaces, e.g., vxml are implicitly in namespace com.ibm.cml.vxml. More generally, vendor specific namespaces use a vendor prefix that is constructed from the vendor's domain name—this is analogous to the scheme used by systems like Java.

CML also uses namespaces to allow field names and values from different pieces of infoware to coexist. Thus, the fully qualified name of field drink in application cafe is cafe.drink. An example application will be given below for this drink example. Note that all field names in CML are always fully qualified, i.e., there is no implicit hierarchy within field names based on the nesting level at which an associated gesture occurs.

E. CML Attributes

CML instances can have the following XML attributes. Unless stated otherwise, all attributes are optional.

(ii) title—Human-readable metadata string specifying a title for the CML instance.

(iii) name—Name used to establish a namespace for all field values instantiated within the CML instance. This attribute is required for CML instances that are intended to be reusable.

(iv) action—Specifies the URL (Uniform Resource Locator) that is the target action of the CML instance.

(v) style—URI of associated XSL style sheet. Unless specified, the CML interpreter defaults to a generic style sheet for transforming the modality-independent CML instance into modality-specific encodings. Attribute style allows CML creators to override or specialize system-wide style rules.

F. CML Components

A CML instance represents a "conversational gesture." As previously mentioned, a conversational gesture is a basic building block of a dialog and encapsulates the interaction logic in a modality independent manner. Complex conversational components (also referred to as dialog components or dialog modules) are constructed by aggregating more basic conversational gestures described in detail in subsequent subsections. These complex conversational components are usually task oriented, e.g., get a phone number, get an address, etc. CML descriptions of basic conversational gestures can nest to the desired level of complexity. Besides nesting, complex conversational components can be obtained by combining the basic conversational gestures in parallel and/or in sequence. Also, complex conversational components can be achieved by combining imperative gestures, e.g., Conversational Foundation Classes (CFCs), as will be explained below. Note also that though every CML gesture is an XML element, the converse is not true, i.e., every XML element defined in this specification is not a CML gesture. Many CML gestures use sub-elements to encapsulate substructure of a given gesture. In the subsequent sections, CML elements that are "gestures" are marked as such in the subsection entitled Gesture Message.

CML is designed to inter-operate with other emerging W3C standards such as, for example, XHTML (Extensible HyperText Markup Language). CML elements therefore re-use, rather than reinvent, elements from other markup languages like HTML, MATHML, etc., where appropriate. Such elements, when embedded in a CML instance, are fully qualified, e.g., html:em. The first subsection below introduces the common aspects of the various CML building blocks; subsequent subsections describe each building block in detail. Notice that each CML primitive captures a basic conversational gesture; XML attributes are used to encode more specialized behaviors. Thus, for example, asking a yes or no question is a CML primitive; a yes or no question requiring user confirmation is a refinement of this primitive.

It is to be appreciated that because CML allows overwriting gestures and extending gestures, it does not matter what is the basic set of CML gestures that is provided in a particular embodiments of CML. The set and rules provided herein allow for implementation of any legacy page and interaction.

CML gestures share the following common XML attributes:

action—Action to be performed upon completion of the gesture. Attribute action can be one of link, return or submit.

(i) Gesture Message

The conversational gesture message is used to convey informational messages to the user. The gesture message is typically rendered as a displayed string or a spoken prompt. Portions of the message to be spoken can be a function of the current state of the various pieces of infoware being hosted by the CML interpreter (see section on accessing environment state).

Example

<message node_id="1">

Your <html:em> checking</html:em> account balance is

<value name="banking.checking.balance"/> after transferring

<value name="banking.checking.transfer"/> to your

<value name="banking.creditCard.account"/>

</message>

Empty element value is used to splice in variable information from the current environment and is defined formally in the section on accessing environment state.

(ii) Gesture Help

The conversational gesture help is used to encapsulate contextual help to be displayed if the dialog runs into trouble. The gesture help is typically rendered as a displayed string or a spoken prompt. Portions of the message can be a function of the current state of the various pieces of infoware being hosted by the CML interpreter.

Example

<help node_id="1">

You can check your account balances by specifying a particular account. </help>

(iii) Final

CML element final is used within gestures to encapsulate actions to be taken upon successful completion of the encapsulated gesture, e.g., updating the enclosing environment based on user interaction.

(iv) Gesture Boolean: Yes Or No Questions

The conversational gesture boolean encapsulates typical yes or no questions. The gesture boolean encapsulates the prompt to be used as a message, as well as the default response, if any. Attributes require_confirmation, require_confirmation_if_no and require_confirmation_if_yes (all false by default) allow infoware applications to refine the dialog.

Example

5<boolean default="y"

node_id="1"

require_confirm_if_no="true">

<grammar type="text/jsgf">

(yes|yeah) {yes}|(no nay) {no}

</grammar>

<message>

Please confirm that you would like to stay at the

<value href="travelCenter.hotel.selected"/>

</message>

</boolean>

(v) Gesture Select

The conversational gesture select is used to encapsulate dialogues where the user is expected to pick from a set of choices. It encapsulates the prompt, the default selection, as well as the set of legal choices. Attributes of element select refine the gesture to achieve mutually exclusive select (visually rendered as a group of radio buttons), select from range, visually rendered as a scrollbar, etc. Sub-elements of select include:

choices
    Contains the list of possible choices—embedded either by value or by reference. Element choices contains a list of one or more choice elements as well as, at most, one default element that specifies the default selection, if any.

predicate
    Predicate encapsulating the test that the selection should satisfy.

help
    Help to be offered in case the dialog gets stuck.

error
    Contains a message to be used if the predicate fails.

Example

<select name="portfolio.fund"

node_id="1"

require predicate="yes">

<message node_id="2">

Which of your positions would you like to check?

</message>

<help>

You can specify the names of stocks or funds you own and we will report your current position.

</help>

<choices>

<var name="possibleChoices"/>

<default value="possibleChoices">

Check the position of all holdings</default>

</choices>

<predicate>

<condition> fund in possibleChoices

</condition>

<error>

Sorry, you do not appear to own any shares in

<var name="portfolio.fund"/>

</error>

</predicate>

</select>

(vi) Predicate

The element predicate is used in CML to encapsulate rules for validating the results of a particular conversational gesture. Test predicates are expressed as simple conditionals using the expression syntax and semantics defined in the xpath specification from the W3C, i.e., XML Path Language, W3C Proposed Recommendation, the disclosure of which is incorporated by reference herein, see http://www.w3.org/tr/xpath. Xpath specifies an expression syntax for accessing different portions of the document tree; validations that require calls to an application backend are handled separately.

Conversational gestures that include a predicate element qualify the action to be taken in case of a failed test via appropriate attributes.

(vii) Grammar

The CML sub-element grammar is modeled after element grammar in VoiceXML. Sub-element grammar encodes the grammar fragment; sub-element help encapsulates an appropriate help message to be played to the user to indicate what utterances are allowed. Where appropriate, CML gestures can provide grammar fragments that are assembled into more complex grammars by the CML interpreter.

The sub-elements grammar can be generalized as rules to process input, in particular, speech. These rules can be strict or can describe remote resources to be used for processing (URL), and provide arguments to pass to these resources that characterize what processing must be performed with what data file and how the result must be returned and to what address. In general, the grammar may be defined in line or defined via a URL.

In addition, it is also possible to declare this processing through an object tag, e.g., <object> . . . <object>. An object tag allows for loading Conversational Foundation Classes (CFCs) or Conversational Application Platform (CAP) services (see, e.g., the above-referenced PCT international patent application identified as PCT/US99/22927 wherein CAP is equivalent to CVM or Conversational Virtual Machine). Arguments can be passed to the object using XML attributes and variables. Results can be returned via similar variable place-holders. This allows these objects calls to access and modify the environment.

Objects can be qualified by attribute: execute that can take the values: parallel (executed in parallel, non blocking and it can notify on the fly effects on environment during its execution, prior to its completion), asynchronous (executed asynchronously, non blocking and notifies via event when completed to update the environment), blocking (the browser waits for completion of the object call, before updating the environment and continuing).

All the information needed to distribute the processing is described in the above-referenced PCT international patent application identified as PCT/US99/22925 which defines an architecture and protocols that allow distribution of the conversational applications. As such, the international patent application describes how such distribution can be done and how it allows, in the current case, to distribute the processing between a client browser and a server browser, as well as between local engines and server engines. This allows distribution of the processing of the input/output event across the network.

(viii) Gesture Menu

The gesture menu is a special case of gesture select. Gesture menu is used for encapsulating dialogues that help the user navigate through different subparts of an application. The same effect can be achieved using gesture select; however, having an explicit menu gesture enables authors to provide more semantic information about the reason why the select gesture is being used. Notice that in the example below, element menu is equivalent to element select with attribute action set to link.

Example

<menu name="main">

<choice value="#query">Ask a question</choice>

<choice value="#browse">Browse available categories</choice>

</menu>

The value of attribute value in each choice specifies the URI target for that choice.

(ix) Gesture User Identification

The conversational gesture user_identification is used to encapsulate user login and authentication. It is designed to be generic—and is specialized for specific user interaction environments via style rules.

Sub-elements user and identify encapsulate conversational gestures for obtaining the user name and authentication information. Element predicate provides the test for ascertaining if the user has authenticated successfully.

Example

<user_identify name="login"

require_predicate="yes"

on_fail="retry"

node_id="2">

<message node_id="3">

To use this service, you first need to login using your name and personal identification.

</message>

<user name="userid"

node_id="4"> what is your user id?

</user>

<identify name="pin"

node_id="4">

Please provide your user authentication.

</identify>

<predicate>

<condition> backend.authenticate(user id,pin)<

</condition>

</predicate>

<error>

Sorry, login for <var name="userid"/> with identification <var name="pin"/>failed.

</error>

</user_identify>

Variations on this gesture can be useful, e.g., explicit distinction between an identification gesture (e.g., identify who the person is), verification gesture (e.g., authentication of the claimant), speech biometrics (e.g., U.S. Pat. No. 5,897,616).

(x) Gesture Constrained Input

CML provides a number of pre-defined dialog components for obtaining user input such as dates and currencies. Typically, such input is more open-ended than the various selection gestures enumerated so far, and is realized in conventional visual interfaces via simple edit fields. However, encapsulating the domain-specific constraints for such input gestures is advantageous in constructing spoken interaction. Also, notice that such domain-specific constraints are typically implemented in today's WWW interfaces as client-side scripts within HTML pages that perform validation of user input before it is submitted to a server. In CML, we formalize those input gestures that are widely used on today's WWW for performing standard user-level tasks. CML also provides an extension mechanism that allows this basic set of input gestures to be extended over time. Note that all CML elements defined in this list are gestures:

(1) Date—Specify date (2) Time—Specify time.

(3) Currency—Specify currency amount.

(4) Credit card—Specify a credit card (including card type, card number and expiration date).

(5) Phone—Specify a telephone number.

(6) Email—Specify an e-mail address.

(7) URL—Specify a URL.

(8) Snail Address—Specify a "snail mail" address, including street, city/state/country and zip code.

The constrained input gesture can easily be extended by passing a grammar for other input fields. Note that this gesture can, in addition, be associated with transcoding rules that can be localized (i.e., internationalized and take regional flavors). This is a statement that is actually extendable to all the gesture and gesture based transcoding rules. Based on the location (i.e., calling number, origin of the IP address, preferences known about the user (on his local device/browser or transmitted through cookies to the server)), gestures can be expressed in another language (i.e., "Select yes or no" becomes "Selectionnez oui ou non" etc.) or adapted to the geography (e.g., zip code becomes postal code).

(xi) Gesture Unconstrained Input

The conversational gesture input is used to obtained user input where the input constraints are more complex (or perhaps non-existent). The gesture encapsulates the user prompt, application-level semantics about the item of information being requested, and possibly a predicate to test the validity of the input. Note that gesture input along with application-specific semantic constraints provides a means to extend the set of built-in constrained input gestures discussed in the previous section.

Example

<Input node_id="1">

<Message> . . . </Message>

20</Input>

(xii) Gesture Submit

The conversational gesture submit specifies the components from the environment to be packaged up and returned by the containing CML instance. It also encapsulates the prompt to be used as well as the target URI to which the encapsulated environment state is to be submitted.

Example

<submit target="uri">

<env name="location.state"/>

<env name="location.city"/>

</submit>

Sub-element env specifies components of the environment to be submitted by the enclosing gesture.

It is to be appreciate that while various CML attributes and components have been described above, other attributes and components will be presented and defined below in the course of describing further aspects of this embodiment of CML. It should be understood that other attributes and components may be defined in accordance with the teachings of the invention. That is, the invention is not intended to be limited to the particular attributes and components that are described in this detailed description.

G. Binding Events

CML provides a flexible, extensible mechanism for application authors to define "logical input events" and the association between such logical events and the actual "physical input events" that trigger the defined logical events. CML gestures declare logical events that they are prepared to handle via CML attribute trigger when a defined logical event is received, the closest enclosing gesture that has a matching event in its trigger list handles the event. The CML attribute trigger allows a gesture to be triggered by an event that is logically bound to it. This mechanism is best illustrated by an example. In the fragment of CML code shown below, the application defines help as a logical input event, binds this to physical events in two separate modalities, and finally declares a CML gesture to handle the help event.

Example:

```
<cml name="travel">
<bind-event        logical="help"
                   modality="dtmf"
                   physical="*"/>
<bind-event logical="help"
                   modality="qwerty"
                   physical="h"/>
<help name="help"
       trigger="help">
   Top-level application help
   </help>
   ...
</cml>
```

CML element bind-event takes three attributes:

(1) logical—Specifies the name of the logical event being defined.

(2) modality—Specifies the interaction modality in which the event is being bound.

(3) physical—Specifies physical event to bind to a logical event.

Input events that are not handled by CML gestures making up the application bubble up to the CML interpreter where standard platform events such as help are handled by a default handler. Bubble up means that search of a gesture that matches the trigger value is hierarchically bubbling up from the closest enclosing gesture to a higher one, until no gesture matches. In such a case, the trigger should be associated to a service offered by the browser, if not by the underlying platform (e.g., conversational virtual machine of PCT international patent application PCT/US99/22927). If none are met, the event is ignored or a default message is returned to the user explaining that the input was not understood (or not supported) and ignored. These, however, are implementation choices of the browser and underlying platform, not choices of the language. Note that mechanism bind-event is designed to override platform behavior—it is not meant to be used as the exclusive mechanism for mapping user input to CML gestures. Thus, using element bind-event to bind all valid spoken utterances in an application to the appropriate gestures is deprecated.

Further, note that omitting attribute modality in element bind-event results in associating the specified physical binding in all modalities. Omitting value of attribute physical in element bind-event declares a logical event that is unbound, i.e., not bound to a physical event.

H. Grouping Gestures And Defining Focus

Conversational gestures when rendered to specific modalities to realize a specific user interface are grouped appropriately to allow the user to interact with related portions of the interface. To understand this assertion, consider WWW applications that split the user interaction across several HTML pages, with related portions of the interface appearing on the same page. Similarly, speech interfaces allow users to specify any one of several related commands at a given time.

This form of grouping of gestures is best captured at the time the application is being authored. Such grouping may or may not be modality independent; CML allows application authors to encapsulate both forms of grouping.

Conversational gestures are grouped using the CML element group. Element group is further qualified by attributes id, modality and class. Attribute id is minimally required to group gestures. Attribute modality, if present, declares the specified grouping to be modality specific. Attribute class can be used in a manner analogous to the HTML class attribute to enable further selection of related elements whilst transcoding CML to languages like HTML.

By default, CML gestures enclosed in a single group element map to a user interface which enables the user to interact with any of the contained gestures—in the case of HTML, this results in the gestures being transcoded into a single page; in the case of VoiceXML, this results in the corresponding forms being made active in parallel.

Note that to activate groups of gestures in parallel is the way to implement mixed initiative NL interfaces: each command/query supported at a given time is characterized by a form built out of gestures (i.e., a group of gestures is called a form). When an input/output event occurs, the dialog manager provided by the browser or underlying platform will guess what are the gestures in the different forms that are activated and they allow to qualify their associated attributes (the environment variables associated to the gestures). When all the mandatory attributes of a form have received a value, the action is considered as disambiguated and executed. Note that extra constraints between the attributes can be expressed using XFORMS, as will be explained below. See also the above referenced PCT international patent application PCT/US99/23008 for discussion on parallel activation, and K. A. Papineni et al., "Free-flow dialog management using forms," Proc. Eurospeech, 1999, and K. Davies et al., "The conversational telephony system for financial applications," Proc. Eurospeech, 1999, the disclosure of which is incorporated by reference herein.

Instances of the element group cannot nest unless the inner group element specifies a value for attributes modality or class that is different from that specified in the enclosing element.

Figure 4:
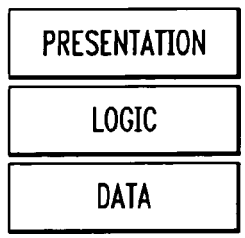
FIG. 4 is a diagram illustrating the XFORMS concept.

Efforts like XFORMS (http://www.w3.org/MarkUp/Forms/) have attempted to solve problems associated with existing markup languages by splitting forms into three layers (presentation, logic and data), as shown in FIG. 4, in an attempt to facilitate replacing the presentation for different kinds of browsers (however, XFORMS fails to address different modalities), while preserving the same backend. XFORMS data layer allows the application developer to define the data model for the form. The developer can use built-in data types or roll his own. XFORMS are building the data types on top of the work being done on XML Schemas. The logic layer allows the application developer to define dependencies between fields, for example, for running totals, or where one field requires another to be filed in. XFORMS supports a light-weight expression syntax, building upon widespread familiarity with spread sheets and existing forms packages. The application developer is still able to call out the scripts, when extra flexibility is needed. The presentation layer is consists of markup for forms controls and other HTML markup, where each control is bound to a field in the data model. "Getter" and "setter" functions allow the presentation to match the user's preferences, e.g., for dates and currencies, while retaining a canonical representation internally, thereby simplifying form processing. The same data field can have more than one presentation control bound to it. Changing the value in any of the controls then automatically updates all of the others.

Figure 5A:
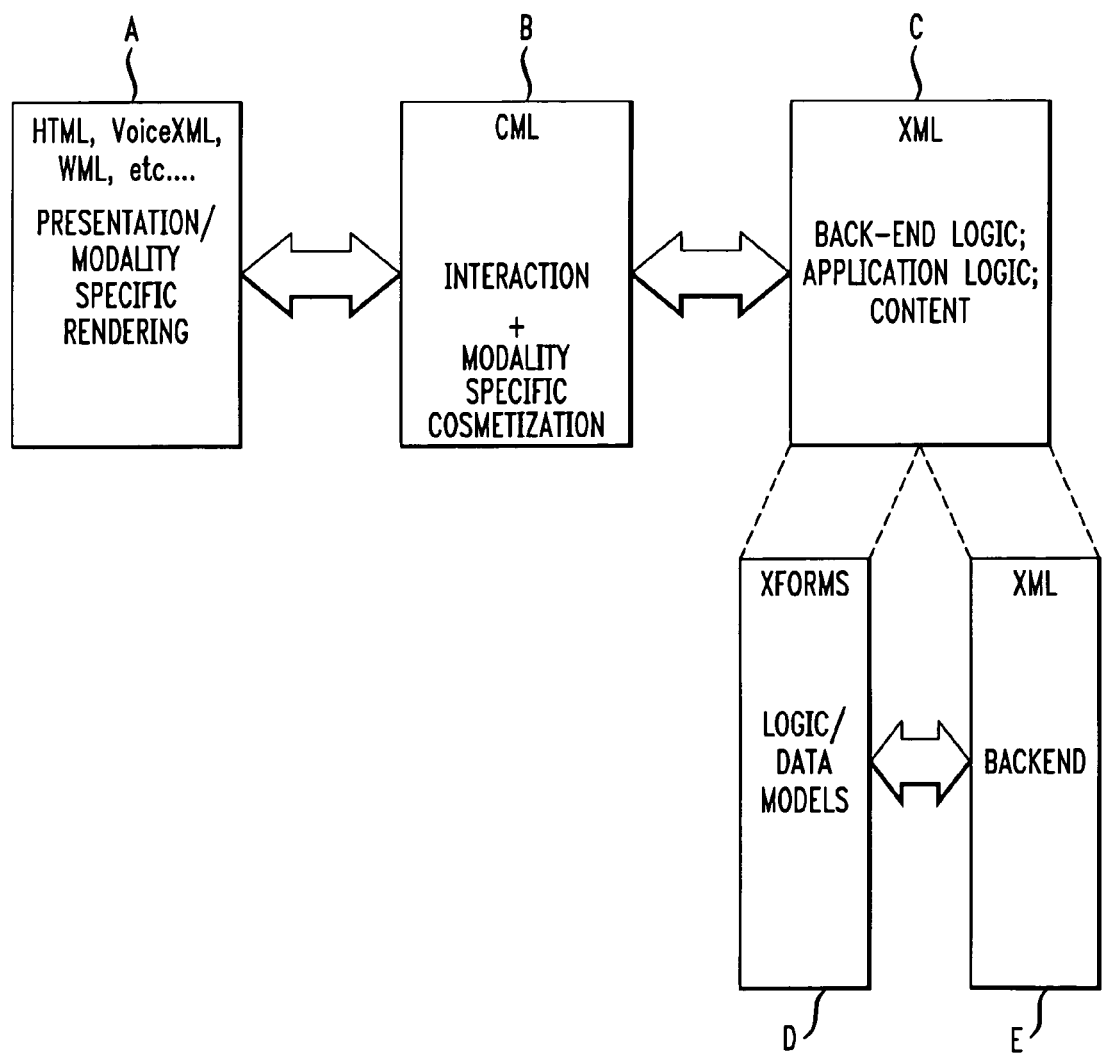
FIGS. 5A and 5B are diagrams illustrating the use of XFORMS in the interaction based programming approach of the present invention.
Figure 5B:
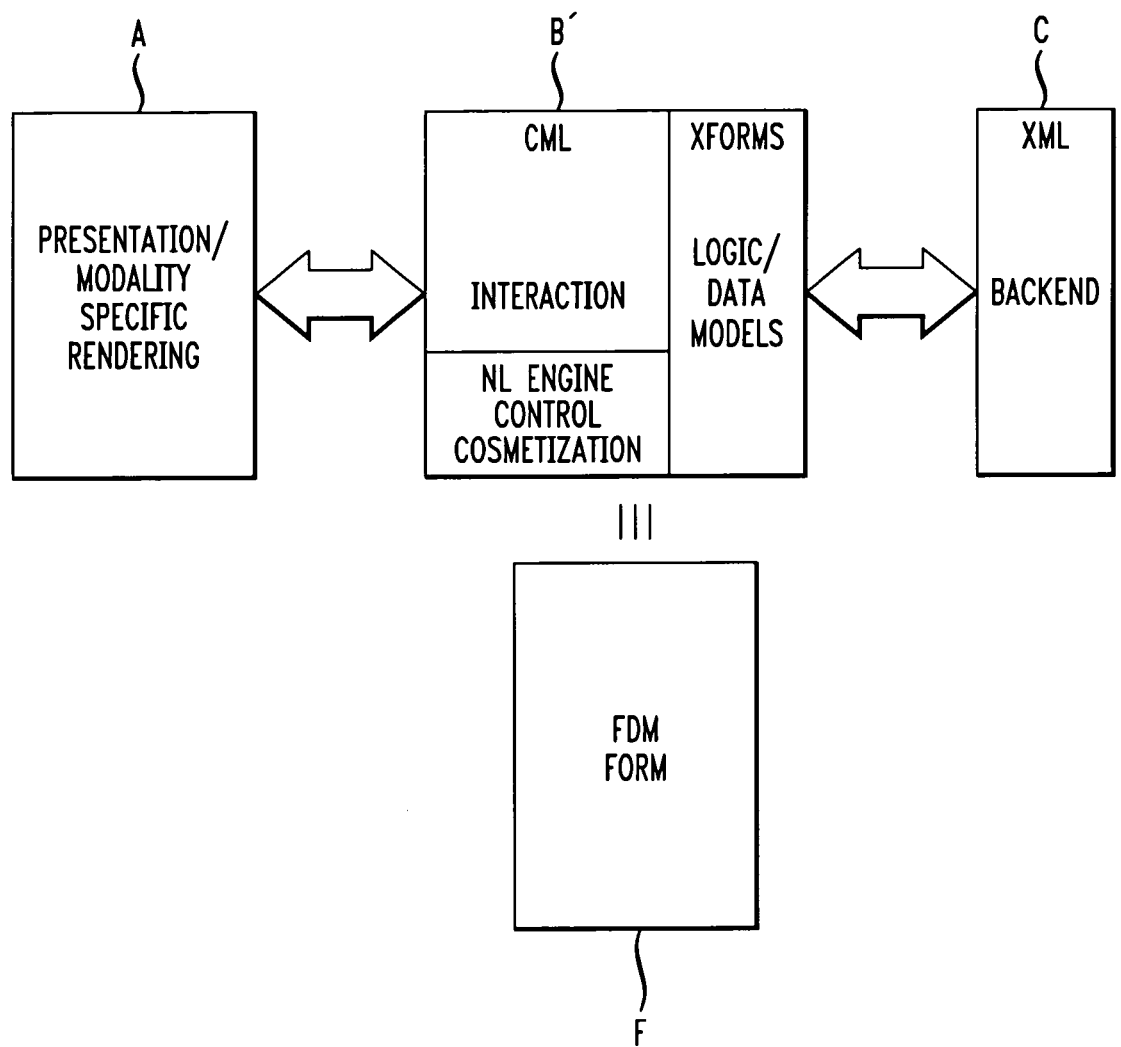

As explained herein, XFORMS provides a back-end mechanism for separating out data from presentation. CML provides a mechanism to further separate the logic and presentation part into presentation rendering (i.e., modality-dependent rendering with no interaction information)/interaction (plus possible modality dependent cosmetic inputs)/content (i.e., backend data plus logic information minus all the interaction related logic components). This inventive concept is illustrated in FIG. 5A. As previously explained, the programming paradigm of the invention separates presentation/modality specific rendering A, interaction B, and content and backend/application logic C. FIG. 5A also illustrates the backend mechanism of XFORMS, as mentioned above, where data D is separated from the backend E. FIG. 5B represents how a form based mixed initiative NLU (natural language understanding) application is written in CML. Leters A and C denote the same items as in FIG. 5A. In the block denoted as B', the interaction/dialog information is described in terms of CML. This part describes the interactions (mandatory and optional) that need to occur in order to realize each of the activable transactions. To this you add an XFORMS component that captures constraint and data models associated to the underlying attribute data structure. The engine control and cosmetization part capture additional control parameters that are used to optimize the behavior of the conversational engines, in particular the dialog manager and NLU engines. Note that the CML portions can be used for rendering in other modalities as described earlier. Block F denotes an exemplary form (e.g., a mutual fund demo form) that may be employed in accordance with block B'.

I. Data Model And Data Types

CML defines data-model or data-type primitives in the manner specified by the results of the W3C work on XML Schema and XML forms, see http://www.w3.org.

J. Accessing Environment

CML gestures define a collection of variables collectively called the "environment." As the CML document is traversed, variables in the environment are bound to the values resulting from successful user interaction. The environment can be accessed and manipulated within CML gestures via elements var, value and assign, as will be explained below. Note that all such names are always fully qualified.

(i) var—Element var declares (and optionally) initializes a variable (assigns it an initial value) in the current environment. Attribute name specifies the variable name. An initial value may be specified using the same syntax as specified for element assign, see below.

(ii) assign—Element assign assigns a value to a variable that already exists in the environment. That is, element assign is used to bind values in the environment. Attribute name specifies the variable to be bound. The value to be bound may be specified either as the value of attribute expr using the same expression syntax as used by xpath; alternatively, the value to be assigned may be specified as the contents of element assign. Element assign is typically used to bind or update intermediate variables that are not set by direct user interaction.

(iii) value—Element value retrieves the value of a defined variable. That is, attribute name of empty element value specifies the variable whose value is to be looked up in the environment. Value of attribute name may be a partially or fully qualified name (see section above on Namespaces) and is interpreted in the context of the containing CML gesture.

Note that as defined above, variables must be declared before they can be assigned.

K. CML Traversal Model

Infoware authored in CML is hosted by a conversational shell that mediates amongst multiple user agents—hereafter referred to as the CML interpreter. It is to be appreciated that the traversal model will be further discussed and illustrated in the context of FIGS. 10 and 11. User interaction proceeds by the CML interpreter mapping CML instances to appropriate modality-specific languages such as HTML and VoiceXML. These modality-specific representations are handed to the appropriate user agents which render modality-specific versions of the dialog.

The transformation from CML to modality-specific representations is preferably governed by XSL transformation rules (XSLT). Note that other transformation mechanisms can be used. XSLT is merely a method proposed for a preferred embodiment. For example, JSP—Java Server Pages or Java Beans can be used, as well as other techniques which transform, based on rules, the gestures to their target rendering. An example of such implementation is: for each gesture, we associate a java bean. The java bean carries its own rendering in each modality (through JSP). Thus, the invention is not limited to XSLT. In any case, these XSL rules are modality-specific. In the process of mapping the CML instance to an appropriate modality-specific representation, the XSL rules add the necessary information needed to realize modality-specific user interaction. As an example, when translating element select to VoiceXML, the relevant XSL transformation rule handles the generation of the grammar that covers the valid choices for that conversational gesture.

The process of transforming CML instances to modality-specific representations such as HTML may result in a single CML node mapping to a collection of nodes in the output representation. To help synchronize across these various representations, CML attribute node_id is applied to all output nodes resulting from a given CML node. When a given CML instance is mapped to different representations, e.g., HTML and VoiceXML by the appropriate modality-specific XSL rules, the shape of the tree in the output is likely to vary amongst the various modalities. However, attribute node_id allows us to synchronize amongst these representations by providing a conceptual backlink from each modality-specific representation to the originating CML node. In the above-referenced U.S. provisional patent application 60/128,081, a description is provided of how to develop a platform (the multi-modal shell) able to support tight multi-modal applications. The mechanism operates as follows. Each modality registers with the multi-modal shell the commands that it supports and the impact that their execution will have on the other registered modalities. Clearly, in the current case, upon parsing the CML page and transcoding the gestures, each gesture is kept in a data structure (i.e., the table) in the multi-modal shell. Upon an I/O event in a given modality, the node_id information is used to find the activated gesture and from the table (i.e., the CML document dialog tree), it is immediate to find the effect on the activated modality as well as the other modality (i.e., update of each view or fetch of a new page on the CML server).

As user interaction proceeds, variables defined in the environment by the current CML instance get bound to validated values. This binding happens first in one of the registered modality-specific user agents. The registered user agent sends an appropriate message to the conversational shell comprising of the updated environment and the node_id of the gesture that was just completed. Once the updated binding has been propagated to the CML interpreter, it messages all registered user agents with the node_id of the gesture just completed. Registered user agents update their presentation upon receiving this message by first querying the CML interpreter for the portion of the environment that affects their presentation.

L. Transforming CML to Specific User Interface Languages

CML is transformed into user interface (ui) specific encodings, e.g., HTML, via transformation rules expressed in XSL. This section begins with some background material on XSL transformations and then presents examples on how XSL is used in the context of CML and multi-modal browsers according to the invention.

(i) XSL Transformations Background Information

The W3C XSL transformations (xslt) specification has been released as a Proposed Recommendation: *XSL Transformations (xslt) Version* 1.0, reference: W3C Proposed Recommendation 8 Oct. 1999, edited by James Clark, the disclosure of which is incorporated by reference herein. The above-referenced W3C Proposed Recommendation is part of the W3C Style activity. Specifically, the xslt specification defines the syntax and semantics of xslt, which is a language for transforming XML documents into other XML documents. xslt is designed for use as part of XSL, which is a stylesheet language for XML. A transformation in the xslt language is expressed as a well-formed XML document conforming to the Namespaces in the XML Recommendation, which may include both elements that are defined by xslt and elements that are not defined by xslt. A transformation expressed in xslt describes rules for transforming a source tree into a result tree. The transformation is achieved by associating patterns with templates. A pattern is matched against elements in the source tree. A template is instantiated to create part of the result tree. The result tree is separate from the source tree. The structure of the result tree can be completely different from the structure of the source tree. In constructing the result tree, elements from the source tree can be filtered and reordered, and arbitrary structure can be added. A transformation expressed in xslt is called a stylesheet. The xslt specification is available in both XML and HTML formats.

(ii) XSL Transformations Examples

The following are coding examples illustrating CML code, XSL transformation rules, and the HTML, WML and VoiceXML code resulting from the respective transformations.

The following code illustrates a full example of a page written in CML and the different gesture-based XSL rules that have been used to produce legacy ML pages (respectively, HTML, VoiceXML and WML). Each page is associated to a particular rendering as illustrated by the following figures. The example is of a site that offers access to different information services: News, Business, Sports, Travel, Weather and Show Business.

(a) CML Code

This describes the source CML page associated with the example:

```
<!--$Id: cnn.cml,v 1.19 2000/02/01 Exp $-->
<!--Description: CNN Mobile In cml -->
<cml name="cnn"
        node_id="1"
        title="CNN Mobile News">
  <menu name="cnn.command"
        node_id="2" >
        <choices node_id="3">
          <default value="#cnn.query">Select News Stories</default>
          <choice value="#cnn.exit"
                require_confirmation="true">
             Exit </choice>
          <choice value="#cnn.applicationHelp">Help</choice>
        <choices>
</menu>
<cml name="cnn.applicationHelp"
        title="About CNN Mobile"
        node_id="4"
        action="return">
  <message
             node id="5">
        This application allows you to select and view CNN news stories
  </message>
</cml>
<cml name="cnn.exit"
   node id="6"
   title="Exit CNN Mobile News"
        action="submit">
   <message node_id="60">
        Thankyou for using the CNN news service
   </message>
</cml>
<group node_id="7"
        groupId="query">
<cml name="cnn.query"
        title="Search CNN Mobile News"
        node_id="8">
  <menu name="cnn.query.topic"
        node_id="11"
        title="Topic Selection">
     <choices node_id="12" >
        <choice value="#cnn.query.news"> News </choice>
           <choice value="#cnn.query.business"> Business </choice>
        <choice value="#cnn.query.sports">
           <grammar> (sport | sports" </grammar>
           Sports
        </choice>
        <choice value="#cnn.query.travel"> Travel </choice>
        <choice value="#cnn.query.weather"> Weather </choice>
        <choice value="#cnn.query.show">
           <grammar > show [business] </grammar>
           Show Business
        </choice>
     </choices>
  </menu>
</cml>
<cml name="cnn.query.news"
        title="News Channel"
        node_id="13"
        action="submit">
   <select name="cnn.query.part">
      <message node_id="9" >
         Which part of today's news would you like to
         read?</message>
      <choices
             node_id="10" >
         <choice value="h"> Headlines</choice>
         <choice value="1"> first story </choice>
             <choice value="2"> second story </choice>
```

```
            <choice value="3"> third story </choice>
          </choices>
      </select>
      <select name="cnn.query.interest">
          <message node_id="14" >
              Which news category would you like to read?
          </message>
              <choices node_id="15" >
              <choice value="business">
                  <grammar type="text/jsgf">
                      business {BIZ}</grammar>
                      Business
              </choice>
              <choice value="africa">
                  Africa</choice>
              <choice value="world"> World </choice>
              <choice value="United states"> United states </choice>
              <choice value="europe"> Europe </choice>
              <choice value="Asia"> Asia</choice>
              <choice value="me"> Middle East</choice>
              <choice value="america"> America </choice>
              </choices>
      </select>
</cml>
<cml name="cnn.query.business"
      title="Business Channel"
      action="submit"
      node_id="16" >
      <select name="cnn.query.part">
          <message node_id="9" >
          Which part of today's news would you like to read?</message>
          <choices
                  node_id="10" >
              <choice value="h"> Headlines</choice>
              <choice value="1"> first story </choice>
              <choice value="2"> second story </choice>
              <choice value="3"> third story </choice>
          </choices>
      </select>
      <select name="cnn.query.interest">
          <message node_id="17">
          Which business category would you like to read?</message>
          <choices node_id="IS">
              <choice value="NEWS"> news </choice>
              <choice value="IN"> indexes </choice>
              <choice value="CU"> exchange rates </choice>
              <choice value="MET"> metals </choice>
          </choices>
      </select>
</cml>
<cml name="cnn.query.weather"
      title="Weather Channel"
      action="submit"
      node_id="19" >
      <select name="cnn.query.part">
          <message node_id="9" >
          Which part of today's news would you like to read?</message>
          <choices
                  node_id="10" >
              <choice value="h"> Headlines</choice>
              <choice value="1"> first story </choice>
              <choice value="2"> second story </choice>
              <choice value="3"> third story </choice>
          </choices>
      </select>
      <select name="cnn.query.interest">
          <message node_id="20">
          Which region are you interested in?</message>
      <choices node_id="21">
          <choice value="us"> United states </choice>
          <choice value="europe">
              <grammar type="text/jsgf"> (euro | Europe) </grammar>
              Europe
          </choice>
          <choice value="JP"> Japan </choice>
          <choice value="AU"> Australia </choice>
          <choice value="AS"> Asia </choice>
      </choices>
  </select>
</cml>
<cml name="cnn.query.travel"
      title="Travel Section" action="submit"
      node_id="522" >
      <select name="cnn.query.part">
          <message node_id="9" >
          Which part of today's news would you like to read?</message>
          <choices
                  node_id="10" >
              <choice value="h"> Headlines</choice>
              <choice value="1"> first story </choice>
              <choice value="2"> second story </choice>
              <choice value="3"> third story </choice>
          </choices>
      </select>
      <select name="cnn.query.interest">
          <message node_id="23">
          Which city do you want to visit?</message>
          <choices node_id="24">
              <choice value="AMSTERDAM">AMSTERDAM</choice>
              <choice value="COPENHAGEN">COPENHAGEN</choice>
              <choice value="HELSINKI">HELSINKI</choice>
              <choice value="HONGKONG">HONGKONG</choice>
              <choice value="LONDON">LONDON</choice>
              <choice value="OSLO">OSLO</choice>
              <choice value="PRAGUE">PRAGUE</choice>
              <choice value="SINGAPORE">SINGAPORE</choice>
              <choice value="STOCKHOLM">STOCKHOLM</choice>
              <choice value="SYDNEY">SYDNEY</choice>
          </choices>
      </select>
</cml>
<cml name="cnn.query.sports"
      action="submit"
      title="Sports Channel"
      node_id="25" >
      <select name="cnn.query.part">
          <message node_id="9" >
          Which part of today's news would you like to read?</message>
          <choices
                  node_id="10" >
              <choice value="h"> Headlines</choice>
              <choice value="1"> first story </choice>
              <choice value="2"> second story </choice>
              <choice value="3"> third story </choice>
          </choices>
      </select>
      <select name="cnn.query.interest">
          <message node_id="26">
          What sports are you interested in?</message>
          <choices node_id="27">
              <choice value="AS"> Asia </choice>
              <choice value="w"> world </choice>
              <choice value="eut"> europe </choice>
              <choice value="us"> united states </choice>
              <choice value="nba"> NBA </choice>
              <choice value="nkl"> nbl </choice>
              <choice value="EF"> Europoean football </choice>
          </choices>
      </select>
</cml>
<submit target="htUp://raman.almaden.ibm.com/cgi-bin/cnn.cgi">
      <message node_id="28">
          executing <value name="cnn.command"/>
          for <value name="cnn.query.part"/>
          stories about <value name= "cnn.query.interest"/>
          from topic <value name="cnn.query.topic"/>
      </message>
      <env name="cnn.command"/>
      <env name="cnn.query.topic"/>
      <env name="cnn.query.interest"/>
      <env name="cnn.query.part"/>
</submit>
</group>
<submit target="http://raman.almaden.ibm.com/cgi-bin/cnn.cgi">
</submit>
</cml>
```

(b) Gesture XSL

The following example illustrates the CML to HTML gesture-based XSL rules that are used to transcode, gesture by gesture, a CML page into an HTML page. All the gesture-based transcoding rules required to transcode any possible CML page are not present. It is to be considered as an illustration of the method. The XSL syntax follows conventional XSLT rules, see, e.g., http://www.w3.org/1999/XSL/Transform.

```
!--$Id: cml2html.xel,v 1.8 1999/11/12 20:01:11 $-->
<!--Description: Transform CML to HTML -->
<xsl:stylesheet xmlns:xcl="http://www.w3.org/1999/XSL/Transform"
        xmlns:xt="htCp://www.jclark.com/xt"
        version="1.0"
        extension-element-prefixes="xt">
<xsl:include href="html/cml.xsl"/>
<xsl:include href="html/environment.xsl"/>
<xsl:include href="html/output.xsl"/>
<xel:include href="html/selections.xsl"/>
<xsl:include href="common/identity.xsl"/>
</xsl:stylesheet>
<!--$Id: cml.xel,v 1.13 2000/01/31 Exp $-->
<!--Description: Translate CML element to HTML -->
<!-- Handle case of CML element being the top-level element -->
<xsl:stylesheet
        xmlUs:xsl="http://www.w3.org/1999/XSL/Transform">
<xsl:output method="html"/>
<xsl:template match="/cml">
  <html>
    <head>
      <META http-equiv="Content-Type" content="text/html;
        charset=iso-8859-1"/>
      <title>-<xsl:value-of select="@title"/></title>
    </head>
    <body>
      <h1>
        <a name="{@name}">
          <xel:value-of select="@title"/>
        </a>
      </h1>
      <xsl:choose>
        <xsl:when test="@action='submit'">
          <form>
            <xsl:attribute name="node_id">
              <xsl:value-of select="@node_id"/>
            </xsl:attribute>
            <xsl:attribute name="action">
              <xsl:value-of select="submit/@target"/>
            </xsl:attribute>
            <xsl:apply-templates/>
            <p>
              <INPUT TYPE="SUBMIT" VALUE="@name"/>
            </p>
          </form>
        </xsl:when>
        <xsl:otherwise>
          <div node_id="{@node_id}"
               name="{@name}">
            <xsl:apply-templates/>
          </div>
        </xsl:otherwise>
      </xsl:choose>
    </body>
  </html>
</xsl:template>
<xsl:template match="cml[@action='submit']">
  <h2><a name="{@name}">
    <xsl:value-of select="@title"/></a>
  </h2>
  <form>
    <xsl:attribute name="node_id">
      <xsl:value-of select="@node_id"/>
    </xsl:attribute>
    <xsl:attribute name="action">
      <!-- for rea, we should process submit node to
           cons up target uri -->
      <xsl:value-of select="../submit/@target"/>
```

-continued

```
    </xsl:attribute>
    <xcl:apply-templates/>
    <p>
      <INPUT TYPE="SUBMIT" VALUE="{@name}"/>
    </P>
  </form>
</xsl:template>
<xsl:template match="cml">
  <h2 node_id="{@node_id}">
    <a name="{@name}">
      <xsl:value-of select="@title"/><a>
  </hr>
  <xsl:apply-templates/>
  <xSl:if test="@action'return'">
    <p>
      <a name="{concat('#',/cml/@name)}">
        Back
      </a>
    </ p>
  <xsl:if>
</xsl:template>
<xsl:template match="group">
  <div groupId="{@groupId}"
       modality="{@modality}"
       class="{@class}">
    <xsl:apply-templates/>
  </div>
</xsl template>
<xsl:template match="submit"/>
</xsl:stylesheet>
<!--$Id: environment.xsl,v 1.2 2000/02/01 Exp $ -->
<!--Description: Process CML environment constructs -->
<xsl:stylesheet
        xmlns:xsl="http://www.w3.org/1999/XSL/Transform">
  <xsl:template match="final">
    <xsl:apply-templates/>
  </xsl:template>
  <xsl:template match="var">
    <input type="hidden" name="{@name}" value="{@expr}"/>
  </xsl:template>
  <xsl:template match="assign">
    <input name="{@name}" type="hidden">
      <xsl:attribute name="value">
        <xsl:choose>
          <xsl:when test="@expr="">
            <xsl:value-of select="./node( )"/>
          </xsl:when>
          <xsl:otherwise>
            <xsl:value-of select="@expr"/>
          </xsl:otherwise>
        </xsl:choose>
      </xsl attribute>
    </input>
  </xsl:template>
  <xsl:template match="value">
    <b><xsl:value-of select="@name"/><b>
  </xsl:template>
</xsl:stylesheet>
<!--$Id: output.xsl,v 1.3 1999/11/12 20:07:23 Exp $-->
<!-- Description: Transformation rules for CML gestures that -->
<!-- primarily output information -->
<xsl:stylesheet xmlns:xsl="http://www.w3.org/1999/XSL/Transform">
  <xsl:template match="message">
    <P>
      <<xsl:attribute name="node_id">
        <xsl:value-of select="169 node_id"/>
      </xsl:attribute>
      <xsl:apply-templates/>
    </P>
  </xsl:template>
  <!-- eventually generate pop-up help via javascript -->
  <xsl:template match="help">
    <P>
      <xsl:attribute name="node_id">
        <xsl:value-of select="@node_id"/>
      </xsl:attribute>
      <xsl apply-templates/>
    </P>
  </xsl:template>
```

-continued

```
</xsl stylesheet>
<!--$Id: selections.xsl,v 1.8 2000/01/31 17:50:34 $-->
<!--Descriptions: Transform CML selection gestures to HTML -->
<xsl:stylesheet
        xmlus:xsl="http://www.w3.org/1999/XSL/Transform">
    <xsl:template match="menu">
      <xsl:if test="@title!=''">
        <h2>
          <a name="#{@name}">
             <xsl:value-of select="@title"/>
          </a>
        </h2>
      </xsl:if>
      <xsl:apply-templates select="message"/>
      <ol node_id="{@node_id}">
        <xsl:for-each select="choices/choice|choices/default">
          <li>
            <a href="{@value}">
              <xsl:apply-templates/>
            </a>
          </li>
        </xsl:for-each>
      </ol>
</xsl:template>
<xsl:template match="select">
    <xsl:apply-templates select="message"/>
    <select name="{@name}">
      <xsl:apply-templates select="choices"/>
    <select>
    <P/>
</xsl:template>
<xsl:template match="choices">
    <xsl:apply-templates/>
</xsl:template>
<xsl:template match="choice|default">
        <option>
        <xsl:attribute name="value">
          <xsl:value-of select="@value"/>
        </xsl:attribute>
        <xsl:if test="name(.)='default'">
          <xsl:attribute name="checked"/>
        </xsl:if>
        <xsl:apply-templates/>
        </option>
    <xsl:template>
    <xsl:template match="grammar" />
</xsl:stylesheet>
<!--$Id: identity.xsl,v 1.1 1999/11/08 18:05:26 Exp 8-->
<!-- Description: Identity transform for use in other sheets-->
<xsl:stylesheet xmlns:xsl="http://www.w3.org/1999/XSL/Transform">
    <xsl:template match="*|@*">
      <xsl:value-of select="."/>
      <xsl:copy>
         <xsl:apply-templates select="@*"/>
         <xsl:apply-templates select="node( )"/>
      </xsl:copy>
    </xsl:template>
</xsl:stylesheet>
```

Figure 6C:
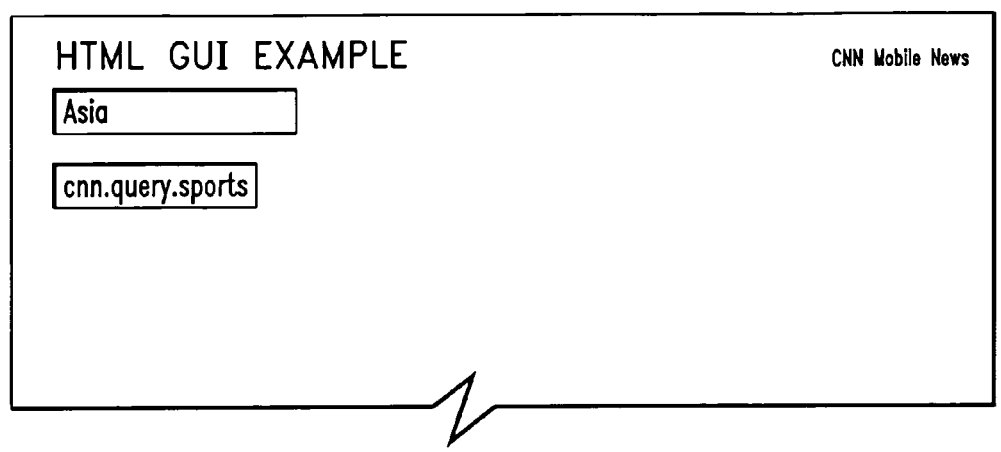

(c) HTML Sources The following describes the HTML source page obtained by applying the (CML to HTML) XSL sources on the CML source page. The resulting welcome GUI page as viewed with a HTML browser is illustrated in FIGS. 6A through 6C.

```
<!DOCTYPE html PUBLIC "-/M13C//DTD HTML 4.0 Transitional//EN">
<html>
<head>
<META http-equiv="Content-Type" content="text/html; charset=iso-8859-1">
<title>CNN Mobile News</title>
</head>
<body>
<h1>
<a name="cnn">CNN Mobile News</a>
</h1>
<divnode_id="1" name="cnn">
<ol node_id="2">
<li>
<a href="#cnn.query">Select News Stories</a>
</li>
<li>
<a href="#cnn.exit">
  Exit </a>
</li>
<li>
<a href="#cnn.applicationHelp">Help</a>
</li>
</ol>
    <h2 node_id="4">
<a name="cnn.applicationHelp">About CNN Mobile</a>
</h2>
    <P node_id="5">
    This application allows you to select and view CNN news stories
    </P>
<p>
<a name="#cnn">
  Back
  </a>
</p>
    <h2>
<a name="cnn.exit">Exit CNN Mobile News</a>
</h2>
<form node_id="6" action="http://raman.almaden.ibm.com/cgi-bin/cnn.cgi?command=exit">
    <P node_id="60">
    Thank you for using the CNN news service
    </P>
<p>
<INPUT TYPE="SUBMIT" VALUE="cnn.exit">
</p>
</form>
    <div groupId="query" modality=" " class=" ">
    <h2 node_id="8">
<a name="cnn.query">Search CNN Mobile News</a>
</h2>
    <h2>
<a name="#cnn.query.topic">Topic Selection</a>
</h2>
<ol node_id="11">
<li>
```

```
<a href="#cnn.query.news">News </a>
</li>
<li>
<a href="#cnn.query.business">Business </a>
</li>
<li>
<a href="#cnn.query.sports">
    Sports
    </a>
</li>
<li>
<a href="#cnn.query.travel">Travel </a>
</li>
<li>
<a href="#cnn.query.weather">Weather </a>
</li>
<li>
<a href="#cnn.query.show">
    Show Business
    </a>
</li>
</ol>
    <h2>
<a name="cnn.query.news"">News Channel</a>
</h2>
<form node_id="13"
action="http://raman.almaden.ibm.com/cgi-bin/
cnn.cgi?command=search">
    <P node_id="9">
    Which part of today's news would you like to read?<P>
<select name="cnn.query.part">
    <option value="h">Headlines</option>
    <option value="1">first story </option>
    <option value="2">second story </option>
    <option value="3">third story </option>
    </select>
<p>
</p>
    <P node_id="14">
    Which news category would you like to read?
    </P>
<select name="cnn.query.interest">
    <option value="business">
    Business
    </option>
    <option value="africa">
    Africa</option>
    <option value="world">World </option>
    <option value="United states">United states </option>
    <option value="europe">Europe </option>
    <option value="Asia">Asia</option>
    <option value="me">Middle East</option>
    <option value="america">America </option>
    </select>

<p>
</p>
    <p>
<INPUT TYPE="SUBMIT" VALUE="cnn.query.news">
</p>
</form>
    <h2>
<a name="cnn.query.business">Business Channel<a>
</h2>
<form node_id="16" action="http://raman.almaden.ibm.com/cgi-bin/cnn.cgi?command=search">
    <P node_id="9">
    Which part of today's news would you like to read?</P>
<select name="cnn.query.part">
    <option value="h">Headlines</option>
    <option value="1">first story </option>
    <option value="2">second story </option>
    <option value="3">third story </option>
    </select>
<p>
</p>
    <P node_id="17">
    Which business category would you like to read?</P>
<select name="cnn.query.interest">
    <option value="NEWS">news </option>
    <option value="IN">indexes </option>
    <option value="CU">exchange rates </option>
    <option value="MET">metals </option>
    </select>
<p>
</p>
    <p>
<INPUT TYPE="SUBMIT" VALUE="cnn.query.business">
</P>
</form>
    <h2>
<a name="cnn.query.weather">Weather Channel</a>
<h2>
<form node_id="19" action="http://raman.almaden.ibm.com/cgi-bin/cnn.cgi?command=search">
    <P node_id="9">
    Which part of today's news would you like to read?</P>
<select name="cnn.query.part">
    <option value="h">Headlines</option>
    <option value="1">f~rst story </option>
    <option value="2">second story </option>
    <option value="3">third story </option>
    </select>
<p>
</p>
    <P node_id="20">
    Which region are you interested in?</P>
<select name="cnn.query.interest">
    <option value="us">United states </option>
    <option value="europe">
```

```
Europe
</option>
<option value="JP">Japan </option>
<option value="AU">Australia </option>
<option value="AS">Asia </option>
</select>
<p>
</p>
    <p>
<INPUT                        TYPE="SUBMIT"
VALUE="cnn.query.weather">
</p>
</form>
    <h2>
<a name="cnn.query.travel">Travel Section</a>
</h2>
<form node_id="22"
    action="http://raman.almaden.ibm.com/cgi-bin/
cnn.cgi?command=search">
    <P node_id="9">
    Which part of today's news would you like to read?</P>
<select name="cnn.query.part">
    <option value="h">Headlines</option>
    <option value="1">first story </option>
    <option value="2">second story </option>
    <option value="3">third story </option>
    </select>
<p>
</p>
    <P node_id="23">
    Which city do you want to visit?</P>
<select name="cnn.query.interest">
    <option
value="AMSTERDAM">AMSTERDAM<option>
    <option    value="COPENHAGEN">COPENHAGEN</
option>
    <option value="HELSINKI">HELSINKI</option>
    <option value="HONGKONG">HONGKONG</option>
    <option value="LONDON">LONDON</option>
    <option value="OSLO">OSLO</option>
    <option value="PRAGUE">PRAGUE</option>
    <option value="SINGAPORE">SINGAPORE</option>
    <option    value="STOCKHOLM">STOCKHOLM</op-
tion>
    <option value="SYDNEY">SYDNEY</option>
    </select>
<p>
</p>
    <p>
<INPUT TYPE="SUBMIT" VALUE="cnn.query.travel">
</p>
</form>
    <h2>
<a name="cnn.query.sports">Sports Channel</a>
</h2>
<form  node_id="25"  action="http://raman.almaden.ibm.
com/cgi-bin/cnn.cgi?command=search">
    <P node_id="9">
    Which part of today's news would you like to read?</P>
<select name="cnn.query.part">
    <option value="h">Headlines</option>
    <option value="1">first story </option>
    <option value="2">second story </option>
    <option value="3">third story </option>
    </select>
<p>
</p>
<P node_id="26">
    What sports are you interested in?</P>
<select name="cnn.query.interest">
    <option value="AS">Asia </option>
    <option value="w">world </option>
    <option value="eu">europe </option>
    <option value="us">united states </option>
    <option value="nba">NBA </option>
    <option value="nhl">nhl </option>
    <option value="EF">Europoean football </option>
</select>
<p>
</p>
    <p>
<INPUT TYPE="SUBMIT" VALUE="cnn.query.sports">
</p>
</form>
    </div>
</div>
</body>
</html>
```

(d) Gesture XSL

The following example illustrates the CML to WML gesture-based XSL rules that are used to transcode, gesture by gesture, a CML page into a WML page. All the gesture-based transcoding rules required to transcode any possible CML page are not present. It is to be considered as an illustration of the method. The XSL syntax follows conventional XSLT rules, see, e.g., http://www.w3.org/1999/XSL/Transform.

```
<!--$Id: cml2html.xsl,v 1.9 2000/02/05 19:32:40 Exp $-->
<!—Description: Transform CML to HTML-->
-<xsl:stylesheet xmlns:xsl="http://www.w3.org/1999/XSL/
Transform"    xmlns:xt="http://www.jclark.com/xt"    ver-
sion="1.0" extension-element-prefixes="xt">
<xsl:include href="html/cml.xsl"/>
<xsl:include href="html/environment.xsl"/>
<xsl:include href="html/modality.xsl"/>
<xsl:include href="html/output.xsl"/>
<xsl:include href="html/selections.xsl"/>
<xsl:include href="common/identity.xsl"/>
</xsl:stylesheet>
<!--$Id: cml.xsl,v 1.13 2000/01/31 Exp $-->
<!--Description: Translate CML element to HTML-->
```

```xml
<!--Handle case of CML element being the top-level element-->
<xsl:stylesheet
xmlns:xsl="http://www.w3.org/1999/XSL/Transform">
<xsl:output method="html"/>
<xsl:template match="/cml">
<html>
<head>
<META http-equiv="Content-Type" content="text/html; charset=iso-8859-1"/>
<title><xsl:value-of select="@title"/></title>
</head>
<body>
<h1>
<a name="{@name}">
<xsl:value-of select="@title"/>
<a>
</h1>
<xsl:choose>
<xsl:when test="@action='submit'">
<form>
<xsl:attribute name="node_id">
<xsl:value-of select="@node_id"/>
</xsl:attribute>
<xsl:attribute name="action">
<xsl:value-of select="submit/(target"/>
</xsl:attribute>
<xsl:apply-templates/>
<INPUT TYPE="SUBMIT" VALUE="@name"/>
</p>
</form>
</xsl:when>
<xsl:otherwise>
<div node_id="{@node_id}"
name="{@name}">
<xsl:apply-templates/>
</div>
</xsl:otherwise>
<xsl:choose>
</body>
</html>
</xsl:template>
<xsl:template match="cml[(action='submit']">
<h2><a name="{(name}">
<xsl:value-of select="@title"/></a>
</h2>
<form>
<xsl:attribute name="node_id">
<xsl:value-of select="@node_id"/>
</xsl:attribute>
<xsl:attribute name="action">
<!--for rea, we should process submit node to cons up target uri-->
</xsl:value-of select="../submit/@target"/>
</xsl:attribute>
<xsl:apply-templates/>
<p>
<INPUT TYPE="SUBMIT" VALUE="{@name}"/>
</p>
</form>
</xsl:template>
<xsl:template match="cml">
<h2 node_id="{(node_id}">
<a name="{@name}">
<xsl:value-of select="(title"/></a>
</h2>
<xsl:apply-templates/>
<xsl:if test="(action='return'">
<a name="{concat('#', /cml/@name)}">
Back
</a>
</p>
</xsl:if>
</xsl:template>
<xsl:template match="group">
<div groupId="{@groupId}"
modality="{@modality}"
class="{@class}">
<xsl:apply-templates/>
</div>
</xsl:template>
<xsl:template match="submit"/>
</xsl:stylesheet>
<!--$Id: environment.xsl,v 1.2 2000/02/01 Exp $-->
<!--Description: Process CML environment constructs-->
<xsl:stylesheet
xmlns:xsl="http://www.w3.org/1999/XSL/Transform">
<xsl:template match="final">
<xsl:apply-templates/>
</xsl:template>
```

```
<xsl:template match="var">
<input type="hidden" name="{@name}" value="{@expr}"/>
</xsl:template>
<xsl:template match="assign">
<input name="{@name}" type="hidden">
<xsl:attribute name="value">
<xsl:choose>
<xsl:when test=' '@expr=" ' ">
<xsl:value-of select="./node( )"/>
</xsl:when>
<xsl:otherwise>
<xsl:value-of select="@expr"/>
</xsl:otherwise>
</xsl:choose>
</xsl:attribute>
</input>
</xsl:template>
<xsl:template match="value">
<b><xsl:value-of select="@name"/></b>
</xsl:template>
</xsl:stylesheet>
<!--$Id: modality.xsl,v 1.1 2000/02/05 19:32:00 Exp $-->
<!--Description: Process CML modality constructs-->
-<xsl:stylesheet xmlns:xsl="http://www.w3.org/1999/XSL/Transform">
-<xsl:template match="modality[@class='visual']">
<xsl:apply-templates/>
</xsl:template>
-<xsl:template match="var">
<input type="hidden" name="{@name}" value="{@expr}"/>
</xsl:template>
-<xsl:template match="assign">
-<input name="{(name}" type="hidden">
-<xsl:attribute name="value">
-<xsl:choose>
-<xsl:when test=' '@expr=' ' ">
<xsl:value-of select="./node( )"/>
</xsl:when>
-<xsl:otherwise>
<xsl:value-of select="@expr"/>
</xsl:otherwise>
</xsl:choose>
</xsl:attribute>
</input>
</xsl:template>
-<xsl:template match="value">
-<b>
<xsl:value-of select="@name"/>
</b>
</xsl:template>
</xsl:stylesheet>
<!--$Id: output.xsl,v 1.3 1999/11/12 20:07:23 Exp $-->
<!--Description: Transformation rules for CML gestures that-->
<!--primarily output information-->
<xsl:stylesheet xmlns:xsl="http://www.w3.org/1999/XSL/Transform">
<xsl:template match="message">
<P>
<xsl:attribute name="node_id">
<xsl:value-of select="@node_id"/>
</xsl:attribute>
<xsl:apply-templates/>
</P>
</xsl:template>
<!--eventually generate pop-up help via javascript-->
<xsl:template match="help">
<P>
<xsl:attribute name="node_id">
<xsl:value-of select="@node_id"/>
</xsl:attribute>
<xsl:apply-templates/>
<P>
</xsl:template>
</xsl:stylesheet>
<!--$Id: selections.xsl,v 1.8 2000/01/31 17:50:34 $-->
<!--Descriptions: Transform CML selection gestures to HTML-->
<xsl:stylesheet
xmlns:xsl="http://www.w3.org/1999/XSL/Transform">
<xsl:template match="menu">
<xsl:if test=' '@title!=" ' ">
<h2>
<a name="#{(name}">
<xsl:value-of select="@title"/>
</a>
</h2>
</xsl:if>
<xsl:apply-templates select="message"/>
<ol node_id="{@node_id}">
```

```
<xsl:for-each select="choices/choice|choices/default">
<li>
<a href="{@value}">
<xsl:apply-templates/>
</a>
</li>
</xsl:for-each>
</ol>
</xsl:template>
<xsl:template match="select">
<xsl:apply-templates select="message"/>
<select name="{@name}">
<xsl:apply-templates select="choices"/>
</select>
<p/>
</xsl:template>
<xsl:template match="choices">
<xsl:apply-templates/>
</xsl:template>
<xsl:template match="choice|default">
<option>
<xsl:attribute name="value">
<xsl:value-of select="@value"/>
</xsl:attribute>
<xsl:if test="name(.)='default'">
<xsl:attribute name="checked"/>
</xsl:if>
<xsl:apply-templates/>
</option>
</xsl:template>
<xsl:template match="grammar"/>
</xsl:stylesheet>
<!--$Id: identity.xsl,v 1.1 1999/11/08 18:05:26 Exp $-->
<!--Description: Identity transform for use in other sheets-->
<xsl:stylesheet xmlns:xsl="http://www.w3.org/1999/XSL/Transform">
<xsl:template match="*|@*">
<xsl:value-of select="."/>
<xsl:copy>
<xsl:apply-templates select="@*"/>
<xsl:apply-templates select="node( )"/>
</xsl:copy>
</xsl:template>
</xsl:stylesheet>
```

(e) WML Sources

Figure 7:
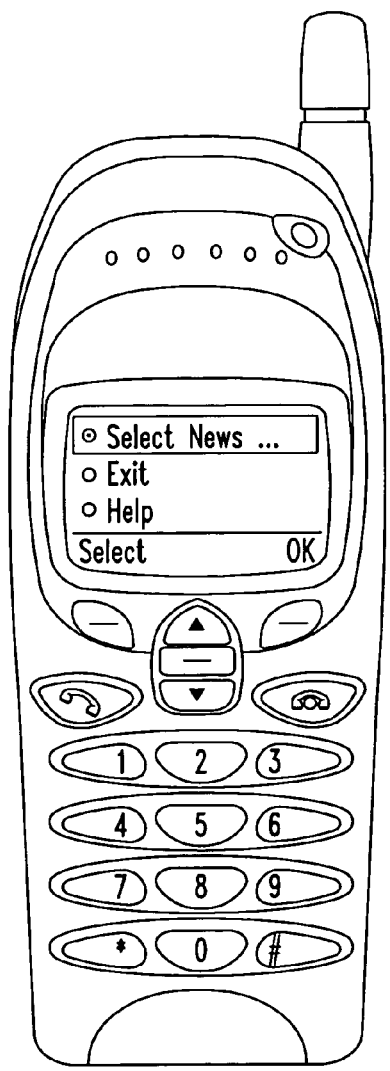
FIG. 7 is a diagram illustrating a GUI welcome page, transformed from CML source code page, as viewed with a WML browser.

The following describes the WML source page obtained by applying the (CML to WML) XSL sources on the CML source page. The resulting welcome GUI page as viewed with a WML browser is illustrated in FIG. 7.

```
<?xml version="1.0" encoding="utf-8"?>
<!DOCTYPE wml PUBLIC "-//WAPFORUM//DTD WML 1.1//EN"
"http://www.wapforum.org/DTD/wml_1.1.
<wml>
<template>
<do type="prev" label="Back">
<prev/>
</do>
</template>
<card id="cnn.command" title="cnn.command">
<p>
<select name="cnn.command">
<option onpick="#cnn.query">Select News Stories</option>
<option onpick="#cnn.exit">
Exit </option>
<option onpick="#cnn.applicationHelp">Help</option>
</select>
</p>
</card>
<card id="cnn.applicationHelp" title="cnn.applicationHelp">
<p>
This application allows you to select and view CNN news stories
</p>
</card>
<card id="cnn.exit" title="cnn.exit">
<p>
Thankyou for using the CNN news service
</p>
<p align="center">
<a href="cnn.wmls#submit( )"/>
</p>
</card>
<card id="cnn.query" title="cnn.query">
<p>
<select name="cnn.query">
<option onpick="#cnn.query.news">News </option>
<option onpick="#cnn.query.business">Business </option>
<option onpick="#cnn.query.sports">
```

Sports

</option>

<option onpick="#cnn.query.travel">Travel </option>

<option onpick="#cnn.query.weather">Weather </option>

<option onpick="#cnn.query.show">

Show Business

</option>

</select>

</p>

</card>

<card id="cnn.query.news" title="cnn.query.news">

<p>

Which part of today's news would you like to read?<select name="cnn.query.part">

<option value="h" onpick="cnn.wmls#submit( )">Headlines</option>

<option value="1" onpick="cnn.wmls#submit( )">first story </option>

<option value="2" onpick="cnn.wmls#submit( )">second story </option>

<option value="3" onpick="cnn.wmls#submit( )">third story </option>

</select>

</p>

<p>

Which news category would you like to read?

<select name="cnn.query.interest">

<option value="business" onpick="cnn.wmls#submit( )">

Business

</option>

<option value="africa" onpick="cnn.wmls#submit( )">

Africa</option>

<option value="world" onpick="cnn.wmls#submit( )">

World</option>

<option value="United states" onpick="cnn.wmls#submit( )">United states </option>

<option value="europe" onpick="cnn.wmls#submit( )">Europe </option>

<option value="Asia" onpick="cnn.wmls#submit( )">

Asia</option>

<option value="me" onpick="cnn.wmls#submit( )">Middle East</option>

<option value="america" onpick="cnn.wmls#submit( )">

America </option>

</select>

</p>

<p align="center">

<a href="cnn.wmls#submit( )"/>

</p>

</card>

<card id="cnn.query.business" title="cnn.query.business">

<p>

Which part of today's news would you like to read?<select name="cnn.query.part">

<option value="h" onpick="cnn.wmls#submit( )">Headlines</option>

<option value="1" onpick="cnn.wmls#submit( )">first story </option>

<option value="2" onpick="cnn.wmls#submit( )">second story </option>

<option value="3" onpick="cnn.wmls#submit( )">third story </option>

</select>

</ p>

Which business category would you like to read?<select name="cnn.query.interest">

<option value="NEWS" onpick="cnn.wmls#submit( )"> news </option>

<option value="IN" onpick="cnn.wmls#submit( )">indexes </option>

<option value="CU" onpick="cnn.wmls#submit( )">exchange rates </option>

<option value="MET" onpick="cnn.wmls#submit( )">metals </option>

</select>

</p>

<p align="center">

<a href="cnn.wmls#submit( )"/>

</p>

</card>

<card id="cnn.query.weather" title="cnn.query.weather">

<p>

Which part of today's news would you like to read?<select name="cnn.query.part">

<option value="h" onpick="cnn.wmls#submit( )">Headlines</option>

<option value="1" onpick="cnn.wmls#submit( )">first story </option>

<option value="2" onpick="cnn.wmls#submit( )">second story </option>

<option value="3" onpick="cnn.wmls#submit( )">third story </option>

</select>

</p>

<p>

Which region are you interested in?<select name="cnn.query.interest">

<option value="us" onpick="cnn.wmls#submit( )">United states </option>

<option value="europe" onpick="cnn.wmls#submit( )">Europe
</option>

<option value="JP" onpick="cnn.wmls#submit( )">Japan </option>

<option value="AU" onpick="cnn.wmls#submit( )">Australia </option>

<option value="AS" onpick="cnn.wmls#submit( )">Asia </option>

</select>

</p>

<p align="center">

<a href="cnn.wmls#submit( )"/>

</p>

</card>

<card id="cnn.query.travel" title="cnn.query.travel">

<p>

Which part of today's news would you like to read?<select name="cnn.query.part">

<option value="h" onpick="cnn.wmls#submit( )">Headlines</option>

<option value="1" onpick="cnn.wmls#submit( )">first story </option>

<option value="2" onpick="cnn.wmls#submit( )">second story </option>

<option value="3" onpick="cnn.wmls#submit( )">third story </option>

</select>

</p>

<p>

Which city do you want to visit?<select name="cnn.query.interest">

<option value="AMSTERDAM" onpick="cnn.wmls#submit( )">AMSTERDAM</option>

<option value="COPENHAGEN" onpick="cnn.wmls#submit( )">COPENHAGEN</option>

<option value="HELSINKI" onpick="cnn.wmls#submit( )">HELSINKI</option>

<option value="HONGKONG" onpick="cnn.wmls#qjsubmit( )">HONGKONG</option>

<option value="LONDON" onpick="cnn.wmls#submit( )">LONDON</option>

<option value="OSLO" onpick="cnn.wmls#submit( )">OSLO</option>

<option value="PRAGUE" onpick="cnn.wmls#submit( )">PRAGUE</option>

<option value="SINGAPORE" onpick="cnn.wmls#submit( )">SINGAPORE</option>

<option value="STOCKHOLM" onpick="cnn.wmls#submit( )">STOCKHOLM</option>

<option value="SYDNEY" onpick="cnn.wmls#submit( )">SYDNEY</option>

</select>

</p>

<p align="center">

<a href="cnn.wmls#submit( )"/>

</p>

</card>

<card id="cnn.query.sports" title="cnn.query.sports">

<p>

Which part of today's news would you like to read?<select name="cnn.query.part">

<option value="h" onpick="cnn.wmls#submit( )">Headlines</option>

<option value="1" onpick="cnn.wmls#submit( )">first story </option>

<option value="2" onpick="cnn.wmls#submit( )">second story </option>

<option value="3" onpick="cnn.wmls#submit( )">third story </option>

</select>

</p>

<p>

What sports are you interested in?<select name="cnn.query.interest">

<option value="AS" onpick="cnn.wmls#submit( )">Asia</option>

<option value="w" onpick="cnn.wmls#submit( )">world</option>

<option value="eu" onpick="cnn.wmls#submit( )">europe</option>

<option value="us" onpick="cnn.wmls#submit( )">united states </option>

<option value="nba" onpick="cnn.wmls#submit( )">NBA</option>

<option value="nhl" onpick="cnn.wmls#submit( )">nhl</option>

<option value="EF" onpick="cnn.wmls#submit( )">European football </option>

</select>

<p align="center">

<a href="cnn.wmls#submit( )"/>

</p>

</card>

</wml>

(f) Gesture XSL

The following example illustrates the CML to VoiceXML gesture-based XSL rules that are used to transcode, gesture by gesture, a CML page into a VoiceXML page. All the gesture based transcoding rules required to transcode any possible CML page are not present. It is to be considered as an illustration of the method. The XSL syntax follows conventional XSLT rules, see, e.g., http://www.w3.org/1999/XSL/Transform.

```
<!--cml2wml.xsl-->
<xsl:stylesheet version="1.0" xmlns:xsl="http://www.w3.org/1999/XSL/Transform">
<xsl:output method="html" indent="yes"/>
-->
<xsl:output method="xml" indent="yes" media-type="text/xml"/>
<xsl:template match="/cml">
<xsl:text disable-output-escaping="yes">
<!DOCTYPE wml PUBLIC "-//WAPFORUM//DTD WML 1.1//EN"
"http://www.wapforum.org/DTD/wml_1
</xsl:text>
<wml>
<template>
<do type="prev" label="Back">
<prev/>
</do>
</template>
<xsl:apply-templates/>
</wml>
</xsl:template>
<xsl:template match="cml">
<xsl:choose>
<xsl:when test="menu">
<!--to avoid <card><card>..</card></card>-->
<card>
<xsl:attribute name="id">
<xsl:value-of select="@name"/>
</xsl:attribute>
<xsl:attribute name="title">
<xsl:value-of select="@name"/>
</xsl:attribute>
<p><select>
<xsl:attribute name="name"/>
<xsl:value-of select="menu/@name"/>
</xsl:attribute>
<xsl:apply-templates select="menu/message"/>
<xsl:for-each select="menu/choices/choice|menu/choices/default">
<option>
<xsl:attribute name="value">
<xsl:value-of select="@value"/>
</xsl:attribute>
<xsl:attribute name="onpick">#<xsl:value-of select="@value"/></xsl:attribute>
<xsl:call-template name="lex"/></option>
</xsl:for-each>
</select>
</p>
</card>
</xsl:when>
<xsl:otherwise>
<card>
<xsl:attribute name="id">
<xsl:value-of select="@name"/>
</xsl:attribute>
<xsl:attribute name="title">
<xsl:value-of select="@name"/>
</xsl:attribute>
<xsl:apply-templates/>
</card>
</xsl:otherwise>
</xsl:choose>
</xsl:template>
<xsl:template match='cml[@action="submit"]'>
<card>
<xsl:attribute name="id">
<xsl:value-of select="@name"/>
</xsl:attribute>
<xsl:attribute name="title">
<xsl:value-of select="@name"/>
</xsl:attribute>
<xsl:apply-templates/>
<p align="center">
<a>
<xsl:attribute name="href">
<xsl:value-of select="/cml/@name"/>.wmls#submit( )</xsl:attribute>
</a>
</p>
</card>
</xsl:template>
<xsl:template match='select'>
<p>
```

```
<xsl:apply-templates select="message"/>
<select>
<xsl:attribute name="name">
<xsl:value-of select="@name"/>
</xsl:attribute>
<xsl:for-each select="choices/choice|choices/default">
<option>
<xsl:attribute name="value">
<xsl:value-of select="@value"/>
</xsl:attribute>
<xsl:attribute name="onpick">
<xsl:value-of select="/cml/@name"/>.wmls#submit( )</xsl:attribute>
<xsl:call-template name="lex"/></option>
</xsl:for-each>
</select>
</p>
</xsl:template>
<xsl:template match="menu">
<card>
<xsl:attribute name="id">
<xsl:value-of select="@name"/>
</xsl:attribute>
<xsl:attribute name="title">
<xsl:value-of select="@name"/>
</xsl:attribute>
<p>
<select>
<xsl:attribute name="name">
<xsl:value-of select="@name"/>
</xsl:attribute>
<xsl:apply-templates select="message"/>
<xsl:for-each select="choices/choice|choices/default">
<option>
<xsl:attribute name="value">
<xsl:value-of select="@value"/>
</xsl:attribute>
<xsl:attribute name="onpick">#<xsl:value-of select="@value"/></xsl:attribute>
<xsl:call-template name="lex"/></option>
</xsl:for-each>
</select>
</p>
</card>
</xsl:template>
```

```
<xsl:template name="lex">
<xsl:for-each select="node( )">
<xsl:if test="position( )=last( )">
<xsl:value-of select="current( )">
</xsl:if>
</xsl:for-each>
</xsl:template>
<!--explicitly remove segment-->
<xsl:template match="submit"/>
<xsl:template match="message"/>
</xsl:stylesheet>
```

(g) XSL Source to Produce VoiceXML

The following describes the XSL source code used to produce the VoiceXML source page.

```
<xsl:stylesheet version="1.0" xmlns:xsl="http://www.w3.org/1999/XSL/Transform">
<xsl:output method="html"/>
<xsl:template match="/cml">
<vxml>
<xsl:apply-templates/>
</vxml>
</xsl:template>
<xsl:template match="menu">
<menu>
<xsl:apply-templates select="message"/>
<xsl:attribute name="id">
<xsl:value-of select="@name"/>
</xsl:attribute>
<xsl:attribute name="node_id">
<xsl:value-of select="@node_id"/>
</xsl:attribute>
<xsl:apply-templates select="message"/>
<prompt>Say one of <enumerate/></prompt>
<xsl:for-each select="choices/choice|choices/default">
<choice>
<xsl:attribute name="next">#<xsl:value-of select="@value"/></xsl:attribute>
<xsl:apply-templates/>
</choice>
</xsl:for-each>
</menu>
</xsl:template>
<xsl:template match="cml[@action='return']">
<form>
<xsl:attribute name="id">
<xsl:value-of select="@name"/>
```

```
</xsl:attribute>
<xsl:attribute name="node_id">
<xsl:value-of select="@node_id"/>
</xsl:attribute>
<xsl:apply-templates/>
<block><goto>
<xsl:attribute name="next">#<xsl:value-of select="/cml/menu/@name"/><xsl:attribut
</goto></block>
</form>
</xsl:template>
<xsl:template match="cml[@action='submit']">
<form>
<xsl:attribute name="id">
<xsl:value-of select="@name"/>
</xsl:attribute>
<xsl:attribute name="node_id">
<xsl:value-of select="@node_id"/>
</xsl:attribute>
<xsl:apply-templates/>
<block>
<goto next="http://raman.almaden.ibm.com/cgi-bin/cnn.cgi">
<xsl:if test="select[@name]">
<xsl:for-each select="select">
<xsl:attribute name="submit">
<xsl:value-of select="@name"/>
</xsl:attribute>
</xsl:for-each>
</xsl:if>
</goto>
</block>
</form>
</xsl:template>
<xsl:template match="select">
<field>
<xsl:attribute name="name">
<xsl:value-of select="name"/>
</xsl:attribute>
<xsl:attribute name="node_id">
<xsl:value-of select="../@node_id"/>
</xsl:attribute>
<xsl:if test="message">
<prompt>
<xsl:value-of select="message"/>
```

Say one of <enumerate/>
</prompt>
</xsl:if>
<grammar>
<xsl:for-each select="choices/choice|choices/default">
<xsl:call-template name="lex"/>
<xsl:if test="following-sibling::choice">|</xsl:if>
</xsl:for-each>
</grammar>
</field>
</xsl:template>
<xsl:template match="message">
<field><prompt>
<xsl:attribute name="node_id">
<xsl:value-of select="@node_id"/>
</xsl:attribute>
<xsl:apply-templates/>
</prompt>
</field>
</xsl:template>
<xsl:template match="help">
<help>
<xsl:attribute name="node_id">
<xsl:value-of select="@node_id"/>
</xsl:attribute>
<xsl:apply-templates/>
</help>
<xsl:template>
<xsl:template match="grammar"/>
<xsl:template match="submit"/>
<xsl:template name="lex">
<xsl:for-each select="node( )">
<xsl:if test="position( )=last( )">
<xsl:value-of select="current( )"/>
</xsl:if>
</xsl:for-each>
</xsl:template>
</xsl:stylesheet>
```

(h) VoiceXML Sources

The following describes the VoiceXML source page obtained by applying the (CML to VoiceXML) XSL sources on the CML source page. The resulting welcome Speech dialog as presented by a VoiceXML browser initially presents the user with a dialog to select by voice between the different options.

```
<vxml>
<menu id="cnn_command" node_id="2">
```

```
<prompt>Say one of <enumerate></enumerate></prompt><choice next="#cnn_query">Select News
Exit </choice><choice next="#cnn_applicationHelp">Help</choice>
</menu>
<form id="cnn_applicationHelp" node_id="4">
<field><prompt node_id="5">
This application allows you to select and view CNN news stories
</prompt></field>
<block><goto next="#cnn"></goto></block>
</form>
<form id="cnn_exit" node_id="6">
<field><prompt node_id="60">
Thankyou for using the CNN news service
</prompt></field>
<block><goto next="http://raman.almaden.ibm.com/cgi-bin/cnn.cgi"></goto></block>
</form>
<menu id="cnn_query" node_id="11">
<prompt>Say one of <enumerate></enumerate></prompt><choice next="#cnn_query_news">News <
Sports
</choice><choice next="#cnn_query_travel">Travel </choice><choice next="#cnn_qu
Show Business
</choice>
</menu>
<form id="cnn_query_news" node_id="13">
<field name="cnn_query_part" node_id="13"><prompt>
Which part of today's news would you like to read?</prompt><grammar>Headlines
<field name="cnn_query_interest" node_id="13"><prompt>
Which news category would you like to read?
</prompt><grammar>
Business
|
Africa|World|United states|Europe|Asia|Middle East|America </gramma
<block><goto next="http://raman.almaden.ibm.com/cgi-bin/cnn.cgi" submit="cnn_query_int
</form>
<form id="cnn_query_business" node_id="16">
<field name="cnn_query_part" node_id="16"><prompt>
Which part of today's news would you like to read?</prompt><grammar>Headlines|
<field name="cnn_query_interest" node_id="16"><prompt>
```

```
Which business category would you like to read?</prompt><grammar>news indexes
<block><goto next="http://raman.almaden.ibm.com/cgi-bin/cnn.cgi" submit="cnn_query_int
</form>
<form id="cnn_query_weather" node_id="19">
<field name="cnn_query_part" node_id="19"><prompt>
Which part of today's news would you like to read?</prompt><grammar>Headlines|
<field name="cnn_query interest" node_id="19"><prompt>
Which region are you interested in?</prompt><grammar>United states|
Europe
|Japan|Australia|Asia </grammar></field>
<block><goto next="http://raman.almaden.ibm.com/cgi-bin/cnn.cgi"
submit="cnn_query_int
</form>
<form id="cnn_query_travel" node_id="22">
<field name="cnn_query_art" node_id="22"><prompt>
Which part of today's news would you like to read?</prompt><grammar>Headlines|
<field name="cnn_query_interest" node_id="22"><prompt>
Which city do you want to
visit?</prompt><grammar>AMSTERDAM|
COPENHAGEN|HELSINKI|
<block><goto next="http://raman.almaden.ibm.com/cgi-bin/cnn.cgi"
submit="cnn_query_int
</form>
<form id="cnn_query_sports" node_id="25">
<field name="cnn_query_part" node_id="25"><prompt>
Which part of today's news would you like to read?</prompt><grammar>Headlines
<field name="cnn_query_interest" node_id="25"><prompt>
What sports are you interested in?</prompt><grammar>Asia|world|europe|uni
<block><goto next="http://raman.almaden.ibm.com/cgi-bin/cnn.cgi"
submit="cnn_query_int
</form>
</vxml>
```

(iii) Tight Multi-Modal Browsing and Multi-Device Browsing

As described above and in more detail below, the different modalities can be tightly synchronized. For example, it can be voice and GUI on a same device or voice on the telephone synchronized with GUI on a HTML or a WMI browser, etc.

M. Cosmetization

Modality specific cosmetic content or parameters can be added using modality specific XML syntax. Modality specific gestures can be added using modality specific XML syntax with modality qualifiers. Other modality can ignore or replace these components by others (e.g., by captions).

(i) Modality Specific Information

CML is designed to be a declarative, modality-independent markup language for specifying interaction logic and conversational application flow. However, we realize that, in the interim, application authors will want to add modality-specific content to CML applications in order to achieve custom presentations. CML permits this by element modality which is used to encapsulate snippets of markup that are intended for use in a specific modality. Note that such modality-specific snippets will only appear in the specified modality; authors are therefore encouraged to use such modality-specific snippets only where it is deemed absolutely necessary, and further where the author either provides an alternative snippet for use in other modalities, or does not care about any other modality. Element modality qualified by XML attributes class and module is defined below:

Class: Specifies class of modalities to which this snippet applies.

module: Specifies the markup language modules that can accept this snippet.

The following is an HTML-specific snippet that will be passed through to the visual representation.

```
<modality class="visual" module="html-basic">
<LINK REL="stylesheet"
HREF="cnn.css"
TYPE="text/css"/>
</modality>
```

The following is an example of a cosmetized CML page:

```
<!--$Id: cnn.cml,v 1.21 2000/02/05 20:08:27 Exp $-->
<!--Description: CNN Mobile In cml-->
<cml name="cnn"
    node_id="1"
    title="CNN Mobile News">
<modality class="visual" module="html-basic">
    <LINK REL="stylesheet"
    HREF="cnn.css"
    TYPE="text/css"/>
</modality>
<modality class="visual" module="html">
    <TABLE BORDER="0" WIDTH="600" CELLSPACING="0"CELLPADDING="0"><TR>
    <TD WIDTH="122" VALIGN="TOP"><a H
        <IMG SRC="http://cnn.com/images/1999/10/cnnstore.gif" WIDTH="120" HEIGHT="60" BORDER="1" AL
    <TD WIDTH="8" VALIGN="TOP"><a HREF="http://cnn.com/ads/e.market/">
        <IMG SRC="http://cnn.com/images/1998/05/homepage/ad. info.gif" WIDTH="7" HEIGHT="62" BORDER=
    <TD WIDTH="470" VALIGN="TOP">
    <a
        HREF="http://cnn.com/event.ng/Type=click%26RunID=11875%26
        ProfileID=34%26AdID=13042%26Group:
        target="_top">
            <img src="http://cnn.com/ads/advertiser/promo/intercompany_onair/9907/onair_egg_cnn.gif" border="0" height="60" width="468" alt="Get to the point news!"/>
</a>
<table width="100%" cellpadding="-0" cellspacing="0"border="0"><tr><td align="right"><font face="verdana,ARIAL,sans-serif" size="1"><a
</TD>/TR></TABLE>
</modality>
<modality class="speech" module="vxml">
<block>
    Shop CNN for all your information needs!
</block>
</modality>
<menu name="cnn.command"
    node_id="2">
<choices node_id="3">
<default value-#cnn.query">Select News Stories</default>
<choice value="#cnn.exit"
    require_confirmation="true">
Exit </choice>
<choice value="#cnn.applicationHelp">Help</choice>
</choices>
</menu>
<cml name="cnn.applicationHelp"
    title="About CNN Mobile"
    node_id="4"
    action="return">
m<message
    node_id="5">
This application allows you to select and view CNN news stories
</message>
</cml>

<cml name="cnn.exit"
    node_id="6"
    title="Exit CNN Mobile News"
    action="submit">
<message node_id="60">
Thankyou for using the CNN news service
</message>
</cml>

<group node_id="7"
    groupId="query">

<cml name="cnn.query"
    title="Search CNN Mobile News"
    node_id="58">
<menu name="cnn.query.topic"
    node_id="11"
    title="Topic Selection">
<choices node_id="12">
    <choice value="#cnn.query.news">News </choice>
    <choice value="#cnn.query.business">Business </choice>
    <choice value="#cnn.query.sports">
        <grammar>(sport|sports"</grammar>
        Sports
    </choice>
    <choice value="#cnn.query.travel">Travel </choice>
    <choice value="#cnn.query.weather">Weather </choice>
    <choice value="#cnn.query.show">
        <grammar >show [business]</grammar>
        Show business
    </choice>
```

```
      </choices>
    </menu>
</cml>
<cml name="cnn.query.news"
    title="News Channel"
    node_id="13"
    action="submit">
<select name="cnn.query.part">
    <message node_id="9">
    Which part of today's news would you like to read?</message>
    <choices
    node_id="10">
       <choice value="h">Headlines</choice>
       <choice value="1">first story </choice>
       <choice value="2">second story </choice>
       <choice value="3">third story </choice>
    </choices>
    </select>
<select name="cnn.query.interest">
    <message node_id="14">
    Which news category would you like to read?
    </message>
    <choices node_id="15">
    <choice value="business">
    <grammar type="text/jsgf">
    business {BIZ}/grammar>
    Business
    </choice>
    <choice value="africa">
    Africa</choice>
    <choice value="world">World </choice>
    <choice value="United states">United states </choice>
    <choice value="europe">Europe </choice>
    <choice value="Asia">Asia</choice>
    <choice value="me">Middle East</choice>
    <choice value="america">America </choice>
    </choices>
    </select>
</cml>
<cml name="cnn.query business"
    title="Business Channel"
    action="submit"
    node_id="16">
    <select name="cnn.query.part">
    <message node_id="9">
    Which part of today's news would you like to read?</message>
    <choices
    node_id="10">
       <choice value="h">Headlines</choice>
       <choice value="1">first story </choice>
       <choice value="2">second story </choice>
       <choice value="3">third story </choice>
    </choices>
</select>
<select name="cnn.query.interest">
    <message node_id="17">
    Which business category would you like to read?</message>
    <choices node_id="18">
       <choice value="NEWS">news </choice>
       <choice value="IN">indexes </choice>
       <choice value="CU">exchange rates </choice>
       <choice value="MET">metals </choice>
    </choices>
    </select>
</cml>
<cml name="cnn.query.weather"
    title="Weather Channel"
    action="submit"
    node_id="19">
<select name="cnn.query.part">
    <message node_id="9">
    Which part of today's news would you like to read?</message>
    <choices node_id="10">
       <choice value="h">Headlines</choice>
       <choice value="1">first story </choice>
       <choice value="2">second story </choice>
       <choice value="3">third story </choice>
    </choices>
</select>
<select name="cnn.query.interest">
    <message node_id="20">
    Which region are you interested in?</message>
<choices node_id="21">
    <choice value="us">United states <choice>
    <choice value="europe">
    <grammar type="text/jsgf">(euro|Europe)</grammar>Europe
    </choice>
    <choice value="JP">Japan </choice>
    <choice value="AU">Australia </choice>
    <choice value="AS">Asia </choice>
    </choices>
    </select>
</cml>
<cml name="cnn.query.travel"
    title="Travel Section"
    action="submit"
    node_id="22">
    <select name="cnn.query.part">
    <message node_id="9">
    Which part of today's news would you like to read?</message>
    <choices
    node_id="10">
       <choice value="h">Headlines</choice>
       <choice value="1">first story </choice>
       <choice value="2">second story </choice>
       <choice value="3">third story </choice>
    </choices>
    </select>
    <select name="cnn.query.interest">
    <message node_id="23">
    Which city do you want to visit?</message>
    <choices node_id="24">
       <choice value="AMSTERDAM">AMSTERDAM</choice>
       <choice value="COPENHAGEN">COPENHAGEN</choice>
       <choice value="HELSINKI">HELSINKI</choice>
       <choice value="HONGKONG">HONGKONG</choice>
       <choice value="LONDON">LONDON</choice>
```

```
    <choice value="OSLO">OSLO</choice>
    <choice value="PRAGUE">PRAGUE</choice>
    <choice value="SINGAPORE">SINGAPORE</choice>
    <choice value="STOCKHOLM">STOCKHOLM</choice>
    <choice value="SYDNEY">SYDNEY</choice>
    </choices>
    </select>

</cml>

<cml name="cnn.query.sports"
    action="submit"
    title="Sports Channel"
    node_id="25">
    <select name="cnn.query.part">
    <message node_id="9">
    Which part of today's news would you like to read?</message>
    <choices
    node_id="10">
    <choice value="h">Headlines</choice>
    <choice value="1">first story </choice>
    <choice value="2">second story </choice>
    <choice value="3">third story </choice>
    </choices>
    </select>
    <select name="cnn.query.interest">
    <message node_id="26">
    What sports are you interested in?</message>
    <choices node_id="27">
    <choice value="AS">Asia </choice>
    <choice value="w">world </choice>
    <choice value="eu">europe </choice>
    <choice value="us">united states </choice>
    <choice value="nba">NBA </choice>
    <choice value="nhl">nhl </choice>
    <choice value="EF">Europoean football </choice>
    </choices>
    </select>

</cml>
    <submit target="http://raman.almaden.ibm.com/cgi-bin/cnn.cgi">
    <message node_id="28">
    executing <value name="cnn.command"/>
    for <value name="cnn.query.part"/>
    stories about <value name="cnn.query.interest"/>
    from topic <value name="cnn.query.topic"/>
    <message>
    <env name="cnn.command"/>
    <env name="cnn.query.topic"/>
    <env name="cnn.query.interest"/>
    <env name="cnn.query.part"/<
    </submit>

</group>
    <submit target=~"http://raman.almaden.ibm.com/cgi-bin/cnn.cgi">
    </submit>

</cml>
```

The following describes the HTML source page obtained by applying the (CML to HTML) XSL sources on the HTML cosmetized CML source page. The resulting welcome GUI page as viewed with a HTML browser is illustrated in FIG. 8. The cosmetization is clearly visible when compared to the non-cosmetized page. This illustrates the possibility to cosmetize, at will, the page. Again, all cases have not been considered but this clearly illustrates the approach.

The following is the code associated with the cosmetized resulting HTML source page:

```
<!DOCTYPE html PUBLIC "-//W3C//DTD HTML 4.0 Transitional//EN">
<html>
<head>
<META http-equiv="Content-Type" content="text/html; charset=iso-8859-1">
<title>CNN Mobile News</title>
</head>
<body>
<a name="cnn">CNN Mobile News</a>
</h1>
<div node_id="1" name="cnn">
    <LINK REL="stylesheet" HREF="cnn.css" TYPE="text/css">
    <TABLE BORDER="0" WIDTH="600" CELLSPACING="0" CELLPADDING="0">
    <TR>
    <TD WIDTH="122" VALIGN="TOP"><a HREF="http://cgi.cnn.com/cgi-bin/redirect?cnn store">
      <IMG        SRC="http://cnn.com/images/1999/10/cnnstore.gif" WIDTH="120" HEIGHT="60" BORDER="1" ALT="CNN Store"></a></TD>
    <TD WIDTH="8" VALIGN="TOP"><a HREF="http://cnn.com/ads/e.market/">
      <IMG SRC="http://cnn.com/images/1998/05/homepage/ad.info.gif" WIDTH="7" HEIGHT="62" BORDER="0" ALT="ad info"></a></TD>
    <TD WIDTH="470" VALIGN="TOP">
      <a       HREF="http://cnn.com/event.ng/Type=click%26RunID=11875%26ProfileID=34%26AdID=13042%26GroupID=15%26FamilyID=1099%26TagValues=4.8.249.435.594.606%26Redirect=http:%2F%2Fwww.cnn.com%2FHLN%2Findex_pgm.htm" target="_top">
      <img    src="http://cnn.com/ads/advertiser/promo/intercompany_onair/9907/onair_egg_cnn.gif" border="0" height="60" width="468" alt="Get to the point news!">
      <a>
<table width="100%" cellpadding="0" cellspacing="0" border="0">
<tr>
<td align="right"><font face="verdana,ARIAL,sans-serif" size="1"><a href="http://cnn.com/event.ng/Type=click%26RunID=11875%26 ProfileID=34%26AdID=13042%26GroupID=15%26FamilyID=1099%26Tagvalues=4.8.249.435. 594.60 6%26Redirect=http:%2F %2Fwww.cnn.com%2FHLN %2Findex_pgm.htm target=_top"
>Get to the point news!</a></font></td>
</tr>
</table>
    </TD>
</TR>
</TABLE>
```

```
<ol node_id="2">
<li>
<a href="#cnn.query">Select News Stories</a>
</li>
<li>
<a href="#cnn.exit">
    Exit </a>
</li>
<li>
<a href="#cnn.applicationHelp">Help</a>
</li>
</ol>
    <h2 node_id="4">
<a name="cnn.applicationHelp">About CNN Mobile</a>
</h2>
    <P node_id="5">
    This application allows you to select and view CNN news stories
    </P>
    <p>
<a href="#cnn">
    Back
    </a>
</p>
    <h2>
<a name="cnn.exit">Exit CNN Mobile News</a>
</h2>
<form node_id="6" action="http://raman.almaden.ibm.com/cgi-bin/cnn.cgi">
    <P node_id="60">
    Thankyou for using the CNN news service
    </P>
    <p>
<INPUT TYPE="SUBMIT" VALUE="cnn.exit">
</p>
</form>
    <div groupId="query" modality=" " class=" ">
    <h2 node_id="8">
<a name="cnn.query">Search CNN Mobile News</a>
</h2>
    <h2>
<a name="#cnn.query.topic">Topic Selection</a>
</h2>
<ol node_id="11">
<li>
<a href="#cnn.query.news">News </a>
</li>
<li>
<a href="#cnn.query.business">Business </a>
</li>
<li>
```

```
<a href="#cnn.query.sports">
    Sports
    </a>
</li>
<li>
<a href="#cnn.query.travel">Travel </a>
</li>
<li>
<a href="#cnn.query.weather">Weather </a>
</li>
<li>
<a href="#cnn.query.show">
    Show Business
    </a>
</li>
</ol>
    <h2>
<a name="cnn.query.news">News Channel</a>
<h2>
<form node_id="13" action="http://raman.almaden.ibm.com/cgi-bin/cnn.cgi">
    <P node_id="9">
    Which part of today's news would you like to read?</P>
<select name="cnn.query.part">
    <option value="h">Headlines</option>
    <option value="1">first story </option>
    <option value="2">second story </option>
    <option value="3">third story </option>
    </select>
<p>
</p>
    <P node_id="14">
    Which news category would you like to read?
    </P>
<select name="cnn.query.interest">
    <option value="business">
    Business
    </option>
    <option value="africa">
    Africa</option>
    <option value="world">World </option>
    <option value="United states">United states </option>
    <option value="europe">Europe </option>
    <option value="Asia">Asia</option>
    <option value="me">Middle East</option>
    <option value="america">America </option>
    </select>
<p>
</p>
    <p>
<INPUT TYPE="SUBMIT" VALUE="cnn.query.news">
</p>
</form>
    <h2>
<a name="cnn.query.business">Business Channel</a>
```

```
</h2>
<form node_id="16" action="http://raman.almaden.ibm.com/cgi-bin/cnn.cgi">
    <P node_id="9">
    Which part of today's news would you like to read?</P>
<select name="cnn.query.part">
   <option value="h">Headlines</option>
   <option value="1">first story </option>
   <option value="2">second story </option>
   <option value="3">third story </option>
   </select>
<p>
</p>
    <P node_id="17">
    Which business category would you like to read?</P>
<select name="cnn.query.interest">
   <option value="NEWS">news </option>
   <option value="IN">indexes </option>
   <option value="CU">exchange rates </option>
   <option value="MET">metals </option>
   </select>
<p>
</p>
    <p>
<INPUT                       TYPE="SUBMIT"
VALUE="cnn.query.business">
</p>
</form>
    <h2>
<a name="cnn.query.weather">Weather Channel</a>
</h2>
<form node_id="19" action="http://raman.almaden.ibm.com/cgi-bin/cnn.cgi">
    <P node_id="9">
    Which part of today's news would you like to read?</P>
<select name="cnn.query.part">
   <option value="h">Headlines<option>
   <option value="1">first story </option>
   <option value="2">second story </option>
   <option value="3">third story </option>
   </select>
<p>
</p>
    <P node_id="20">
    Which region are you interested in?</P>
<select name="cnn.query.interest">
   <option value="us">United states </option>
   <option value="europe">
   Europe
   </option>
   <option value="JP">Japan </option>
   <option value="AU">Australia </option>
   <option value="AS">Asia </option>
   </select>
<p>
</p>
    <p>
<INPUT                       TYPE="SUBMIT"
VALUE="cnn.query.weather">
</p>
</form>
    <h2>
<a name="cnn.query.travel">Travel Section</a>
</h2>
<form node_id="22" action="http://raman.alnaden.ibm.com/cgi-bin/cnn.cgi">
    <P node_id="9">
    Which part of today's news would you like to read?</P><select name="cnn.query.part">
   <option value="h">Headlines</option>
   <option value="1">first story </option>
   <option value="2">second story </option>
   <option value="3">third story </option>
   </select>
<p>
</p>
    <P node_id="23">
    Which city do you want to visit?</P>
<select name="cnn.query.interest">
   <option value="AMSTERDAM">AMSTERDAM</option>
   <option value="COPENHAGEN">COPENHAGEN</option>
   <option value="HELSINKI">HELSINKI<option>
   <option value="HONGKONG">HONGKONG</option>
   <option value="LONDON">LONDON</option>
   <option value="OSLO">OSLO</option>
   <option value="PRAGUE">PRAGUE</option>
   <option value="SINGAPORE">SINGAPORE</option>
   <option value="STOCKHOLM">STOCKHOLM</option>
   <option value="SYDNEY">SYDNEY</option>
   </select>
<p>
</p>
    <p>
<INPUT TYPE="SUBMIT" VALUE="cnn.query.travel">
</p>
</form>
    <h2>
<a name="cnn.query.sports">Sports Channel</a>
</h2>
<form node_id="25" action="http://raman.almaden.ibm.com/cgi-bin/cnn.cgi">
    <P node_id="9">
    Which part of today's news would you like to read?</P>
<select name="cnn.query.part">
   <option value="h">Headlines</option>
   <option value="1">first story </option>
   <option value="2">second story </option>
   <option value="3">third story </option>
   </select>
</select>
<p>
    <P node_id="26">
    What sports are you interested in?</P>
```

```
<select name="cnn.query.interest">
  <option value="AS">Asia </option>
  <option value="w">world </option>
  <option value="eu">europe </option>
  <option value="us">united states </option>
  <option value="nba">NBA </option>
  <option value="nhl">nhl </option>
  <option value="EF">Europoean football </option>
  </select>
<p>
</p>
  <p>
<INPUT TYPE="SUBMIT" VALUE="cnn.query.sports">
</p>
</form>
  </div>
</div>
</body>
</html>
```

N. CML DTD

Document Type Definition

The following represent the CML DTD. It is to be understood that the following DTD description should be fully understood by anybody familiar with the art of XML. It fully defines the syntax of CML as presented for this embodiment.

```
<!--$Id: cml.dtd,v 1.14 2000/03/02 17:04:02$-->
<!--DTD For Conversational Markup Language CML-->
<!--Conventions:
Tags are all lower case.
Attribute names are all lower case.-->
<!--{attribute entities-->
<!--core attributes common to most elements
node_id document-wide unique id
name Names data item that is populated by this gesture.
title Human readable title
style URI of custom stylesheet
-->
<!ENTITY % coreattrs
"node_id ID #IMPLIED
name CDATA #IMPLIED
style CDATA; #IMPLIED
trigger CDATA #implied
title CDATA #IMPLIED"
>
<!--}-->
<!--{entities-->
<!ENTITY % GESTURE "(cml
|select
|menu
|message
|help)">
<!--}-->
<!--{TOP LEVEL CML-->
<!ELEMENT group (% GESTURE+)<
>
<!ATTLIST group
id ID #required
modality CDATA #implied
class CDATA #implied
>
<!ELEMENT CML ((group|% GESTURE)+,
submit?
)
>
<!ATTLIST cml % coreattr>
<!--}-->
<!--{gesture message
<!ELEMENT message ANY>
<!ATTLIST message % coreattr>
<!--}-->
<!--{gesture help
<!ELEMENT help ANY>
<!ATTLIST help % coreattr>
<!--{gesture boolean
<!ELEMENT boolean(message,
help?)
>
<!ATTLIST boolean % coreattr;
require_confirmation (true|false) #implied
require_confirmation_if_yes (true|false #implied
require_confirmation_if_no (true|false #implied
default (true|false #implied
>
<!--}-->
<!--{gesture select
<!ELEMENT error ANY>
<!ELEMENT grammar (gram,
help?)
>
<!ATTLIST grammar
type CDATA #required>
<!ELEMENT gram ANY>
<!ELEMENT final ANY>
```

```
<!--open content model for element predicate for now-->
<!--will use an expression syntax a la xpath and augmented-->
<!--as needed-->
<!--will also draw on xforms work-->
<!ELEMENT predicate ANY>
<!ELEMENT choice (grammar?,
PCDATA)
>
<!ATTLIST choice % coreattr;
value CDATA #required
>
<!--default has same content model as choice-->
<!ELEMENT default (grammar?,
PCDATA)
>
<!ATTLIST default % coreattr;
value CDATA #required
>
<!ELEMENT choices (choice+,
default?)
>
<!ELEMENT select (message,
help?,
choices,
predicate?,
error?)
>
!ATTLIST select % coreattr;
require_predicate (true|false) #implied
selection-type CDATA #implied
>
<!--}-->
<!--{gesture menu
<!ELEMENT menu (message,
help?,
choices)
>
!ATTLIST menu % coreattr;>
<!--}-->
<!--{constrained input-->
<!--CML provides gestures for standard dialog components,
the following is merely a sample list of gestures:
Date
Specify date
Time
Specify time.
Currency
Specify currency amount.
Credit card
Specify a credit card (including card type, card number and expiration date).
Phone
Specify a telephone number.
Email
Specify an email address.
url
Specify a url.
Snail Address
Specify a snail mail address, including street, city/state/country
and zip code.
We will specify formal DTD for these elements.-->
<!--{unconstrained input-->
<!ELEMENT input (message,
help?,
predicate?)
>
!ATTLIST input % coreattr;
require_predicate (true|false) #implied
>
<!--}-->
<!--{gesture user_identification
<!ELEMENT user_identification (message,
help?,
user,
identify,
predicate,
error)
>
!ATTLIST user_identification % coreattr;
require_predicate (true|false) #implied
on_fail CDATA #implied
>
<!--}-->
<!--{gesture submit-->
!<!ELEMENT env EMPTY>
<!ATTLIST env
name CDATA #required>
<!ELEMENT submit (message?,
```

```
help?,
env*)
>
<!ATTLIST submit
target CDATA #required>
<!--}-->
<!--{binding events-->
<!ELEMENT bind-event EMPTY>
<!ATTLIST bind-event
logical CDATA #required
physical CDATA #implied
modality CDATA #implied
>
<!--}-->
<!--{environment
<!ELEMENT var EMPTY>
<!ATTLIST var
name CDATA #required
value CDATA #implied
>
<!ELEMENT value EMPTY>
<!ATTLIST var
name CDATA #required
>
<!ELEMENT assign EMPTY>
<!ATTLIST var
name CDATA #required
value CDATA #required
>
<!--}-->
<!--{end of file-->
<!--End Of DTD
local variables:
folded-file: t
end:
-->
<!--}-->
```

Accordingly, the conversational markup language according to the present invention, as described in detail herein, provides many useful features and advantages. Programming by interaction permits the definition of the underlying data model being populated (model) to be separated from the markup language defining the user interaction (view/controller). This makes possible the construction of tightly synchronized multi-modal interactions and supports conversational applications. CML according to invention provides mechanisms to support tight synchronization, e.g., a Node_id attribute attached to each gesture and mapping of this attribute over to the various outputs. The language is preferably defined in terms of atomic constructs (the gestures), more complex constructs, if any, are composed of these atomic gestures along with a clear semantic definition of the complex construct (in terms of dialogs). This enables mapping the complex modules to different modalities. Voice is considered as a first class user interface (UI) modality at the same level of GUI. Gestures corresponds to elementary dialog components (this includes adding appropriate data files). Where required, authors wishing to encapsulate modality-specific components may provide a "pass through" mechanism for encoding modality-specific markup. Modality specific constructs (either for speech or GUI) may be limited to this pass-through mechanism. Conversational UI is supported. The markup language captures dialog components that may be active in parallel. CML is an extensible language, e.g., new gestures can be defined, gesture transformation rules can be modified, tags/constructs from other languages can be embedded (in pass through mode). Modality specific tags/pass through is the only mechanism for additional cosmetization of a page. CML also provides an explicit environment for encapsulating application state. CML further provides the ability for the interaction description to refer to dynamically generated data, as well as supporting callback mechanisms to the backend. Any conventional method can be used for these purposes. Further, given the detailed description of CML provided herein, various tools and development environments associated with use of the inventive markup language may be realized by those skilled in the art.

II. Multimodal Browser

The following is a description of a multimodal browser according to the present invention. This section is divided into the following subsections for ease of reference: (A) Introduction; (B) Multimodal Shell; (C) Multimodal Shell and CML; (D) CML and Multimodal Synchronization; (E) CML and Application Authoring; (F) Illustrative Embodiments; (G) Alternative Embodiments.

A. Introduction

Before describing multi-modal browsing according to the present invention, the following is a summary description of some of the above-referenced patent applications with concepts relating to CML and the multi-modal browser of the present invention.

PCT international patent application PCT/US99/22927 discloses the concepts of: conversational computing, conversational user interface, and conversational application platform (CVM—Conversational Virtual Machine). The functionalities and behavior/services described therein and provided by CVM can be, in practice, implemented by the multi-modal browser of the invention, or by applications which offer a conversational user interface. However, at a conceptual level, it is assumed that CVM implements all the necessary services to support the browser of the invention.

PCT international patent application PCT/US99/23008 discloses the use of a declarative programming language (referred to as "CML" but which is different then the language of the invention) to program a conversational application (i.e., multi-modal). The language disclosed therein is a declarative language that supports the multi-modal/conversational user interface. In practice, the example/embodiment provided therein consists of ML pages written according to the "multiple authoring" model instead of single authoring as provided for in accordance with the present invention. Different examples of the declarative programming language where taught:

(i) the speech only ML, also called SpeechML which led to VoiceXML;

(ii) Multiple files (HTML and VoiceMXL or WML and VoiceXML) with synchronization tags between the files;

(iii) Single files with multiple modality descriptions (e.g., <MM><Speech>Speech rendering info </speech><GUI>GUI rendering info </GUI></MM> etc. . . . ), again with synchronization info;

(iv) Single file with frame-like model to split the information associated with different modalities (e.g., the speech content is presented in a "speech frame" in addition to the HTML page).

None of these items address single authoring. Nor do they address supporting from CML, any target legacy ML (channel), or the concept of gesture or gesture-based XSL.

U.S. patent application Ser. No. 09/507,526 describes a generic multi-modal shell. It describes how to support and program synchronized multi-modal applications (that they be declarative, imperative or hybrid). It uses registration tables where a each application modality registers its state, the commands that it supports and the impact of these commands on the other modality. Again, no teaching of gestures and single authoring. An embodiment describes the architecture when the application is a browser (i.e., a browser associated with the rendering of each modality) and the shell receives a CML page (as defined in international application PCT/US99/23008), builds the registration tables and therefore synchronizes across the modalities.

Now, as will be explained in the following description, the present invention provides for a multimodal browser architecture. Such a multimodal browser, as will be described below, makes use of the features and advantages of CML and the conversational gestures of the language, as described above in detail in Section I, to permit a user to access information in any modality and on any device supported by the application. For example, visual and spoken interaction with the multimodal browser is abstracted using a core set of conversational gestures and represented using CML. Conversational gestures are realized appropriately by each interaction modality. Light-weight information applications (infoware) may be authored using these basic conversational gestures, and the resulting content when rendered is projected to a modality/device specific markup language or wire protocol, e.g., VoiceXML, WML, to name a few.

B. Multimodal Shell

At the center of operation of the multimodal browser is a multimodal shell mechanism. The multimodal shell acts as a server to multiple user interface clients or browsers. Browsers providing different interaction modalities, e.g., a visual HTML browser or an auditory VoiceXML browser, register as clients with the multimodal shell. User interaction proceeds by the multimodal shell traversing the CML document. During this traversal, the shell orchestrates the user's interaction with specific pieces of CML infoware by:

(i) Initiating user interaction by passing out an interaction-specific representation of the current CML node to all registered clients.

(ii) Waiting for an information update from all registered clients that have received the current CML node.

(iii) Possibly resolve conflicts between received information, e.g. the user speaks right and points to the left.

(iv) Updates the current CML node based on the information update just received.

(v) Upon successfully executing an update, the shell passes the newly updated application state to all registered browsers.

C. Multimodal Shell And CML

As explained above, a CML application is an aggregation of a set of standard conversational gestures. Such conversational gestures form the basic building blocks of the complete dialog which makes up applications. For example, in a particular application, the primary task of the application designer is to specify:

(i) Specify the items of information to collect from the user.

(ii) For each requisite item, specify the constraints, e.g., select from a set, etc.

(iii) Update the application state as each item of information is furnished.

(iv) Package up the collected items of information and submit it to a back-end application server.

Notice that as specified, the tasks above are independent of the interaction modality in use.

Different user interface front-ends, e.g., a visual WWW browser, an auditory VoiceXML browser, etc., map these tasks to appropriate user interface widgets.

CML documents are hosted by a generic multimodal shell. The shell serves different user interface realizations, e.g., a visual HTML browser, or an auditory VoiceXML browser. Browsers that wish to be clients of the shell hold a weak reference to the current application state. Registered clients are notified by the shell when the application state changes; each client then queries its own weak reference to the application state to extract the relevant information that it wishes to present to the user.

The user traverses the CML document by interacting with the application via one of the registered browsers. As user interaction proceeds, all registered browsers are notified about the current CML node that is the focus of interaction, and consequently update their presentation as needed. The shell keeps track of the currently open CML documents, as well as their corresponding application states. Where required, the conversational shell can provide succinct summaries of the state of any of the currently open applications. Information submitted via any one of the registered clients is mediated by the shell, which takes care of notifying other registered clients and, where necessary, the back-end application server.

D. CML And Multimodal Synchronization

Synthesizing the interaction-specific realizations of an application from a single CML representation enables us to synchronize the different aspects of the multimodal interface. Each node in the CML representation is tagged with a specific node-id. When the CML representation is mapped to an interaction-specific representation, e.g., HTML or VoiceXML, nodes in the resulting mapping are tagged with the node-id of their corresponding node in the CML representation. When the user interacts with the browser via a specific modality, the multimodal shell maps the currently active nodes in the application back to the original CML representation by looking up the relevant node-id. As application state changes due to user interaction, the shell passes the modified application state along with the node-id of the modified node to all clients that have registered to be notified. Notified applications update the corresponding nodes in their interaction-specific representation by checking against the node-id. Notice that registered applications essentially need to hold a weak reference to the underlying application state. As the interaction-specific rendering engine updates the necessary nodes, the weak reference will cause the information relevant for the update (and nothing but the required information) to be automatically retrieved from the shell.

Figure 9:
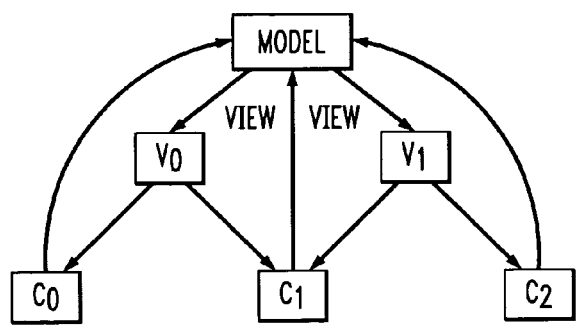
FIG. 9 is a diagram illustrating a new interpretation of the MVC model.

Referring now to FIG. 9, a new interpretation of the MVC model is shown. In accordance with the new interpretation, the model is the CML description of the interaction. The view is the result of applying the gesture-based XSL transformation rules to generate the different target ML that are rendered (views) in the different rendering browsers. The browser offer through the interaction with the user to control the model (and modify its state when a I/O event occurs in one of the rendering browser). In accordance with FIG. 9, imagine that V0 is the GUI view (e.g., HTML) and VI is the speech view (with natural language or not). C0 is the mono-modal HTML browser only control/interaction. C1 is the synchronized multi-modal view. C2 is the mono-modal speech control. This approach is fundamentally a new paradigm.

E. CML And Application Authoring

Application creators may interact with a WYSIWYG (what you see is what you get) authoring tool to produce CML representations of their application. Applications represented in CML are mapped to an interaction-specific representation, e.g., VoiceXML or HTML using a standard set of style transformations. Where required, user interface designers may create custom style transformations to design a specific look and feel or sound and feel. CML authoring tools may also be created that allow clients to map legacy HTML-only WWW applications to CML for deployment on the multimodal browser platform. Such a tool provides the necessary bridge to help customers deploy existing WWW applications on the VoiceXML platform; this solution is more attractive than directly re-authoring to VoiceXML, since mapping existing applications to CML once enables deployment across a variety of multimodal browser settings. This is true also for HTML, WML (and other legacy ML).

F. Illustrative Embodiments

Figure 10:
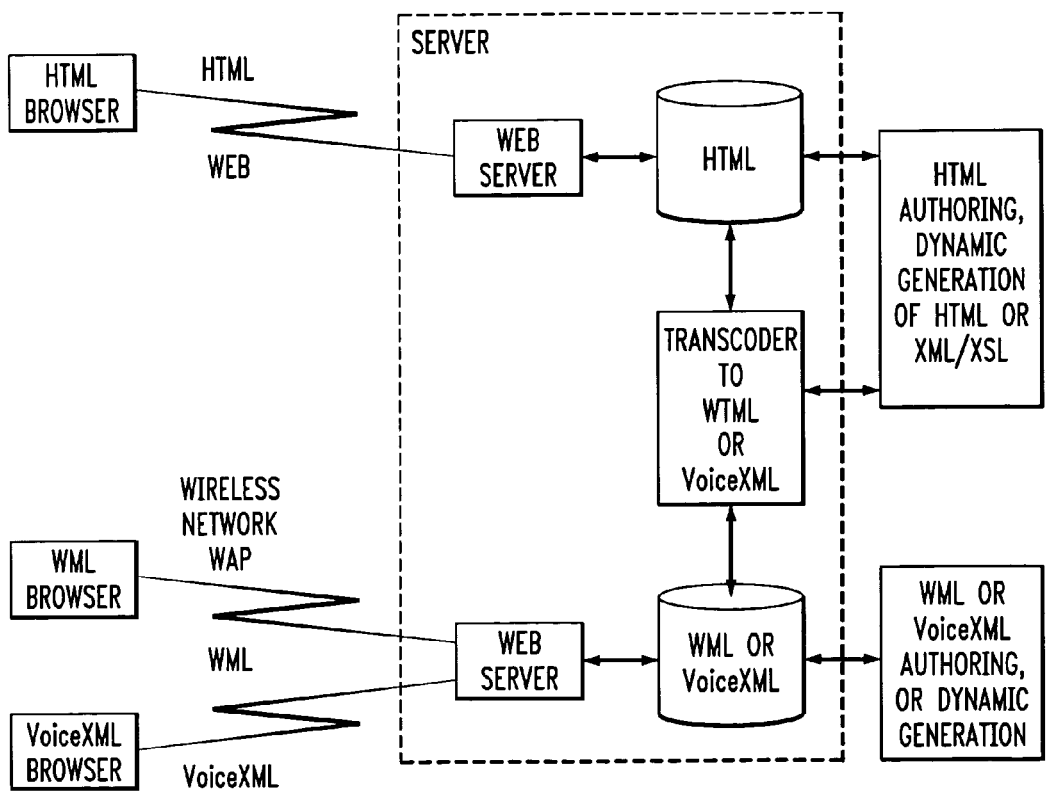
FIGS. 10-12 illustrate the migration road map from existing systems to full use of CML according to the present invention.
Figure 11:
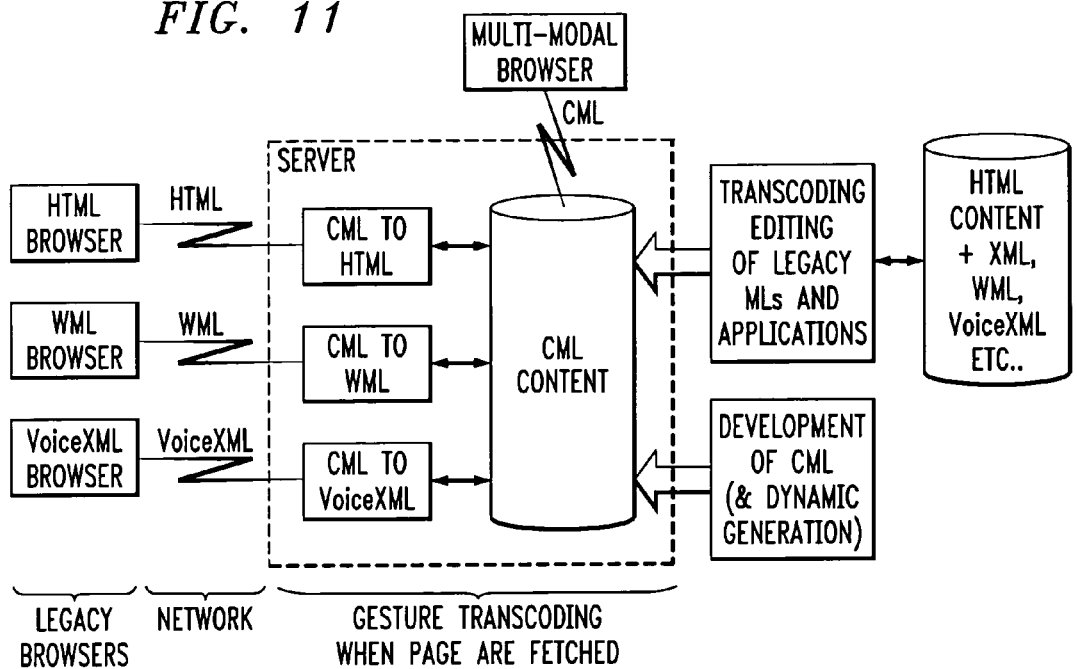
Figure 12:
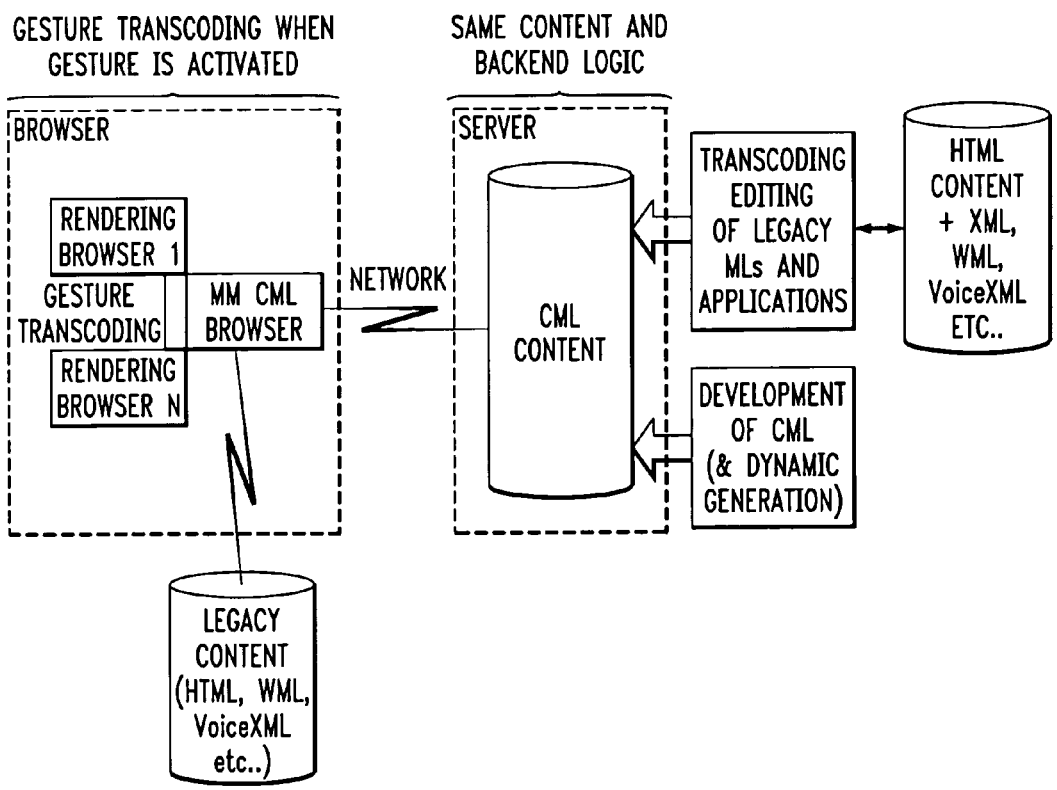

Referring now to FIGS. 10-12, a migration road map from existing systems to full use of CML in a multimodal browsing environment according to the present invention is shown.

FIG. 10 illustrates the current fat client web programming model. Content is mostly written in HTML (statically stored in that format or dynamically generated).

When the content needs to be adapted to a particular browser (e.g., a given version of Internet explorer or Communicator), specific style sheets that are a function of the target browser, as well as the type of content, are built. This is usually a XML/XSL authoring approach. If another channel/modality (WML, CHTML, VoiceXML, etc.) is required, the content must be re-written or the content, when written in HTML or XML, needs to follow very specific rules and be of a type/domain well known so that some generic application/business logic dependent XSL rules can be used to produce these modality specific legacy languages and/or the XSL rules must be re-authored very often. This leads to a plethora of multiple authoring, that it be directly in the different legacy languages or that it be in different style sheets that transform a single XML content into these different legacy MLs. Eventually, today, there is more and more need for access to the Web (i.e., mostly by exchanging HTML), wireless network (mostly WML, but other standards exist) and telephone (mostly VoiceXML). Because multiple authoring is the only solution, the sites that offers such type of services usually are only closed sites (limited amount of services/content—by opposition to the open full web content) with limited amount of service/content providers or enterprise sites. There is no existing solution to offer access to any information, anywhere, at any time through any access device and let the user manipulate it. The different legacy languages (including XML) do not contain the necessary information to appropriately handle different parts of the page in other modalities (e.g., the grammars and other arguments for the conversational engines are missing, etc.).

FIG. 11 describes the first step to deploy CML and use the programming by interaction programming model and conversational computing paradigm. This solution can use today's existing infrastructure in terms of the transport protocols and network (e.g., telephony PSTN, wireless networks (voice and/or data), voice over IP, TCP/IP—HTTP, WAP, etc.) and legacy browsers (e.g., HTML browser, WML browser, VoiceXML browser etc.). If content is available in CML, it can be transcoded, on the fly, to the target legacy ML supported by the requesting browser whenever a page is served, whether it be statically or dynamically generated. Determination of the target ML is based on the type of browser or IP of the gateway, browser, server: a WAP gateway receives WML pages, a browser describes its requirement based on descriptors (in http headers) or the access mechanism (e.g., http would imply HTML—at least at the beginning of the deployment, until some CML browsers are available). The determination can also be made depending on the requested page: if the browser asks from a xxxx.html, it means that CML is transcoded into HTML. If it asks for yyyy.vxml, it means that it is transcoded into a VoiceXML, etc. Clearly, this guarantees support of the current infrastructure and any of its future evolutions.

When a CML browser (i.e., conversation/multi-modal) is released, it will request CML pages (i.e., zzzz.cml) and can also describe itself as CML browser. In such case, the pages are served without any transcoding. This guarantees smooth transition from legacy/today's infrastructure to a CML/conversational dominated web programming paradigm. Now, legacy content, (i.e., static or dynamic content written in HTML, WML, VoiceXML and/or other legacy languages) needs to be transformed in CML. Tools can be used at best to "guess" the CML target that then needs to be verified and re-edited manually. However, for the same reasons as explained above, a viable automatic transcoding system can be used when the original pages have been built according to specific rules, or when the XML tags are well defined (domain specific) so that their role in the page is well defined.

FIG. 12 shows the next step in the deployment road map, when CML conversational (multi-modal browser) become the norm. Accordingly, the transcoding is now part of the browser, the pages are authored and served in CML. When a legacy (i.e., non-CML) page is provided, it is fetched by the multi-modal shell but then it will be directly transmitted to the corresponding rendering browser that handles the corresponding modality.

CML content and legacy content of course still needs to be authored or transformed to CML as described above.

Figure 13:
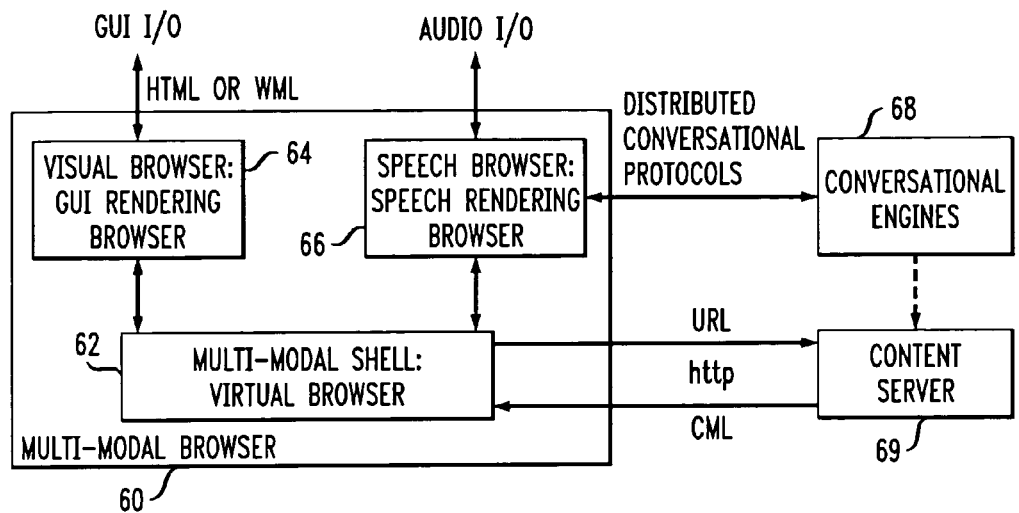
FIG. 13 is a diagram illustrating a multimodal browser architecture according to an embodiment of the present invention.

Referring now to FIG. 13, a block diagram is shown of a multimodal browser architecture according to the present invention. As shown, a multimodal browser 60 comprises a mutimodal or conversational shell 62, a GUI rendering browser component 64 and a speech rendering browser component 66. The mutimodal shell is also referred to as a "virtual browser." It is to be understood that while the multimodal browser 60 depicts the use of two modalities; vision (browser component 64) and speech (browser component 66), the invention is not limited to these modalities. The multimodal browser 60 operates generally as follows. A user desiring to access an application interfaces with a client device (e.g., personal computer, laptop computer, personal digital assistant, etc.) on which all or portions of the multimodal browser resides. In the general case shown in FIG. 13, the user can do this via a textual and/or graphic interface (GUI input/output), and/or the interface can be via speech (audio input/output). While FIG. 13 illustrates the multimodal browser 60 in one block, it will be explained below that the multimodal browser may be implemented over multiple devices, including both client and server computer systems.

Based on the user's request, the multimodal browser 60 sends an appropriate URL to a content server 69, which also services conversational engines 68 that may also reside on the client device, in order to request access to the particular desired application. CML code associated with the application is then downloaded from the content server 69 to the multimodal browser 60. The multimodal browser then generates the modality specific renderings (GUI representation and/or speech representation) based on the conversational gestures associated with the CML code. The user thus interacts with the browser 60 via these representations.

Figure 14:
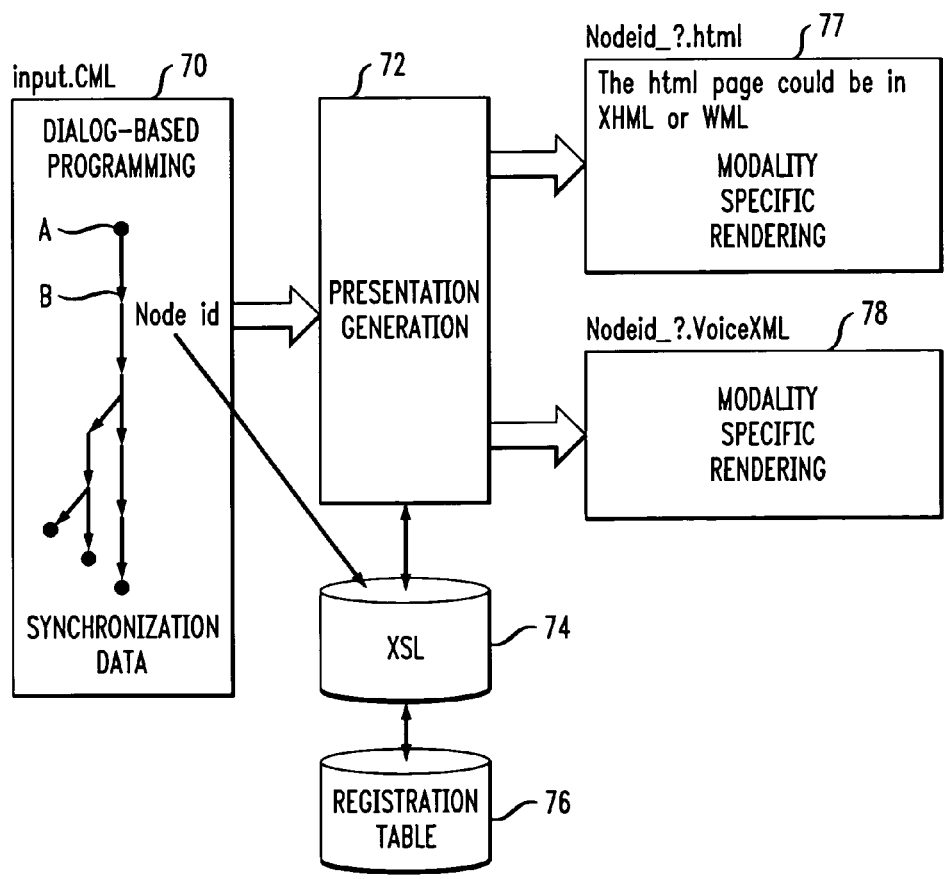
FIG. 14 is a flow diagram illustrating an exemplary usage of CML in the application programming process according to an embodiment of a multimodal browser mechanism of the present invention.

Referring now to FIG. 14 (with continued reference to FIG. 13), a more detailed flow diagram is shown illustrating the operation of a multimodal browser according to one embodiment of the invention. An application developer writes an application, e.g., a light-weight application referred to as infoware, in CML. Infoware authored in CML is hosted by the a conversational shell (e.g., multimodal shell 62 of FIG. 13) that mediates amongst multiple modality specific browser components (e.g., visual browser 64 and speech browser 66 of FIG. 13). The multimodal shell may be thought of as a CML interpreter or processor. This is illustrated in FIG. 14 as block 70. User interaction proceeds by the CML interpreter mapping CML instances associated with the downloaded CML code to appropriate modality-specific languages such as HTML (block 77) and VoiceXML (block 78). These modality-specific representations render modality-specific versions of the dialog associated with the application. As illustrated in block 70, the nodes (A) and arrows (B) represent the declarative program in CML. The gestures in the CML program are represented by each of the nodes and the arrows represent the flow of the interaction/dialog with possible bifurcation points or loops. Each gesture is identified by a node ID (node_id) that allows appropriate identification of the activated gesture for synchronization between the different registered modalities. The node_id identifies the gesture so that the CML browser (i.e., the multimodal shell or virtual browser) knows where it is in the dialog flow and where to go from there (e.g., update the different modalities or send variables to the server and fetch a new CML page).

The transformation from CML to modality-specific representations 77 and 78 is governed by XSL transformation rules (or other transformation mechanisms, as mentioned above). These XSL rules are modality-specific. These transformations are handled by the presentation generation block 72 in accordance with the XSL rules 74 and the registration table 76. The registration table 76 is a repository of default gesture XSL transformation rules, as well as the specific rules that are extensions, application specific, device specific or user specific. In the process of mapping the CML instance to an appropriate modality-specific representation, the XSL rules add the necessary information needed to realize modality-specific user interaction. As an example, when translating element select to VoiceXML, the relevant XSL transformation rule handles the generation of the grammar that covers the valid choices for that conversational gesture.

The process of transforming CML instances to modality-specific representations such as HTML may result in a single CML node mapping to a collection of nodes in the output representation. To help synchronize across these various representations, CML attribute node_id is applied to all output nodes resulting from a given CML node. When a given CML instance is mapped to different representations, e.g., HTML and VoiceXML by the appropriate modality-specific XSL rules, the shape of the tree in the output is likely to vary amongst the various modalities. However, attribute node_id allows us to synchronize amongst these representations by providing a conceptual backlink from each modality-specific representation to the originating CML node. This is graphically depicted in block 70 of FIG. 14.

As user interaction proceeds, variables defined in the environment by the current CML instance get bound to validated values. This binding happens first in one of the modality-specific representations (registered clients) 77 and 78. The modality-specific representation sends an appropriate message to the CML interpreter (multimodal shell) comprising of the updated environment and the node_id of the gesture that was just completed. Once the updated binding has been propagated to the CML interpreter, it messages all modality-specific representations with the node_id of the gesture just completed. Modality-specific representations update their presentation upon receiving this message by first querying the CML interpreter for the portion of the environment that affects their presentation.

Figure 15:
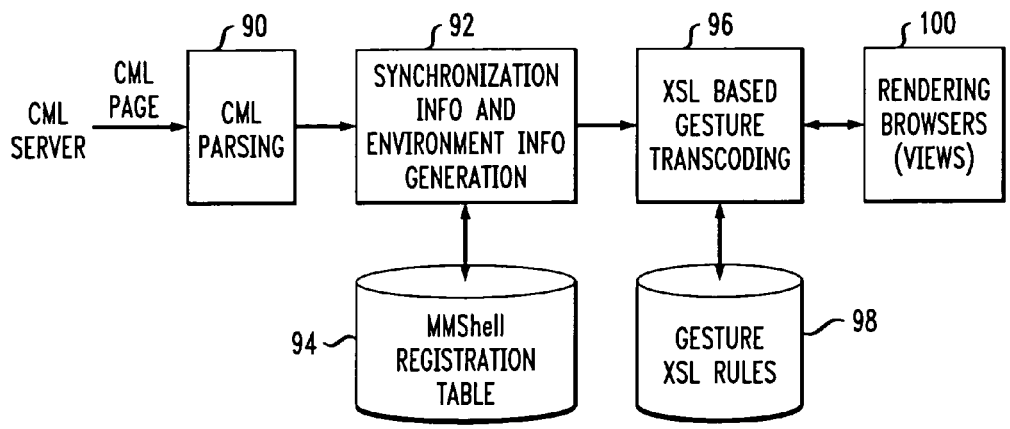
FIG. 15 is another flow diagram illustrating an exemplary usage of CML in the application programming process according to an embodiment of a multimodal browser mechanism of the present invention.

FIG. 15 illustrates the different steps performed by a CML multi-modal browser according to one embodiment of the present invention. When a CML page is fetched by the browser, the browser parses the CML content, e.g., similar in operation to an XML parser (step 90). The browser builds an internal representation of the interaction (i.e., the graph/tree of the different gestures described in the page) and the node_id. Using the gesture XSL transformation (or other transformation mechanisms like Java Beans or Java Server Pages) stored in the browser (block 98), it builds (step 96) the different ML pages sent to each rendering browser (block 100). Upon I/O events in a modality, the effect is examined (step 92) at the level of the interaction graph (i.e., as stored in the MM shell Registration table (block 94) as described in U.S. patent application Ser. No. 09/507,526). Note that the gestures XSL transformation rules can be overwritten by the application developer indicating where they should be downloaded. They can also be overwritten by user, application or device preference from what would be otherwise the default behavior. New gestures can also be added, in which case, the associated XSL rules must be provided (e.g., a URL where to get them).

As previously mentioned, the present invention provides for a multi-device or distributed browsing environment. Due to the nature of CML and its ability to the effectively synchronize multiple browsers, various portions of an application may reside and be executed on separate computing devices. A user may then simultaneously interact with more than one device, e.g., a laptop computer and a cellular phone, when accessing an application. This is actually not limited to browsing in different modalities: even in a same modality (e.g., GUI only), the same principle can be used to describe in advance what are the devices where some content needs to be rendered and to synchronize this rendering across modalities: e.g., display of image on one device, video in another and text plus background in a third. Another example is: text and images in one and applets in another etc. Many more examples are easily conceivable. This would require using customized gestures or gesture XSL rules. Alternatively, this would require another mark-up (with other gestures and default rendering) to do that.

Figure 16:
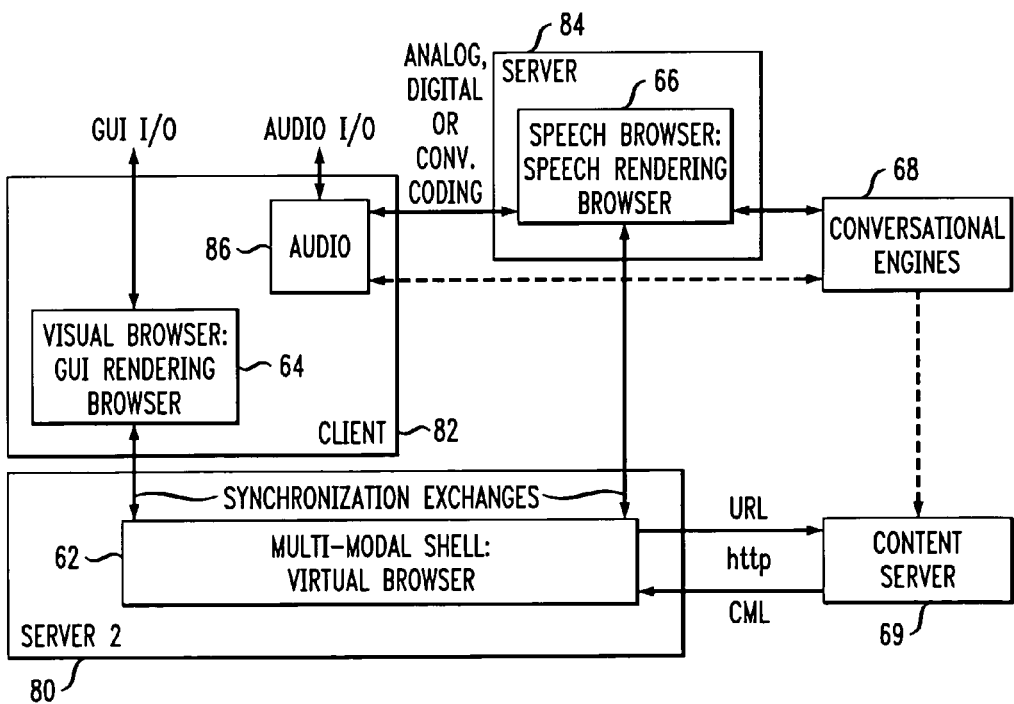
FIG. 16 is a diagram illustrating a multidevice browser architecture according to an embodiment of the present invention.

Referring now to FIG. 16, such a distributed browsing environment is illustrated. The functions and operations of the multimodal browser 62, the visual browser 64, the speech browser 66, the conversational engines 68 and the content server 69 are the same as described above with respect to FIGS. 13 and 14. However, as can be seen, the components are distributed on multiple computing devices. For example, the multimodal browser 62 resides on a server 80, the visual browser 64 resides on a client device 82, and the speech browser resides on a server 84. These client and server devices may be in communication via the WWW, a local network, or some other suitable network. The user may be local to the client device 82, while the servers 80 and 82 are remotely located. Alternatively, all or some of the computing systems may be collocated. Since the user interacts directly with the client device 82, audio input/output facilities 86 (e.g., microphone and speaker) are provided at the device 82, which are connected to the speech browser at the server 84. As can be seen, the same synchronized operation of a CML application may be accomplished even though the various components of the multimodal browser are located on separate computing devices.

It is to be appreciated that each client device and server described above for implementing the methodologies of the present invention may comprise a processor operatively coupled to memory and I/O devices. It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, microphone, etc., for inputting data to the processing unit, and/or one or more output devices, e.g., CRT display, a speaker, etc., for presenting results associated with the processing unit. The input/output devices are modality specific and therefore other devices may be employed. It is also to be understood that "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

G. Alternative Embodiments

Among the possible extensions that trivially result from the teaching of this invention we have the following.

(i) Multi-device browsing (even in a given modality) as discussed above.

(ii) Multi-geographic support: some gestures (e.g., telephone number, address etc.) can be adapted to the local format as well as language. This can be combined with a text-to-text translation system to provide a fully automatic localization mechanism (select yes/No, becomes select Oui/Non) trivially through different XSL rules. Alternatively, in the absence of such an automatic transcoder, the system can be used as part of development/localization tools to speed up the localization/internationalization, geography/region adaptation.

(iii) Conversational Foundation Class: The conversational foundation classes where introduced in PCT international patent application PCT/US99/22927 as being imperative dialog components that are independent of the modality and that can run in parallel and in series to build more complex dialogs. Combined with the services provided by the conversational application platform (CVM—conversational virtual machine), they allow programming of imperative conversational (multi-modal applications) by loading/linking to the libraries of these foundation classes that the platform provides. As each CVM platforms provides it, the application developer can use them and not worry about the rendering within the modality/modalities supported by the device and their synchronization. Accordingly, each gesture defined declaratively in the CML specification provided herein can have a imperative implementation (e.g., in Java) that can run in series (one after the other) or in parallel (more than one active—like more than one form active at a time). Programming in CFC is equivalent to programming imperatively by interaction: you use and link to the some imperative gesture, you hook it to the backend and connect the gesture together by conventional code. You may add some modality specific customization in this code or in the CFC arguments. Then, you let the platform (CVM or a browser that implements the same level of functionality) handle the rendering within the appropriate modality and appropriate synchronization between modality as hard coded in the foundation class. An example would be a case where all the foundation classes are provided as Java Classes. This allows extension of the programming by interaction model to Java applets or servlets, etc.

(iv) Hybrid programming by interaction is a combination of declarative and imperative: CML pages with calls to CFC and other objects built using CFC (and more task specific) e.g., java applets. Therefore, the programming by interaction programming model is to be considered as generally covering all the programming modes.

(v) Scripting: CML can support any scripting that we want to re-use (ECMA Script as defined at http://www.ecma.ch/stand/ecma-262.htm, etc.) directly as a scripting language of the multi-modal shell. Modality specific scripts (like Javascript or WML script) have to be considered as modality specific scripting languages. Although it is possible to define today (i.e., for the step where we use today's infrastructure) a more detailed behavior of how an ECMA script in CML would be transcoded for legacy browser, they can be simply handled as modality specific (i.e., like an image).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of generating an application accessible by a user through one or more computer-based devices, the method comprising the steps of:

representing interactions that the user is permitted to have with the one or more computer-based devices used to access the application by interaction-based programming components, wherein the interaction-based programming components are independent of content/application logic and presentation requirements associated with the application, and further wherein the interaction-based programming components may be transcoded on a component by component basis to generate one or more modality-specific renderings of the application renderable in accordance with one or more modality-specific browsers associated with the one or more computer-based devices, such that the interaction-based programming components are independent of any modality and any modality-specific browser; and authoring the application using at least a portion of the interaction-based programming components;

wherein representation by the interaction-based programming components permits synchronization of the one or more modality-specific renderings of the application on the one or more computer-based devices.

2. The method of claim 1, in a client/server arrangement wherein at least a portion of the application is to be downloaded from a server to at least one of the one or more computer-based devices, acting as a client, further comprising the step of including code in the application operative to provide a connection to the content/application logic resident at the server.

3. The method of claim 2, wherein the code in the application operative to provide a connection to the content/application logic expresses at least one of one or more data models, attribute constraints and validation rules associated with the application.

4. The method of claim 1, wherein the one or more modality-specific renderings comprise a speech-based representation of portions of the application.

5. The method of claim 4, wherein the speech-based representation is based on VoiceXML.

6. The method of claim 1, wherein the one or more modality-specific renderings comprise a visual-based representation of portions of the application.

7. The method of claim 6, wherein the visual-based representation is based on at least one of HTML, CHTML and WML.

8. The method of claim 1, wherein the user interactions are declaratively represented by the interaction-based programming components.

9. The method of claim 1, wherein the user interactions are imperatively represented by the interaction-based programming components.

10. The method of claim 1, wherein the user interactions are declaratively and imperatively represented by the interaction-based programming components.

11. The method of claim 1, wherein the interaction-based programming components comprise basic elements associated with a dialog that may occur between the user and the one or more computer-based devices.

12. The method of claim 11, wherein the interaction-based programming components comprise complex elements, the complex elements being aggregations of two or more of the basic elements associated with the dialog that may occur between the user and the one or more computer-based devices.

13. The method of claim 1, wherein one of the interaction-based programming components represent conversational gestures.

14. The method of claim 13, wherein the conversational gestures comprise a gesture for encapsulating informational messages to the user.

15. The method of claim 13, wherein the conversational gestures comprise a gesture for encapsulating contextual help information.

16. The method of claim 13, wherein the conversational gestures comprise a gesture for encapsulating actions to be taken upon successful completion of another gesture.

17. The method of claim 13, wherein the conversational gestures comprise a gesture for encapsulating yes or no based questions.

18. The method of claim 13, wherein the conversational gestures comprise a gesture for encapsulating dialogues where the user is expected to select from a set of choices.

19. The method of claim 18, wherein the select gesture comprises a subelement that represents the set of choices.

20. The method of claim 18, wherein the select gesture comprises a subelement that represents a test that the selection should pass.

21. The method of claim 20, wherein the select gesture comprises a subelement that represents an error message to be presented if the test fails.

22. The method of claim 13, wherein the conversational gestures comprise a gesture for encapsulating rules for validating results of a given conversational gesture.

23. The method of claim 13, wherein the conversational gestures comprise a gesture for encapsulating grammar processing rules.

24. The method of claim 13, wherein the conversational gestures comprise a gesture for encapsulating dialogues that help the user navigate through portions of the application.

25. The method of claim 13, wherein the conversational gestures comprise a gesture for encapsulating a request for at least one of user login and authentication information.

26. The method of claim 13, wherein the conversational gestures comprise a gesture for encapsulating a request for constrained user input.

27. The method of claim 13, wherein the conversational gestures comprise a gesture for encapsulating a request for unconstrained user input.

28. The method of claim 13, wherein the conversational gestures comprise a gesture for controlling submission of information.

29. The method of claim 1, further comprising the step of defining logical input events and an association between the logical input events and physical input events that trigger the defined logical input events, such that the application may be authored using at least a portion of the definitions.

30. The method of claim 1, wherein the component by component transcoding is performed in accordance with XSL transformation rules.

31. The method of claim 1, wherein the component by component transcoding is performed in accordance with Java Bean.

32. The method of claim 1, wherein the component by component transcoding is performed in accordance with Java Server Pages.

33. The method of claim 1, wherein representation by the interaction-based programming components supports a natural language understanding environment.

34. The method of claim 1, further comprising the step of including code in the authored application for permitting cosmetic altering of a presentational feature associated with the one or more modality-specific renderings of the application on the one or more computer-based devices.

35. The method of claim 1, further comprising the step of including code in the authored application for permitting changes to rules for transcoding on a component by component basis to generate the one or more modality-specific renderings of the application on the one or more computer-based devices.

36. The method of claim 1, wherein a definition of an underlying data model being populated is separated from a markup language defining the user interaction.

37. The method of claim 1, wherein an author is provided with a pass through mechanism to encapsulate modality-specific markup components.

38. The method of claim 1, wherein the components may be active in parallel.

39. The method of claim 1, wherein the representation and transcoding is extensible.

40. The method of claim 1, wherein a state of the application is encapsulated.

41. The method of claim 1, wherein the representation permits reference to dynamically generated data and supports callback mechanisms to the content/application logic.

42. A method of generating an application accessible by a user through one or more computer-based devices the method comprising the steps of:
representing interactions that the user is permitted to have with the one or more computer-based devices used to access the application by interaction-based programming components, wherein the interaction-based programming components are independent of content/application logic and presentation requirements associated with the application, and further wherein the interaction-based programming components may be transcoded on a component by component basis to generate one or more modality-specific renderings of the application renderable in accordance with one or more modality-specific browsers associated with the one or more computer-based devices, such that the interaction-based programming components are independent of any modality and any modality-specific browser; and
authoring the application using at least a portion of the interaction-based programming components;
wherein a node_id attribute is attached to each component and the attribute is mapped over to various outputs.

43. Apparatus for use in accessing an application in association with one or more computer-based devices, the apparatus comprising:
one or more processors operative to: (i) obtain the application from an application server, the application being programmatically represented by interactions that the user is permitted to have with the one or more computer-based devices by interaction-based programming components, wherein the interaction-based programming components are independent of content/application logic and presentation requirements associated with the application; and (ii) transcode the interaction-based programming components on a component by component basis to generate one or more modality-specific renderings of the application renderable in accordance with one or more modaility-specific browsers associated with the one or more computer-based devices, the interaction-based programming components being independent of any modality and any modality-specific browser
wherein representation by the interaction-based programming components permits synchronization of the one or more modality-specific renderings of the application on the one or more computer-based devices.

44. The apparatus of claim 43, wherein the one or more processors are distributed over the one or more computer-based devices.

45. The apparatus of claim 43, in a client/server arrangement wherein at least a portion of the application is to be downloaded from a server to at least one of the one or more computer-based devices, acting as a client, further comprising the step of including code in the application operative to provide a connection to the content/application logic resident at the server.

46. The apparatus of claim 45, wherein the code in the application operative to provide a connection to the content/application logic expresses at least one of one or more data models, attribute constraints and validation rules associated with the application.

47. The apparatus of claim 43, wherein the one or more modality-specific renderings comprise a speech-based representation of portions of the application.

48. The apparatus of claim 47, wherein the speech-based representation is based on VoiceXML.

49. The apparatus of claim 43, wherein the one or more modality-specific renderings comprise a visual-based representation of portions of the application.

50. The apparatus of claim 49, wherein the visual-based representation is based on at least one of HTML, CHTML and WML.

51. The apparatus of claim 43, wherein the user interactions are declaratively represented by the interaction-based programming components.

52. The apparatus of claim 43, wherein the user interactions are imperatively represented by the interaction-based programming components.

53. The apparatus of claim 43, wherein the user interactions are declaratively and imperatively represented by the interaction-based programming components.

54. The apparatus of claim 43, wherein the interaction-based programming components comprise basic elements associated with a dialog that may occur between the user and the one or more computer-based devices.

55. The apparatus of claim 54, wherein the interaction-based programming components comprise complex elements, the complex elements being aggregations of two or more of the basic elements associated with the dialog that may occur between the user and the one or more computer-based devices.

56. The apparatus of claim 43, wherein one of the interaction-based programming components represent conversational gestures.

57. The apparatus of claim 56, wherein the conversational gestures comprise a gesture for encapsulating informational messages to the user.

58. The apparatus of claim 56, wherein the conversational gestures comprise a gesture for encapsulating contextual help information.

59. The apparatus of claim 56, wherein the conversational gestures comprise a gesture for encapsulating actions to be taken upon successful completion of another gesture.

60. The apparatus of claim 56, wherein the conversational gestures comprise a gesture for encapsulating yes or no based questions.

61. The apparatus of claim 56, wherein the conversational gestures comprise a gesture for encapsulating dialogues where the user is expected to select from a set of choices.

62. The apparatus of claim 61, wherein the select gesture comprises a subelement that represents the set of choices.

63. The apparatus of claim 61, wherein the select gesture comprises a subelement that represents a test that the selection should pass.

64. The apparatus of claim 63, wherein the select gesture comprises a subelement that represents an error message to be presented if the test fails.

65. The apparatus of claim 56, wherein the conversational gestures comprise a gesture for encapsulating rules for validating results of a given conversational gesture.

66. The apparatus of claim 56, wherein the conversational gestures comprise a gesture for encapsulating grammar processing rules.

67. The apparatus of claim 56, wherein the conversational gestures comprise a gesture for encapsulating dialogues that help the user navigate through portions of the application.

68. The apparatus of claim 56, wherein the conversational gestures comprise a gesture for encapsulating a request for at least one of user login and authentication information.

69. The apparatus of claim 56, wherein the conversational gestures comprise a gesture for encapsulating a request for constrained user input.

70. The apparatus of claim 56, wherein the conversational gestures comprise a gesture for encapsulating a request for unconstrained user input.

71. The apparatus of claim 56, wherein the conversational gestures comprise a gesture for controlling submission of information.

72. The apparatus of claim 43, further comprising the step of defining logical input events and an association between the logical input events and physical input events that trigger the defined logical input events, such that the application may be authored using at least a portion of the definitions.

73. The apparatus of claim 43, wherein the component by component transcoding is performed in accordance with XSL transformation rules.

74. The apparatus of claim 43, wherein the component by component transcoding is performed in accordance with Java Bean.

75. The apparatus of claim 43, wherein the component by component transcoding is performed in accordance with Java Server Pages.

76. The apparatus of claim 43, wherein representation by the interaction-based programming components supports a natural language understanding environment.

77. The apparatus of claim 43, further comprising the step of including code in the authored application for permitting cosmetic altering of a presentational feature associated with the one or more modality-specific renderings of the application on the one or more computer-based devices.

78. The apparatus of claim 43, further comprising the step of including code in the authored application for permitting changes to rules for transcoding on a component by component basis to generate the one or more modality-specific renderings of the application on the one or more computer-based devices.

79. The apparatus of claim 43, wherein a definition of an underlying data model being populated is separated from a markup language defining the user interaction.

80. The apparatus of claim 43, wherein an author is provided with a pass through mechanism to encapsulate modality-specific markup components.

81. The apparatus of claim 43, wherein the components may be active in parallel.

82. The apparatus of claim 43, wherein the representation and transcoding is extensible.

83. The apparatus of claim 43, wherein a state of the application is encapsulated.

84. The apparatus of claim 43, wherein the representation permits reference to dynamically generated data and supports callback mechanisms to the content/application logic.

85. The apparatus of claim 43, wherein the representation of the application further permits cosmetization of the one or more modality-specific renderings via one or more modality-specific markup languages.

86. Apparatus for use in accessing an application in association with one or more computer-based devices, the apparatus comprising:
one or more processors operative to: (i) obtain the application from an application server, the application being programmatically represented by interactions that the user is permitted to have with the one or more computer-based devices by interaction-based programming components, wherein the interaction-based programming components are independent of content/application logic and presentation requirements associated with the application; and (ii) transcode the interaction-based programming components on a component by component basis to generate one or more modality-specific renderings of the application renderable in accordance with one or more modaility-specific browsers associated with the one or more computer-based devices, the interaction-based programming components being independent of any modality and any modality-specific browser;
wherein a node_id attribute is attached to each component and the attribute is mapped over to various outputs.

87. Apparatus for use in accessing an application in association with one or more computer-based devices, the apparatus comprising:
one or more processors operative to: (i) obtain the application from an application server, the application being programmatically represented by interactions that the user is permitted to have with the one or more computer-based devices by interaction-based programming components, wherein the interaction-based programming components are independent of content/application logic and presentation requirements associated with the application: and (ii) transcode the interaction-based programming components on a component by component basis to generate one or more modality-specific renderings of the application renderable in accordance with one or more modality-specific browsers associated with the one or more computer-based devices, the interaction-based programming components being independent of any modality and any modality-specific browser;
wherein the one or more processors are distributed over the one or more computer-based devices and the application is synchronized across the one or more computer-based devices.

88. A browser apparatus for use in providing access to an application by a user through one or more computer-based devices, comprising a machine readable storage medium containing computer executable code which when executed permits the implementation of the steps of:
obtaining the application from an application server, the application being programmatically represented by interactions that the user is permitted to have with the one or more computer-based devices by interaction-based programming components, wherein the interaction-based programming components are independent of content/application logic and presentation requirements associated with the application; and
transcoding the interaction-based programming components on a component by component basis to generate one or more modality-specific renderings of the application renderable in accordance with one or more modaility-specific browsers associated with the one or more computer-based devices, the interaction-based programming components being independent of any modality and any modality-specific browsers
wherein representation by the interaction-based programming components permits synchronization of the one or more modality-specific renderings of the application on the one or more computer-based devices.

89. An article of manufacture for use in generating an application accessible by a user through one or more computer-based devices, comprising a machine readable storage medium containing computer executable code which when executed permits the implementation of the steps of:

representing interactions that the user is permitted to have with the one or more computer-based devices used to access the application by interaction-based programming components, wherein the interaction-based programming components are independent of content/application logic and presentation requirements associated with the application, and further wherein the interaction-based programming components may be transcoded on a component by component basis to generate one or more modality-specific renderings of the application renderable in accordance with one or more modality-specific browsers associated with the one or more computer-based devices, such that the interaction-based programming components are independent of any modality and any modality-specific browser; and authoring the application using at least a portion of the interaction-based programming components;

wherein representation by the interaction-based programming components permits synchronization of the one or more modality-specific renderings of the application on the one or more computer-based devices.

* * * * *